US012031306B2

(12) United States Patent
Guthrie et al.

(10) Patent No.: US 12,031,306 B2
(45) Date of Patent: Jul. 9, 2024

(54) INLINE DISPENSING DEVICE

(71) Applicant: Kohler Co., Kohler, WI (US)

(72) Inventors: Robert J. Guthrie, Milwaukee, WI (US); Brian C. Wick, Kewaunee, WI (US); Evan Yee, Grafton, WI (US); Andrew Klinger, Sheboygan, WI (US)

(73) Assignee: KOHLER CO., Kohler, WI (US)

( * ) Notice: Subject to any disclaimer, the term of this patent is extended or adjusted under 35 U.S.C. 154(b) by 433 days.

(21) Appl. No.: 17/519,949

(22) Filed: Nov. 5, 2021

(65) Prior Publication Data

US 2022/0056678 A1 Feb. 24, 2022

Related U.S. Application Data

(63) Continuation-in-part of application No. 16/857,705, filed on Apr. 24, 2020, now Pat. No. 11,666,931.

(60) Provisional application No. 62/889,307, filed on Aug. 20, 2019, provisional application No. 62/847,399, filed on May 14, 2019.

(51) Int. Cl.

| | |
|---|---|
| ***E03C 1/046*** | (2006.01) |
| ***B01F 25/314*** | (2022.01) |
| ***B01F 35/88*** | (2022.01) |
| *B01F 101/00* | (2022.01) |

(52) U.S. Cl.
CPC .......... *E03C 1/046* (2013.01); *B01F 25/3143* (2022.01); *B01F 35/8822* (2022.01); *B01F 2101/4505* (2022.01)

(58) Field of Classification Search
CPC ............................... E03C 1/046; E03C 1/0465
USPC .............................................................. 4/596
See application file for complete search history.

(56) References Cited

U.S. PATENT DOCUMENTS

| | | | | |
|---|---|---|---|---|
| 3,106,345 | A | 10/1963 | Wukowitz | |
| 3,476,137 | A * | 11/1969 | Eisendrath | C02F 1/688 137/268 |
| 3,890,657 | A | 6/1975 | Gray | |
| 4,085,868 | A | 4/1978 | Blair | |
| 4,225,085 | A | 9/1980 | Headen et al. | |

(Continued)

FOREIGN PATENT DOCUMENTS

| | | | |
|---|---|---|---|
| CA | 153602 | S | 11/2013 |
| CN | 1347346 | | 5/2002 |

(Continued)

OTHER PUBLICATIONS

Extended Search Report on Patent Application No. 22204931.4 dated May 30, 2023.

(Continued)

*Primary Examiner* — Huyen D Le
(74) *Attorney, Agent, or Firm* — FOLEY & LARDNER LLP

(57) ABSTRACT

A capsule includes an upper body portion and a lower body portion that is coupled to the upper body portion. The lower body portion includes a lower wall that defines a lower opening. The lower body portion and the upper body portion together define an internal cavity. At least one of the upper body portion or the lower body portion includes a plurality of grooves spaced at intervals along a circumferential direction with respect to a central axis of the capsule. The plurality of grooves extends at an angle in a partially axial direction and a partially circumferential direction.

20 Claims, 70 Drawing Sheets

(56) References Cited

U.S. PATENT DOCUMENTS

| | | | | |
|---|---|---|---|---|
| 4,432,105 | A | 2/1984 | Pitroda | |
| 4,971,105 | A | 11/1990 | McGuire | |
| 5,004,158 | A | 4/1991 | Halem et al. | |
| 5,071,070 | A | 12/1991 | Hardy | |
| 5,404,594 | A | 4/1995 | Ring et al. | |
| 6,006,374 | A | 12/1999 | Winnett et al. | |
| 6,045,060 | A | 4/2000 | Hudson | |
| 6,241,884 | B1 * | 6/2001 | Hansen | B29C 39/02 137/268 |
| 6,397,879 | B1 * | 6/2002 | Ring | E03D 9/031 422/264 |
| 6,419,166 | B1 | 7/2002 | Brzezinski et al. | |
| 6,851,626 | B2 | 2/2005 | Patel et al. | |
| 7,156,324 | B2 | 1/2007 | Birrenkott et al. | |
| 8,070,074 | B2 | 12/2011 | Craig | |
| 8,820,660 | B2 | 9/2014 | Ajagbe | |
| D728,363 | S | 5/2015 | Dubos | |
| 9,022,073 | B2 | 5/2015 | Strauli | |
| 9,079,204 | B1 | 7/2015 | Hattenbrun | |
| 9,085,006 | B2 | 7/2015 | Wu et al. | |
| 9,303,392 | B2 | 4/2016 | Strauli | |
| 9,438,977 | B2 | 9/2016 | Wang et al. | |
| 9,821,279 | B2 | 11/2017 | Pasquier et al. | |
| 2002/0070292 | A1 | 6/2002 | Hazenfield | |
| 2007/0119980 | A1 | 5/2007 | Somerfield et al. | |
| 2008/0302885 | A1 * | 12/2008 | O'Brien | E03C 1/046 239/310 |
| 2011/0073137 | A1 | 3/2011 | Dvorak et al. | |
| 2011/0215174 | A1 | 9/2011 | Chen | |
| 2013/0042653 | A1 | 2/2013 | Acharya et al. | |
| 2013/0175350 | A1 | 7/2013 | Marks | |
| 2014/0151464 | A1 | 6/2014 | Cheng | |
| 2016/0088927 | A1 | 3/2016 | Knight | |
| 2017/0201716 | A1 | 7/2017 | Humphries | |
| 2022/0184644 | A1 | 6/2022 | Pasquier et al. | |

FOREIGN PATENT DOCUMENTS

| | | | |
|---|---|---|---|
| CN | 101273854 | | 10/2008 |
| CN | 101454085 | | 6/2009 |
| CN | 204199384 | | 3/2015 |
| CN | 205676979 | | 11/2016 |
| CN | 206120177 | | 4/2017 |
| CN | 106829176 | | 6/2017 |
| DE | 25 29 156 | | 1/1977 |
| DE | 19744063 | | 4/1999 |
| DE | 19744063.0 | A1 | 4/1999 |
| DE | 19744063.3 | A1 | 4/1999 |
| DE | 19744063.9 | A1 | 4/1999 |
| DE | 19744063.9 | C2 | 4/1999 |
| DE | 60 2014 009 711 | T2 | 4/2014 |
| EM | 002336891-0001 | S | 10/2013 |
| EM | 004663078-0001 | S | 1/2018 |
| EM | 008727978-0001 | S | 10/2021 |
| EM | 008740369-0001 | S | 10/2021 |
| EP | 1 252 934 | | 10/2002 |
| EP | 1 474 196 | B1 | 11/2004 |
| FR | 20144248-001 | S1 | 9/2014 |
| FR | 20144273-001 | S1 | 9/2014 |
| FR | 3014696 | B1 | 2/2016 |
| FR | 3062552 | | 2/2017 |
| FR | 2996568 | B1 | 3/2018 |
| FR | 2018400-0001 | S1 | 9/2018 |
| FR | 20184887-001 | S1 | 10/2018 |
| FR | 3068264 | A1 | 1/2019 |
| FR | 3121849 | A1 | 10/2022 |
| GB | 2 019 235 | | 10/1979 |
| GB | 9 004 6630780001 | S | 1/2018 |
| TN | L/2013/0824070001 | S | 10/2013 |
| TN | L/2013/824490001 | S | 10/2013 |
| WO | WO-01/02652 | | 1/2001 |
| WO | WO-2014/053779 | | 4/2014 |
| WO | WO-2017/201716 | A1 | 11/2017 |
| WO | WO-2019/002845 | | 1/2019 |
| WO | WO-2020/243438 | A1 | 12/2020 |

OTHER PUBLICATIONS

Chinese First Office Action on Chinese Patent No. 202010407051.1 dated May 6, 2021 11 pages.

EP Extended European Search Report dated Sep. 23, 2020 (8 pages).

Getting Started—How Aroma Sense Works. Vitamin C Cartridge. 2019. https://www.aromasenseusa.com/get-started/ dated Apr. 29, 2019 (5 pages).

Moen, "INC20803 INLY Aromatherapy Shower Capsule 5-Pack, Sweet Morning," Amazon, retrieved May 17, 2021 from https://www.amazon.com/Moen-INC20803-Aromatherapy-Capsule-Morning/dp/B086CQWR7L (published Mar. 31, 2020), 8 pages.

Office Action, dated Aug. 4, 2020, issued in corresponding Chinese Patent Application No. 201880034837.4 (9 pages).

Search Report re Application No. GB1710233.6 dated Sep. 28, 2017, 3 pages.

The Cirrus Technology. Aromatherapy in Your Shower. 2019. https://cirrus-shower.com/pages/the-cirrus-technology dated Apr. 29, 2019 (4 pages).

UK Search Report Application No. GB1710233.6 dated Sep. 28, 2017(1 page).

Indian Office Action on IN Appl. Ser. No. 202024019431 dated Aug. 25, 2021 (7 pages).

* cited by examiner

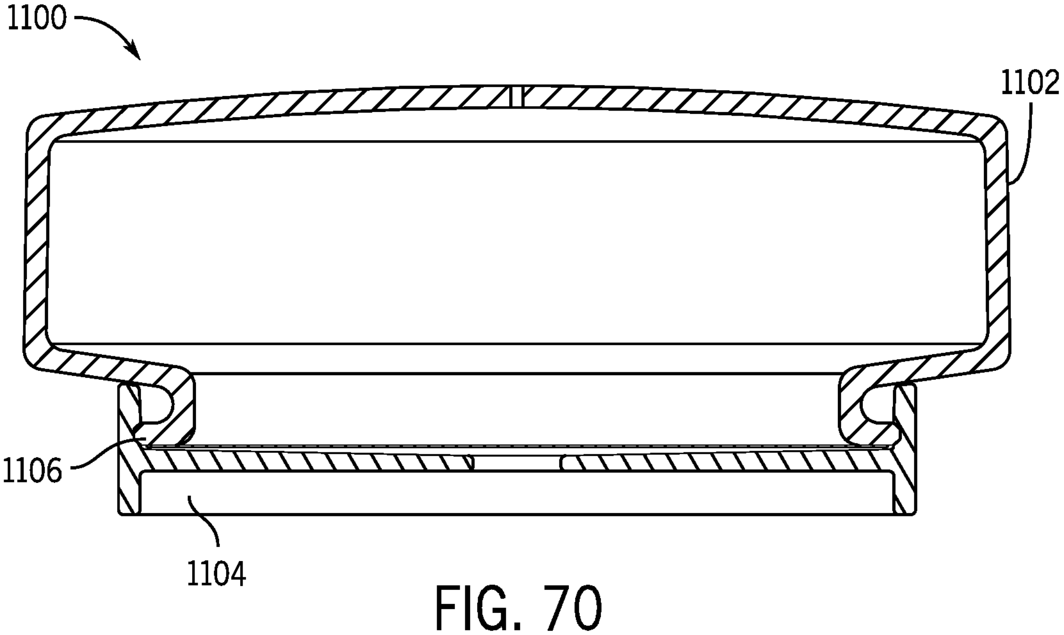
FIG. 70
FIG. 71
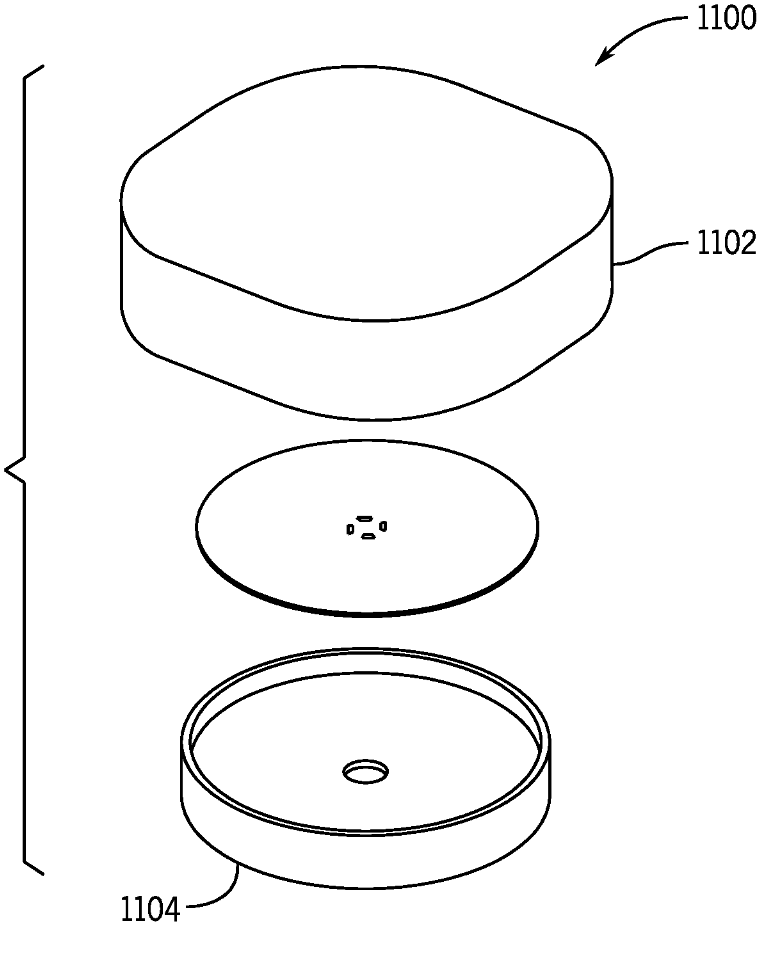

INLINE DISPENSING DEVICE

CROSS-REFERENCE TO RELATED PATENT APPLICATIONS

This application is a Continuation-in-Part of U.S. patent application Ser. No. 16/857,705, filed Apr. 24, 2020, which claims the benefit of and priority to both U.S. Provisional Application No. 62/847,399, filed May 14, 2019, and U.S. Provisional Application No. 62/889,307, filed Aug. 20, 2019. The entire disclosures of each of the aforementioned applications are hereby incorporated by reference herein.

BACKGROUND

The present disclosure relates generally to systems used in a bath or shower environment to improve a user's bathing experience. More specifically, the present disclosure relates to dispensing fluids into an inlet waterway of a shower enclosure.

Dispensing devices exist that introduce a fluid into a flowing stream of water. The fluid may be an aromatic liquid, which may include an essential oil or a mixture of essential oils. The aromatic liquid can be provided to the dispensing device in the form of interchangeable fluid filled capsules, which are installed by a user prior to entering the shower. The dispensing devices fluidly connect the capsule to an inlet waterway of the shower enclosure. Once the user turns the shower on, water entering the capsule from the inlet waterway mixes with the aromatic liquid and is distributed onto the user through a showerhead or handshower. The release of the aromatic liquid typically occurs immediately after the shower is activated. Additionally, because the performance of the device depends on the incoming supply pressure of water from the inlet waterway, the dispense rate and overall user experience created by the injection of the aromatic liquid can vary considerably.

It would be advantageous to provide an improved dispensing device for introducing aromatic liquids and other fluids into an inlet waterway of a shower enclosure that addresses the aforementioned issues.

SUMMARY

One exemplary embodiment of the present disclosure relates to a capsule including an upper body portion and a lower body portion coupled to the upper body portion. The lower body portion includes a lower wall that defines a lower opening. The lower body portion and the upper body portion together define an internal cavity. At least one of the upper body portion or the lower body portion include a plurality of grooves spaced at intervals along a circumferential direction with respect to a central axis of the capsule. At least one of the plurality of grooves extends at an angle in a partially axial direction and a partially circumferential direction.

Another exemplary embodiment of the present disclosure relates to an inline shower device including a housing and a capsule. The housing includes a first engaging portion. The capsule includes a second engaging portion. The second engaging portion is configured to interact with the first engaging portion to detachably couple the capsule to the housing. One of the first engaging portion or the second engaging portion includes a plurality of grooves spaced at intervals along a circumferential direction with respect to a central axis of the housing or the capsule. The plurality of grooves extend at an angle in a partially axial direction and a partially circumferential direction.

Yet another exemplary embodiment of the present disclosure relates to a method of installing a capsule onto a housing of an inline dispensing device. The method includes engaging a plurality of tabs on one of the capsule or the housing with an open end of a plurality of grooves in the other one of the capsule or the housing. The method also includes coupling the capsule to the housing by rotating the capsule with respect to the housing, the rotation causing movement of the capsule in an axial direction toward the housing. Coupling the housing to the capsule includes rotating the capsule by a first angle to engage a pin of the housing with a plunger of the capsule so as to cause movement of the plunger with respect to a body of the capsule, and rotating the capsule by a second angle to disengage the pin with the plunger.

Yet another exemplary embodiment of the present disclosure relates to an inline shower device. The inline shower device includes a housing, a hydraulic chamber, a first actuator, and a fluid-driven piston. The housing includes an outlet port. The hydraulic chamber is disposed within the housing. The first actuator is configured to connect a capsule to the housing and to fluidly connect the capsule to the hydraulic chamber. The fluid-driven piston is disposed within the hydraulic chamber and is configured to dispense a fluid from the capsule into the outlet port.

Yet another exemplary embodiment of the present disclosure relates to an inline shower device. The inline shower device includes a housing, a hydraulic chamber, a capsule, and a fluid-driven piston. The housing includes an outlet port. The hydraulic chamber is disposed within the housing. The capsule is detachably coupled to the housing. The fluid-driven piston is disposed within the hydraulic chamber and is configured to dispense a fluid from the capsule into the outlet port.

Yet another exemplary embodiment of the present disclosure relates to a shower assembly. The shower assembly includes a flow distribution device and an inline shower device. The inline shower device includes a housing, a hydraulic chamber, a first actuator, and a fluid-driven piston. The housing includes an outlet port that is fluidly connected to the flow distribution device. The hydraulic chamber is disposed within the housing. The first actuator is configured to connect a capsule to the housing and to fluidly connect the capsule to the hydraulic chamber. The fluid-driven piston is disposed within the hydraulic chamber and is configured to dispense a fluid from the capsule into the flow distribution device.

BRIEF DESCRIPTION OF THE DRAWINGS

FIG. 70 is a side cross-sectional view of a capsule for an inline shower device, according to another exemplary embodiment.

FIG. 71 is an exploded view of the capsule of FIG. 70.

DETAILED DESCRIPTION

Figure 2:
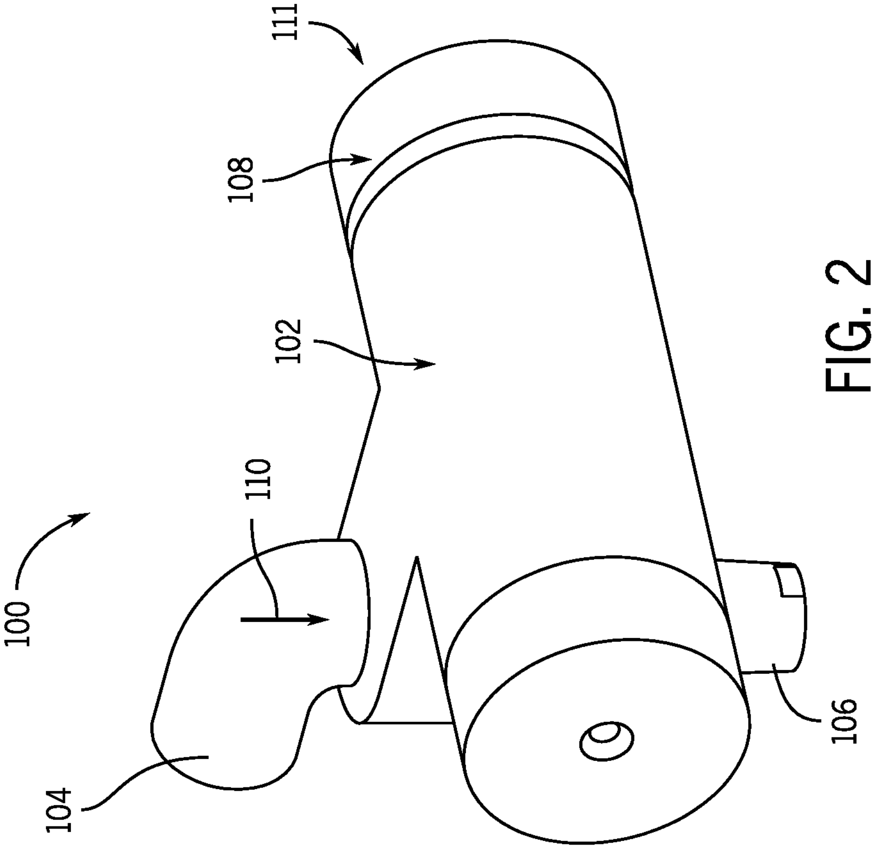
FIG. 2 is a perspective view of the inline shower device of FIG. 1.

Referring generally to the figures, an inline shower device includes a housing, a hydraulic chamber disposed within the housing, and a water-driven piston disposed within the hydraulic chamber. The housing is coupled (via inlet and outlet fittings) to an inlet waterway for a shower enclosure (e.g., upstream of a showerhead or handshower). The hydraulic chamber is configured to receive water from the inlet waterway in order to control a position of the water-driven piston. The inline shower device additionally includes an interchangeable fluid containing capsule, which may contain an aromatic liquid or fragrance. The capsule is detachably coupled to the housing and is fluidly coupled to the hydraulic chamber. The device is configured to dispense the fluid from the capsule into the hydraulic chamber, and from the hydraulic chamber into the inlet waterway, by selectively repositioning the water-driven piston. Among other benefits, the pressure drop across the water-driven piston ensures a consistent delivery rate of the fluid into the inlet waterway.

The device may additionally include a plurality of actuators. A first actuator of the plurality of actuators detachably couples the capsule to the housing. A second actuator of the plurality of actuators causes the fluid from the capsule to be introduced into the flow stream (e.g., from the capsule into the hydraulic chamber, and from the hydraulic chamber into the inlet waterway). Before the second actuator is activated, the fluid from the capsule is isolated from the inlet waterway. Advantageously, the second actuator provides a user with the ability to start dispensing the fluid at any point in time while the shower is operating (i.e. while water is flowing through the showerhead or handshower).

In some implementations, the device includes an orifice between the hydraulic chamber and the inlet waterway. Among other benefits, the orifice helps meter the flow of fluid as it is forced out of the hydraulic chamber by the water-driven piston.

In various exemplary embodiments, the device is configured to provide an indication of a fluid level inside the interchangeable capsule. For example, the capsule may be made from a transparent or substantially transparent material to provide a user with a visual indication of the remaining fluid level in the capsule.

In various exemplary embodiments, the device is configured to pause or stop the delivery of fluid and/or control the flow rate of fluid that is delivered by the device. These and other advantageous features with become apparent to those reviewing the present disclosure and figures.

In various exemplary embodiments, the capsule includes a plurality of grooves (e.g., helical grooves, etc.) spaced at intervals along an outer circumferential surface of the capsule. The grooves may extend at an angle upwardly from a lower edge of the capsule and may engage with a plurality of tabs on the housing that extend radially toward the grooves. In at least one embodiment, the interaction between the grooves and tabs facilitates rotational alignment between the capsule and the housing. During installation, the grooves on the capsule may be brought into rotational alignment with the tabs on the housing. The capsule may be pressed axially toward the housing to fully engage the tabs with the grooves. A user may rotate the capsule with respect to the housing, sliding the tabs along the grooves, to fully interlock the capsule with the housing. The shape of the grooves causes the capsule to move axially toward the housing, engaging a hollow pin in the housing with a plunger in the capsule. The axial movement presses the pin against the plunger, which displaces the plunger to fluidly connect the interior of the capsule to the housing. Beneficially, the angled geometry of the grooves facilitate a smooth installation of the capsule into the housing, which may be more user friendly as compared to other installation techniques. The installation method may also reduce the force required to move the plunger with respect to the capsule as compared to manually pressing the capsule against the pin.

In some embodiments, the capsule includes a rib or indicator line that, in combination with corresponding indicators on the housing, provides a visual aid to a user to facilitate installation and removal operations. The grooves may also include an inverted ramp and at an innermost end of the groove that, when engaging the tabs, provides a tactile feedback to the user and prevents inadvertent decoupling of the capsule from the housing. In other embodiments, the position of the grooves and the tabs may be reversed (e.g., the grooves may be positioned on the housing and the tabs on the capsule).

The plunger may extend through axially aligned openings along an upper and lower wall of the capsule and may sealingly engage the upper and lower wall to prevent fluid from leaking out of the capsule. The plunger may also include a vent proximate an upper end of the plunger to allow fluid to drain from the capsule when the capsule is fully installed onto the housing. In some embodiments, the plunger also includes a flange extending radially outward from an outer surface of the plunger proximate to an upper or lower end of the plunger. The flange may be engageable with the capsule to allow a user to reinsert the plunger into the capsule after use to reseal the capsule (e.g., to prevent any remaining fluid from leaking out of the capsule, when interchanging a first capsule with a second capsule containing a different fragrance, so that the capsule may be reused at a later date, etc.).

An exemplary embodiment of the present disclosure is an inline shower device. The inline shower device includes a housing, a hydraulic chamber, a capsule, and a water-driven piston. The hydraulic chamber is disposed within the housing and is fluidly coupled to an inlet waterway of a shower enclosure. The capsule is detachably coupled to the housing. The water-driven piston is disposed within the hydraulic chamber. The water-driven piston is configured to cause a fluid to be dispensed from the capsule into the inlet waterway.

In some embodiments, the inline shower device additionally includes a plurality of valves configured to selectively control the flow of water from the inlet waterway to a first side and a second side of the piston. In any of the above embodiments, the inline shower device may additionally include an orifice. A first side of the orifice may be fluidly coupled to the hydraulic chamber. A second side of the orifice may be fluidly coupled to the inlet waterway.

Another embodiment of the present disclosure is a method of dispensing a fluid into an inlet waterway of a shower. The method includes dispensing a first fluid from the inlet waterway into a hydraulic chamber on a first side of a piston. The method additionally includes applying a fluid pressure to the first side of the piston to move the piston and to draw a second fluid into the hydraulic chamber. The method further includes dispensing the first fluid from the inlet waterway into the hydraulic chamber on a second side of the piston. The method also includes applying a fluid pressure to the second side of the piston to move the piston and to eject the second fluid from the hydraulic chamber and into the inlet waterway.

Figure 1:
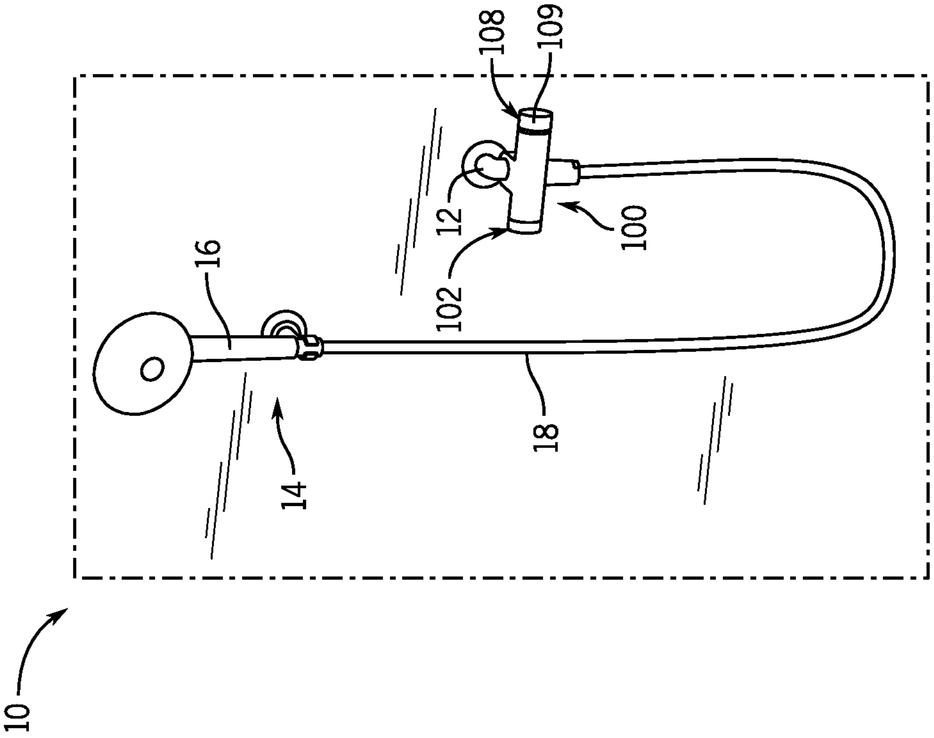
FIG. 1 is a perspective view of a shower enclosure including an inline shower device, according to an exemplary embodiment.

Referring to FIG. 1, a shower enclosure 10 is shown according to an exemplary embodiment. The shower enclosure 10 may be a standalone shower stall or a bathtub with a shower curtain or a door. The shower enclosure 10 includes an inlet waterway 12, an inline shower device (e.g., an inline dispensing device), shown as dispensing device 100, and a handshower 14 (according to other exemplary embodiments, the shower enclosure may include both one or more fixed showerheads and a removable handshower or may include only one or more fixed showerheads). The inlet waterway 12 may be a fluid conduit that is coupled to a commercial or residential (e.g., household) water supply line.

As shown in FIG. 1, the handshower 14 includes a hand sprayer 16 and a flexible conduit 18 that fluidly couples the hand sprayer 16 to the dispensing device 100. The hand sprayer 16 may be mounted to a shower rail or at a fixed position along an inner wall of the shower enclosure 10. In other embodiments, the shower enclosure 10 includes a showerhead mounted at a fixed position along the inner wall of the shower enclosure 10.

The dispensing device 100 is disposed between the handshower 14 and the inlet waterway 12 of the shower enclosure 10. The dispensing device 100 includes a housing 102. The housing includes an inlet port 104 that is fluidly coupled to the inlet waterway 12 and an outlet port 106 that is fluidly coupled to the handshower 14 (e.g., the flexible conduit 18). The inlet port 104 and the outlet port 106 may include threaded connectors, quick-connect fittings, or the any other suitable fastener to provide a water-tight seal along the flow path between the inlet waterway 12 and the handshower 14. The dispensing device 100 may be disposed at any location upstream of the handshower 14 or a showerhead. For example, the dispensing device 100 may be coupled to a supply elbow configured to redirect water from the inlet waterway to the handshower 14 or showerhead. In other embodiments, the dispensing device 100 may be coupled to a bar valve, a hydrorail for a shower column assembly, or another suitable location. In yet other embodiments, the dispensing device 100 may be used with another bathroom, household, or commercial plumbing fixture. For example, the dispensing device 100 may be disposed upstream of a faucet outlet of a bathtub.

The dispensing device 100 is configured to dispense a fluid into the inlet waterway 12 upstream of the handshower 14 (or according to other embodiments, of a showerhead or another plumbing fixture) in order to improve a user's overall bathing experience. As shown in FIGS. 1-2, the housing 102 is a generally cylindrically-shaped body. The housing 102 is oriented substantially perpendicular to a flow direction 110 through the inlet port 104 and the outlet port 106 (e.g., a flow direction at a location where the inlet port 104 and the outlet port 106 engage with the housing 102). In other embodiments, the shape and/or arrangement of the housing 102 may be different. The dispensing device 100 includes an interchangeable capsule, shown as capsule 108 that is coupled to a first end 111 of the housing 102 in substantially coaxial arrangement with the housing 102. In the embodiment of FIG. 2, the capsule 108 is a cylindrically-shaped canister (e.g., container, shell, etc.). An outer diameter of the capsule 108 is approximately the same as an outer diameter of the housing 102.

As shown in FIG. 1, the capsule 108 includes a hollow portion 109 configured to receive a fluid therein. The fluid may include, for example, an aromatic liquid including essential oils or a mixture of essential oils. The aromatic liquid may emit any one of a plurality of different fragrances (e.g., lavender, vanilla, eucalyptus, peppermint, etc.). Alternatively, or in combination, the fluid may include a soap or other cleaning agent, a lotion, or any other liquid that could be introduced into the flow stream.

The capsule 108 may be formed from a variety of water impermeable materials. In an exemplary embodiment, the capsule 108 and/or dispensing device 100 includes an indicator that quantifies an amount of fluid remaining in the capsule 108. For example, the capsule 108 may be molded or otherwise formed from a transparent or semi-transparent plastic material, which, advantageously, provides a visual indication of the amount of fluid remaining within the capsule 108 and serves to alert a user of when the capsule 108 needs to be replaced.

Figure 3:
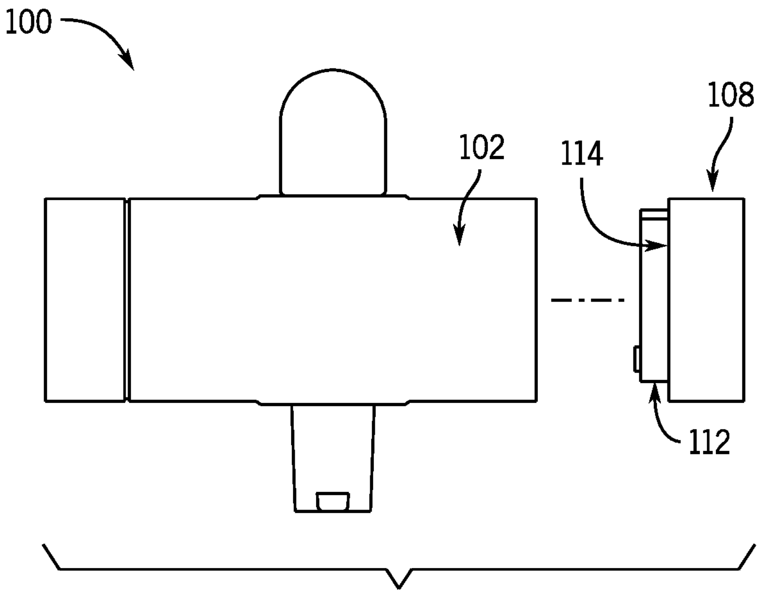
FIG. 3 is a front exploded view of the inline shower device of FIG. 1.
Figure 4:
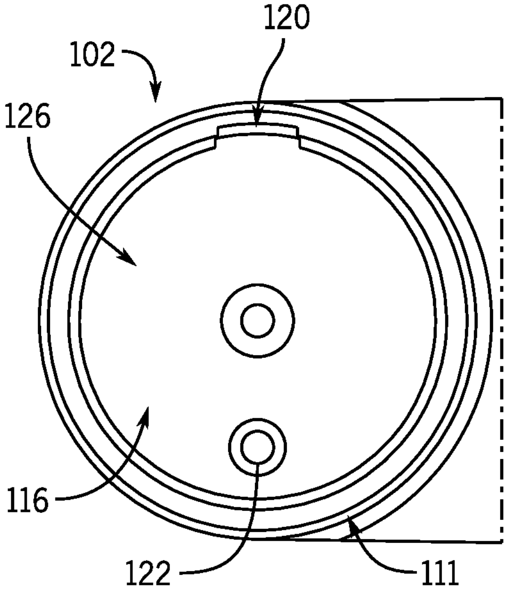
FIG. 4 is a side view of the inline shower device of FIG. 1 isolated from a capsule, according to an exemplary embodiment.
Figure 5:
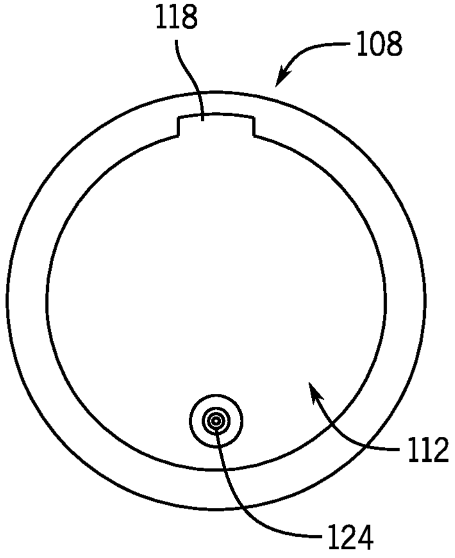
FIG. 5 is a side view of a capsule for the inline shower device of FIG. 1.

As shown in FIGS. 2 and 3, the capsule 108 is detachably coupled to a first end 111 of the housing 102. FIG. 3 shows a front view of the dispensing device 100 with the capsule 108 separated from the housing 102. FIG. 4 shows a side view of the capsule 108. The capsule 108 includes a cylindrical protrusion 112 extending from an outer surface 114 (e.g., a side surface) of the capsule 108 in a substantially perpendicular orientation relative to the outer surface 114. As shown in FIG. 4, the housing 102 includes a recessed area 116 configured to receive the protrusion 112 therein. The housing 102 and/or the protrusion 112 may additionally include a locating member 118 configured to orient or position the capsule 108 with respect to the housing 102. FIG. 5 shows a side view of the capsule 108. In the embodiment of FIG. 5, the locating member 118 is an extension that extends radially outward from the protrusion 112 (e.g., relative to a central axis of the protrusion 112). The housing includes a slot 120 (e.g., recessed cut, keyway, etc.) configured to receive the protrusion 112 therein. The locating member 118 is structured to engage with the slot 120 to align a rotational position of the capsule 108 with respect to the housing 102 (in order to align an outer valve 122 of the dispensing device 100 with a fluid port 124 on the capsule 108).

As shown in FIG. 4, an inner surface (e.g. a lower surface) of the recessed area 116 is at least partially defined by a planar diaphragm 126. The diaphragm 126 helps to seal the capsule 108 to the housing 102 and fluidly couples the capsule 108 to other areas within the housing 102.

Figure 6:
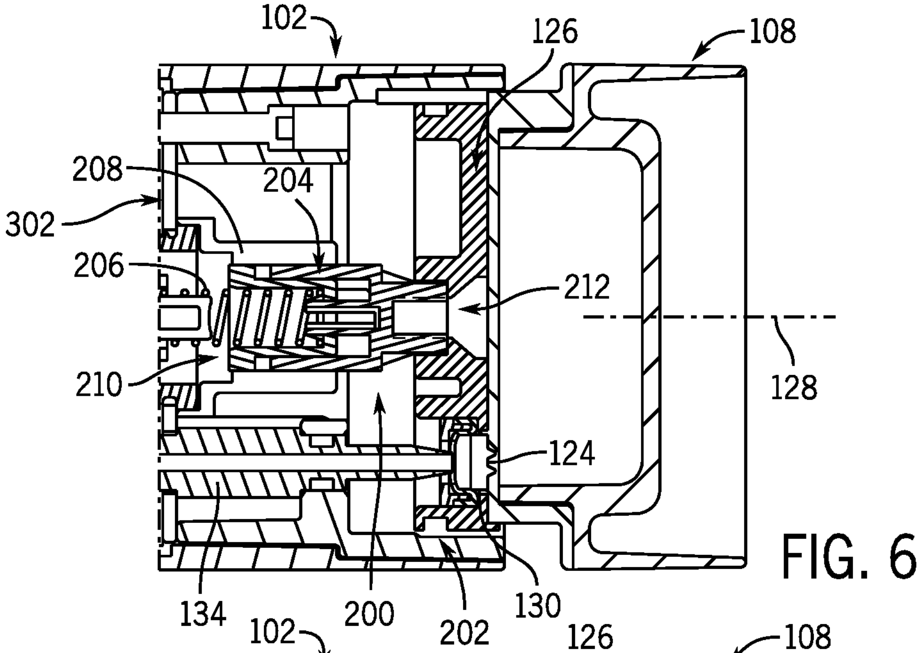
FIG. 6 is a front cross-sectional view of the inline shower device of FIG. 1 during a first portion of a capsule installation operation, according to an exemplary embodiment.

FIGS. 6-10 provide a conceptual illustration of an installation operation for the capsule 108. As shown in FIG. 6, the diaphragm 126 forms part of a first actuator 200 that is structured to fluidly couple the capsule 108 to the housing 102. The first actuator 200 additionally includes an insert 202, an intermediate connector 204, and a spring 206. The insert 202 is a hollow sleeve that at least partially defines the recessed area 116 (see FIG. 4) into which the capsule 108 is received. An outer diameter of the insert 202 may be slightly less than an inner diameter of the housing 102 in order to provide a friction fit between the insert 202 and the housing 102, and thereby secure the insert 202 in position relative to the housing 102. A central portion 208 of the insert 202 (e.g., which may be a separate piece from the remainder of the insert 202) is threadably coupled to the housing 102 (e.g., to a cartridge 302 that is coupled to the housing 102). As shown in FIG. 6, a first end 210 of the intermediate connector 204 is slidably engaged with the central portion 208. A second end 212 of the intermediate connector 204 is coupled (e.g., via screws, bolts, or another suitable fastener) to the diaphragm 126 proximate to a central position along the diaphragm 126 (e.g., proximate to a central axis of the diaphragm 126).

Figure 7:
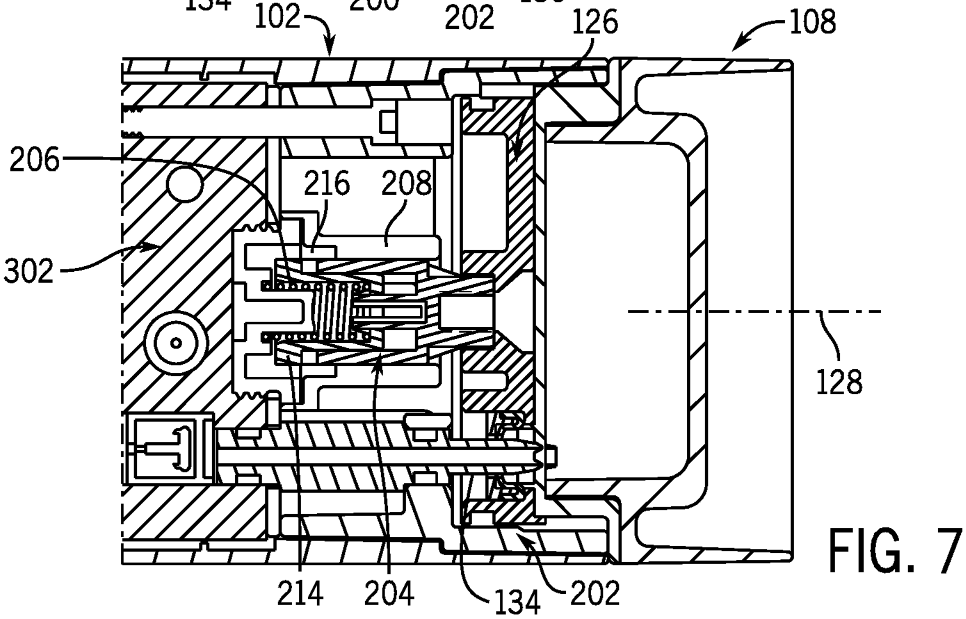
FIG. 7 is a front cross-sectional view of the inline shower device of FIG. 1 during a second portion of a capsule installation operation, according to an exemplary embodiment.

The first actuator 200 may be configured to selectively reposition the diaphragm 126 along a central axis 128 of the housing 102. In other words, the first actuator 200 may be configured to set an axial position of the diaphragm 126 with respect to the housing 102. As shown in FIG. 7, the intermediate connector 204 includes a plurality of teeth 214 disposed along an outer perimeter of the intermediate connector 204 at the first end 210 of the intermediate connector 204. The teeth 214 are slidably engaged with a plurality of slots 216, which are machined or otherwise formed into the central portion 208 of the insert 202. The depth of each one of the slots 216 varies along a perimeter of the central portion 208. The axial position of the intermediate connector 204 along the central axis 128 of the housing 102 may be determined based on the alignment between the teeth 214 and the slots 216.

As shown in FIG. 7, the teeth 214 are urged into position within the slots 216 by the spring 206, which applies a force to the intermediate connector 204 that is directed outwardly toward the capsule 108 (e.g., in substantially parallel orientation relative to the central axis 128 of the housing 102). The first actuator 200 is structured so that the alignment between the teeth 214 and the slots 216 changes each time the diaphragm 126 is depressed into the housing 102. It follows that the axial position of the diaphragm 126 changes each time the diaphragm 126 is depressed. Advantageously, the structure of the first actuator 200 (engagement and/or disengagement between the teeth 214 and the slots 216) provides an audible indication (e.g., a clicking sound) that the diaphragm 126 has been depressed, which, advantageously, alerts a user to any changes in the axial position of the diaphragm 126.

Figure 8:
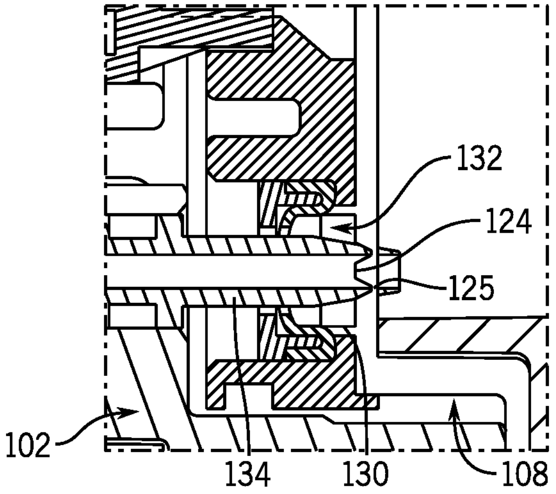
FIG. 8 is a reproduction of FIG. 7 near an end of a hollow pin.

As shown in FIG. 6, the capsule 108 is brought into engagement with the diaphragm 126 (e.g., by a user) such that a planar outer surface of the capsule 108 contacts the diaphragm 126. Contact between the diaphragm 126 and the capsule 108 provides a water-tight seal that prevents fluid from leaking into an environment surrounding the dispensing device 100. The capsule 108 additionally includes a tab 130 extending away from the planar outer surface in substantially perpendicular orientation relative to the planar outer surface. As shown in FIG. 8, the tab 130 substantially surrounds a fluid port 124 on the capsule 108. The diaphragm 126 includes a recessed portion 132 sized to receive the tab 130 therein. An outer diameter of the tab 130 is slightly less than an inner diameter of the recessed portion 132 in order to provide a friction fit between the tab 130 and the recessed portion 132, which helps to secure the capsule 108 in position with respect to the diaphragm 126. Engagement between the tab 130 and the recessed portion 132 also improves sealing between the capsule 108 and the diaphragm 126.

FIGS. 7-8 show the dispensing device 100 after the diaphragm 126 has been fully depressed into the housing 102. As shown in FIG. 7, the diaphragm 126 translates along the central axis 128 of the housing 102 along with the capsule 108. As the diaphragm 126 is depressed, a hollow pin 134 penetrates through the outer valve 122 in the diaphragm 126. The outer valve 122 may be a silicon valve or any other type of deformable valve. The outer valve 122 is configured to prevent fluid from leaking from the capsule 108 (or from the hollow pin 134) into other portions of the housing 102 (and from the hollow pin 134 into the surrounding environment when the capsule 108 is separated from the housing 102). As the diaphragm 126 is depressed farther into the housing 102, the hollow pin 134 is drawn into the capsule 108. Specifically, the hollow pin 134 is drawn through the fluid port 124 on the capsule 108, which may be structured to shear or perforate in response to an applied force from the hollow pin 134. In the exemplary embodiment of FIG. 8, the fluid port 124 includes a thin-walled section 125 proximate to where the hollow pin 134 engages the capsule 108. Thus, depressing the diaphragm 126 against the capsule 108 creates a fluid path from the capsule 108 to other parts of the dispensing device 100.

Figure 9:
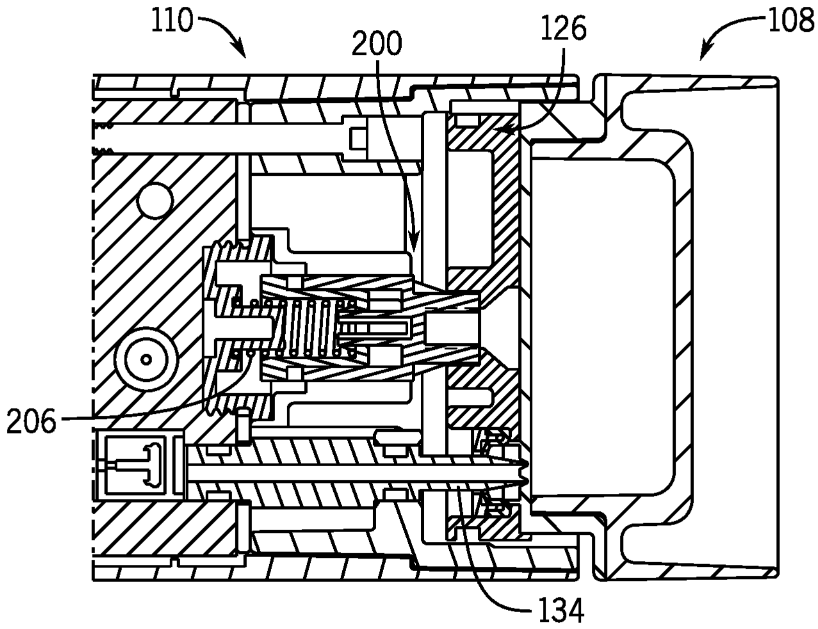
FIG. 9 is a front cross-sectional view of the inline shower device of FIG. 1 after installation of a capsule, according to an exemplary embodiment.
Figure 10:
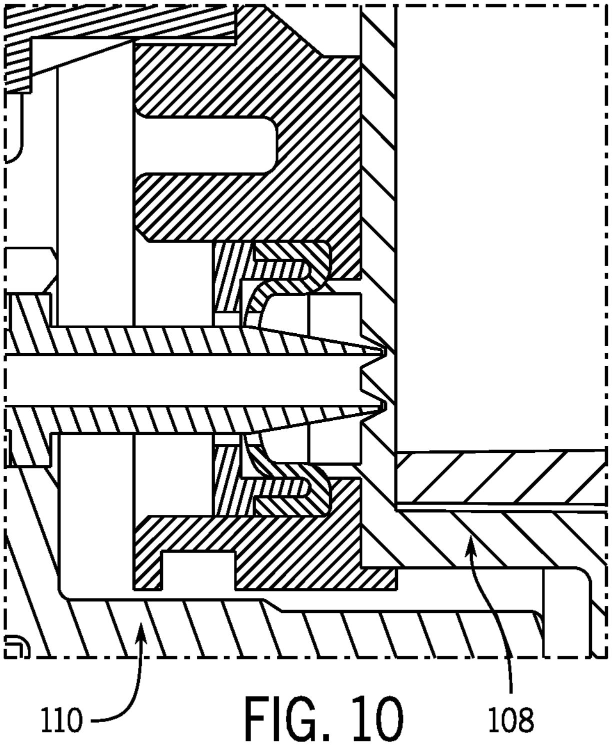
FIG. 10 is a reproduction of FIG. 9 near an end of a hollow pin.

FIGS. 9-10 show the relative position of the capsule 108 with respect to the housing 102 after removing an applied force from the capsule 108. As shown in FIG. 9, the first actuator 200 allows for a slight return of the capsule 108 away from the housing 102 in response to a counteracting force applied by the spring 206. To remove the capsule 108 after use, the capsule 108 and the diaphragm 126 are again depressed toward the housing 102 and then released. The diaphragm 126 will return to its initial axial position (FIG. 6) in which a surface of the diaphragm 126 is approximately flush with the first end of the housing 102. The hollow pin 134 is sealed off beneath the outer valve 122 (e.g., the silicon valve is closed) to prevent any residual fluid from leaking out of the hollow pin 134.

Figure 11:
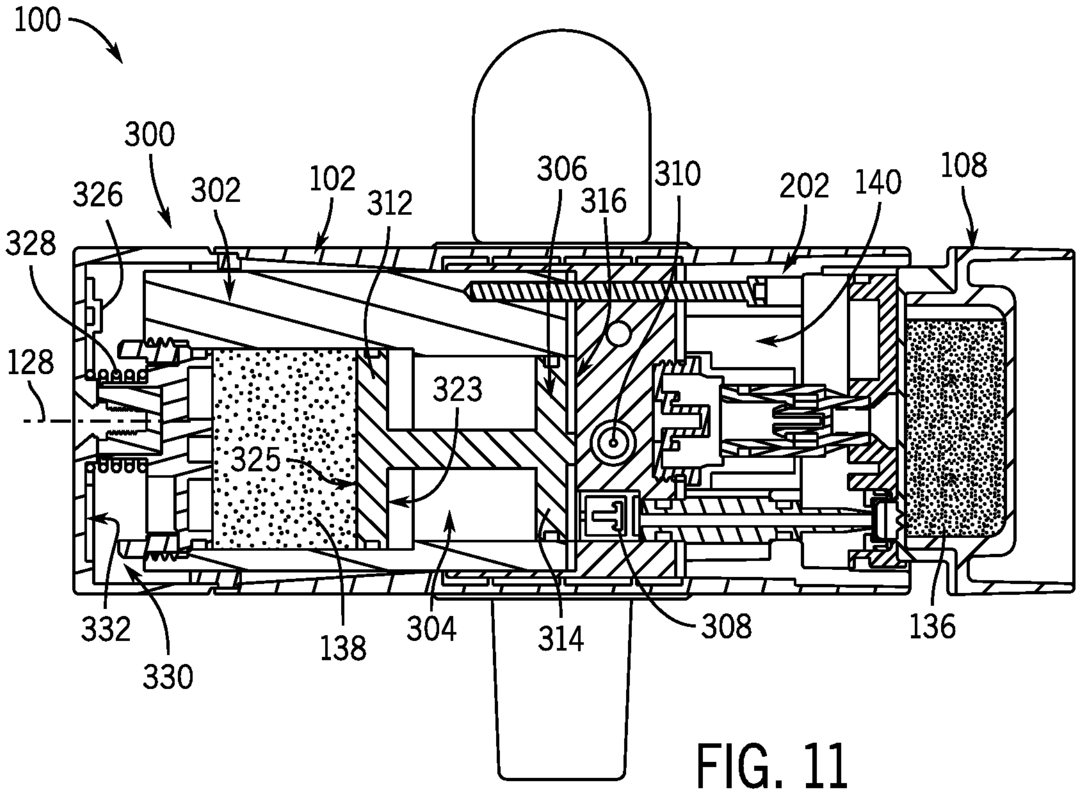
FIG. 11 is a front cross-sectional view of the inline shower device of FIG. 1 in operation before a capsule is installed, according to an exemplary embodiment.
Figure 12:
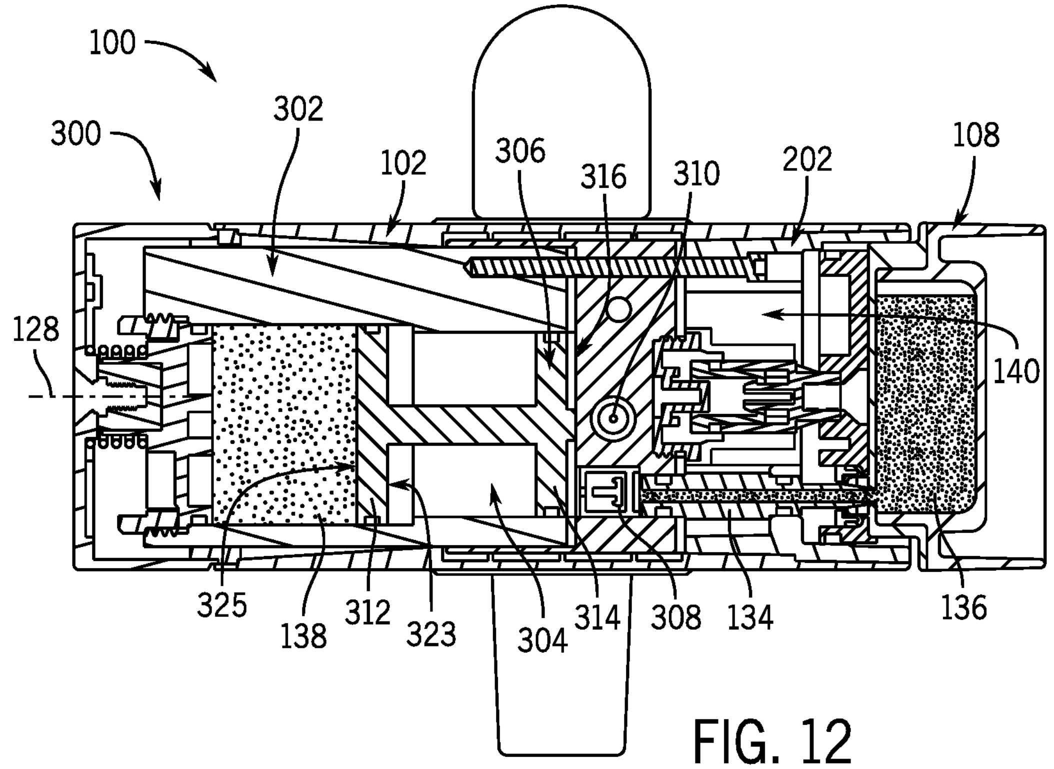
FIG. 12 is a front cross-sectional view of the inline shower device of FIG. 1 in operation after a capsule is installed, according to an exemplary embodiment.

The dispensing device 100 allows a user to control a time at which the fluid is released from the capsule 108 into the inlet waterway 12 (see also FIG. 1). The fluid is released from the capsule 108 by controlling the flow of water into and out of the dispensing device 100. FIGS. 11-12 show front cross-sectional views of the dispensing device 100, in different states of assembly. The dispensing device 100 includes a second actuator 300 that may be manually manipulated to draw a fluid 136 out of the capsule 108 and to dispense the fluid 136 into the inlet waterway 12. The second actuator 300 includes a cartridge 302 that is at least partially disposed within a hollow interior of the housing 102. The cartridge 302 may be formed as a separate piece from the housing 102 and may be detachably coupled to the housing 102. Alternatively, the cartridge 302 may be permanently affixed to the housing 102 (e.g., using a stepped transition in the inner diameter of the housing 102 as shown in FIGS. 11-12, or glue or another adhesive product). As shown in FIGS. 11-12, an outer diameter of the cartridge 302 is slightly smaller than an inner diameter of the housing 102 in order to provide a friction fit between the cartridge 302 and the housing 102. The cartridge 302 is also coupled to the insert 202 (e.g., using a screw or any other suitable fastener).

As shown in FIGS. 11-12, the cartridge 302 defines a hydraulic chamber 304 configured to receive water 138 from the inlet waterway 12 and fluid 136 from the capsule 108. The hydraulic chamber 304 is shaped as a cylindrical passage that extends through the cartridge 302 in substantially parallel orientation relative to a central axis of the cartridge 302 (and also the central axis 128 of the housing 102). An inner diameter of the hydraulic chamber 304 decreases approximately midway between a first end of the hydraulic chamber 304 and a second end of the hydraulic chamber 304. In other words, there is a stepwise change in the inner diameter of the hydraulic chamber 304 such that the inner diameter is reduced at axial positions that are farther away from an outer end of the cartridge 302.

As shown in FIGS. 11-12, the dispensing device 100 additionally includes a water-driven piston 306, a check valve 308, and an orifice 310. The water-driven piston 306 is disposed within the hydraulic chamber 304. The water-driven piston 306 includes a first piston head 312 disposed proximate to an outer end of the hydraulic chamber 304 (e.g., the outer end of the cartridge 302) and a second piston head 314 disposed proximate to a base wall 316 (e.g. lower wall) of the hydraulic chamber 304. The second piston head 314 is substantially parallel to the first piston head 312 and is spaced a distance apart from the first piston head 312. The first piston head 312 is coupled to the second piston head 314 by a connecting member 318 (e.g., shaft, rod, etc.) that extends in a substantially parallel orientation relative to the central axis 128 of the housing 102 (e.g., in a substantially perpendicular orientation relative to both the first piston head 312 and the second piston head 314). As shown in FIGS. 11-12, the first piston head 312 and the second piston head 314 are sealingly engaged with the hydraulic chamber 304 (e.g., via an O-ring, gasket, or another suitable sealing member).

FIG. 11 shows the dispensing device 100 in operation just before installing the capsule 108. FIG. 12 shows the dispensing device 100 after fully installing the capsule 108. As shown in FIG. 12, the fluid 136 from the capsule 108 is allowed to pass through a passageway defined by the hollow pin 134. The passageway guides (e.g., directs) the fluid 136 toward the hydraulic chamber 304 through the check valve 308. The check valve 308 is disposed in a recessed portion of the cartridge 302 proximate to the base wall 316 of the hydraulic chamber 304. A first end of the check valve 308 (e.g., an outlet of the check valve 308) is approximately flush with the base wall 316. In the exemplary embodiment of FIGS. 11-12, the check valve 308 is a one-way valve configured to prevent the fluid 136 and/or water 138 from flowing back into the capsule 108.

The orifice 310 is disposed in the cartridge 302 just above the check valve 308. A first end of the orifice 310 is fluidly coupled to the hydraulic chamber 304. A second end of the orifice 310 is fluidly coupled to the inlet waterway 12 (e.g., to the outlet port 106 of the housing 102). In various exemplary embodiments, the orifice 310 is sized to meter the flow of fluid 136 leaving through the outlet port 106, which, advantageously, ensures a consistent delivery rate of the fluid 136 into the inlet waterway 12. In other embodiments, the orifice 310 may be replaced with another form of flow control and/or metering device (e.g., a throttle valve, etc.).

Figure 13:
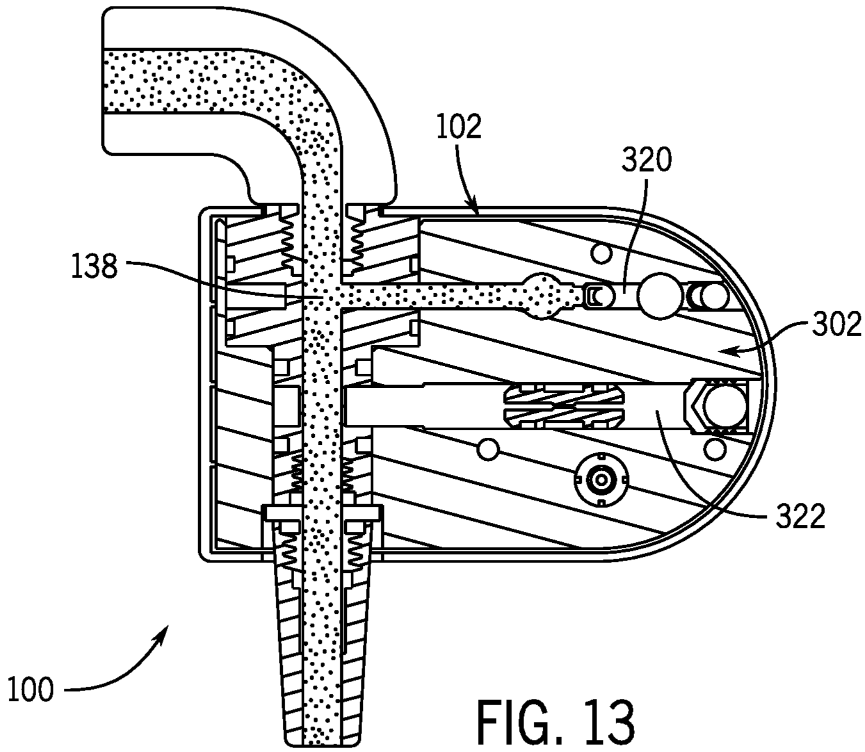
FIG. 13 is a side cross-sectional view of the inline shower device of FIG. 12.
Figure 14:
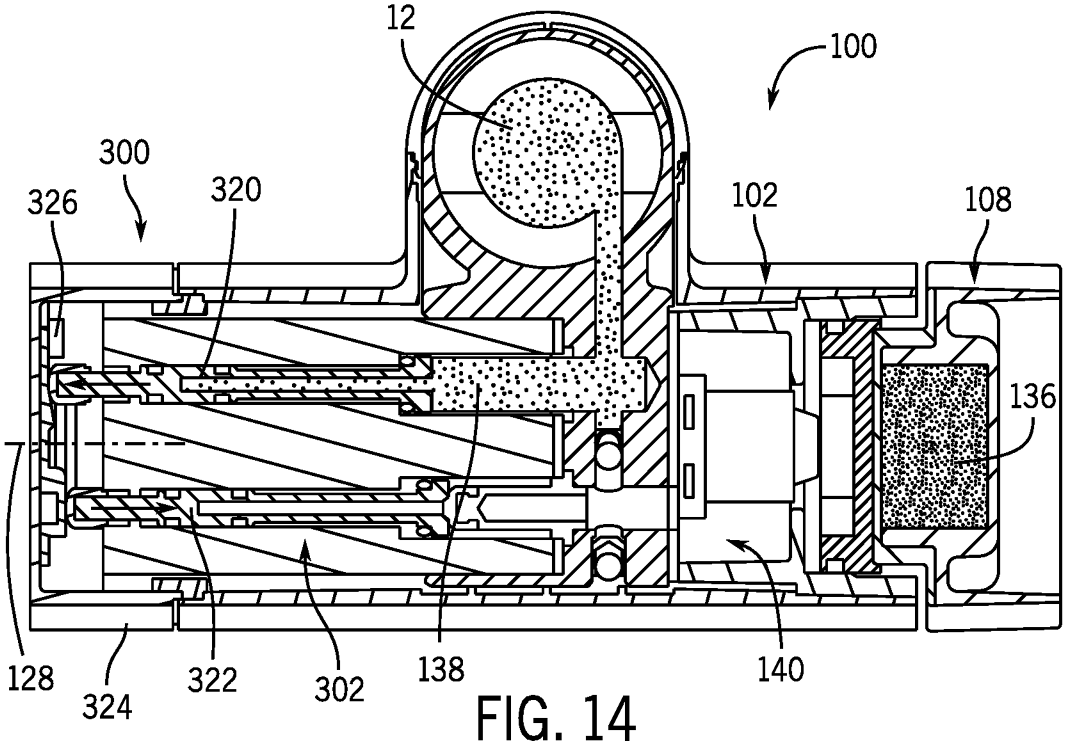
FIG. 14 is a top cross-sectional view of the inline shower device of FIG. 12.

FIGS. 13-14 show a side cross-sectional view and top cross-sectional view, respectively, through the dispensing device 100. As shown in FIGS. 13-14, the dispensing device 100 further includes a plurality of flow control valves, shown as first valve 320 and second valve 322. Both the first valve 320 and the second valve 322 are coupled to the cartridge 302 and extend in a substantially parallel orientation relative to the central axis 128 of the housing 102. In the embodiment of FIG. 14, the first valve 320 is disposed above the second valve 322. In various exemplary embodiments, the first valve 320 and the second valve 322 are flow switching valves (e.g., spring loaded flow switching valves that allow fluid to pass through the valve in one of two directions).

The first valve 320 and the second valve 322 are configured to selectively introduce water 138 to and/or remove water 138 from different portions of the hydraulic chamber 304. For example, as shown in FIGS. 11, 13, and 14, the first valve 320 is configured to fluidly couple the inlet waterway 12 (e.g., the inlet port 104) to the hydraulic chamber 304 on either a first side 323 of the water-driven piston 306 (e.g., a right side as shown in FIG. 11) or a second side 325 of the water-driven piston 306 (e.g., a left side as shown in FIG. 11), depending on an operating state of the first valve 320. The second valve 322 is configured to fluidly couple a hollow space 140 on a capsule side of the dispensing device 100 (e.g., a hollow portion of the insert 202) to either the first side 323 or the second side 325, depending on an operating state of the second valve 322.

As shown in FIG. 14, each of the first valve 320 and the second valve 322 may be actuated to control a position of the water-driven piston 306. The second actuator 300 includes a knob 324 disposed on a second end of the housing 102 in substantially coaxial arrangement with the housing 102. The knob 324 is rotatably coupled to the housing 102 such that the knob 324 can rotate with respect to the housing 102. In other embodiments, the knob 324 may be replaced by a lever, switch, handle, or another form of actuator. As shown in FIG. 11, the second actuator 300 additionally includes a cam 326 and a torsion spring 328. The cam 326 is disposed within a recessed portion 330 of the knob 324 along an inner surface 332 of the recessed portion 330. The cam 326 is engaged with each of the first valve 320 and the second valve 322 and sets an axial position of both the first valve 320 and the second valve 322 with respect to the cartridge 302. As shown in FIG. 14, a height of the cam 326 (in a direction substantially parallel to the central axis 128 of the housing 102) varies with angular position along a surface of the cam 326.

The torsion spring 328 is coupled to the knob 324 and is configured to apply a torque to the knob 324 to urge the knob 324 toward a first rotational position with respect to the housing 102. In the first position, as shown in FIG. 14, the first valve 320 is allowed to extend out toward the knob 324, while the second valve 322 is depressed inward toward the capsule side of the dispensing device 100.

The structure of the second actuator 300 described with reference to FIGS. 11 and 14 should not be considered limiting. Various alternatives are possible without departing from the inventive concepts disclosed herein. For example, in some implementations, the position of the knob 324 may be tied or otherwise coupled to the position of the water-driven piston 306 such that the return of the knob 324 is driven by the translation of the water-driven piston 306 within the hydraulic chamber 304. In other embodiments, the housing 102 and/or knob 324 may include detents to retain (e.g., hold, secure) the knob 324 in at least one predefined rotational position with respect to the housing 102 (e.g., in a partially open position or fully open position). Among other benefits, using detents and/or coordinating the position of the knob 324 with the position of the water-driven piston 306 could allow a user to selectively control an amount of fluid 136 that is introduced into the hydraulic chamber 304 from the capsule 108.

Figure 15:
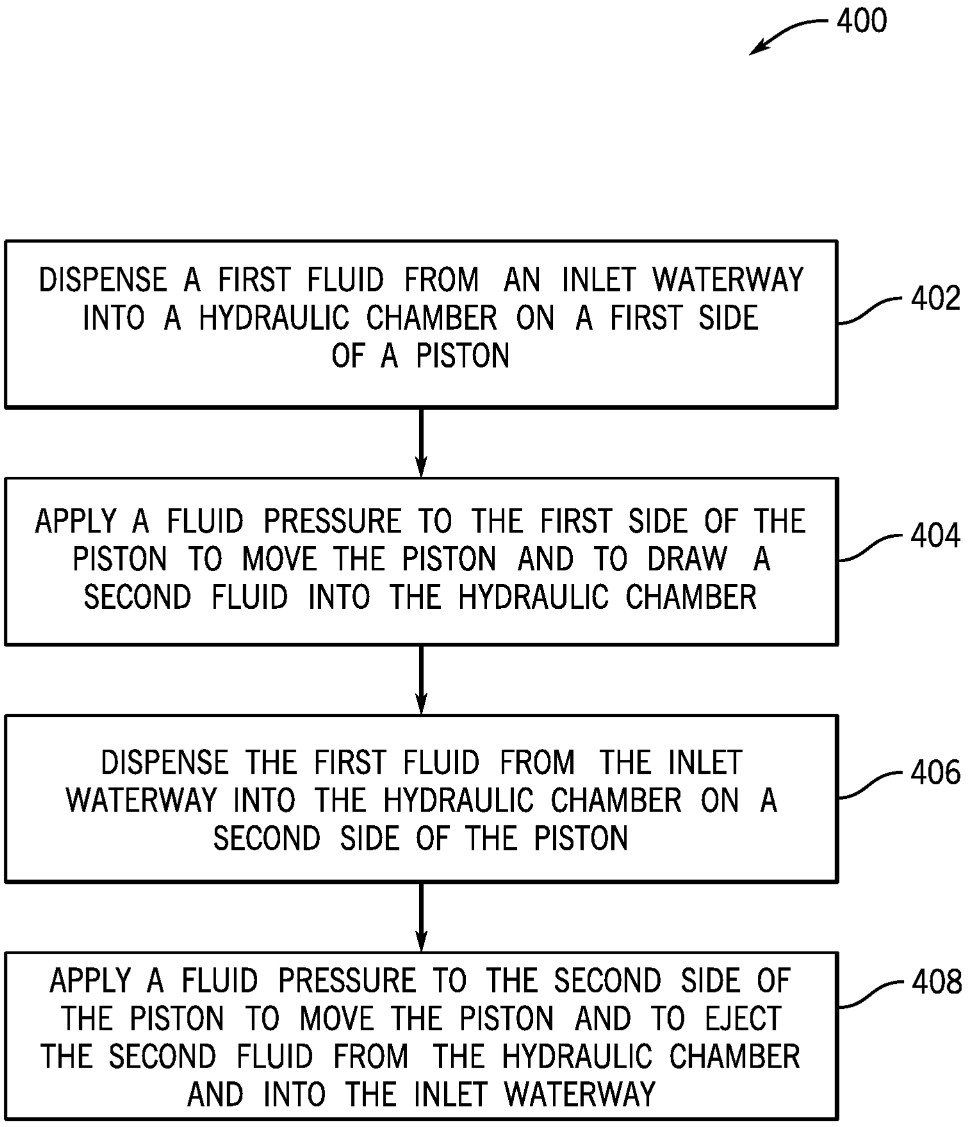
FIG. 15 is a flow diagram of a method of dispensing fluid into an inlet waterway of a shower enclosure, according to an exemplary embodiment.
Figure 16:
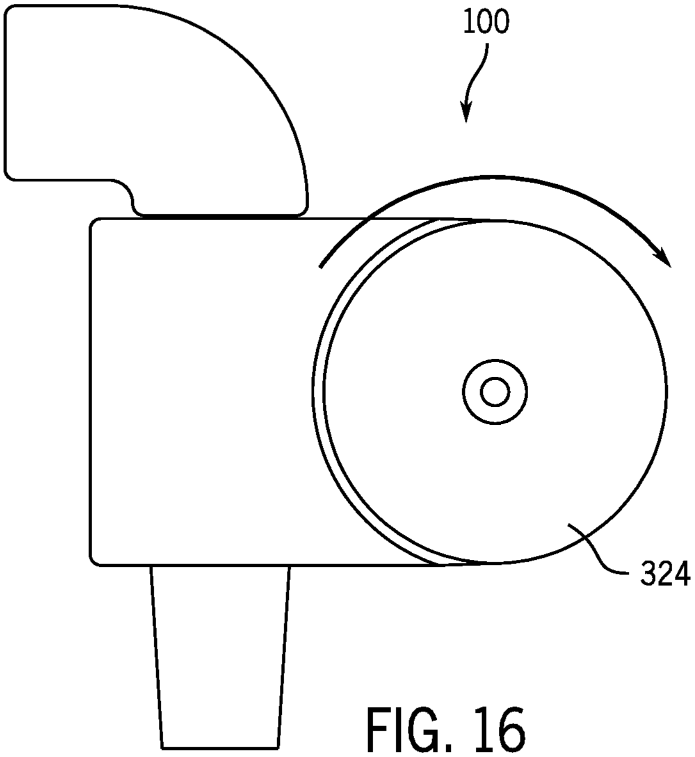
FIG. 16 is a side view of an inline shower device in operation after manipulating an actuator, according to an exemplary embodiment.
Figure 17:
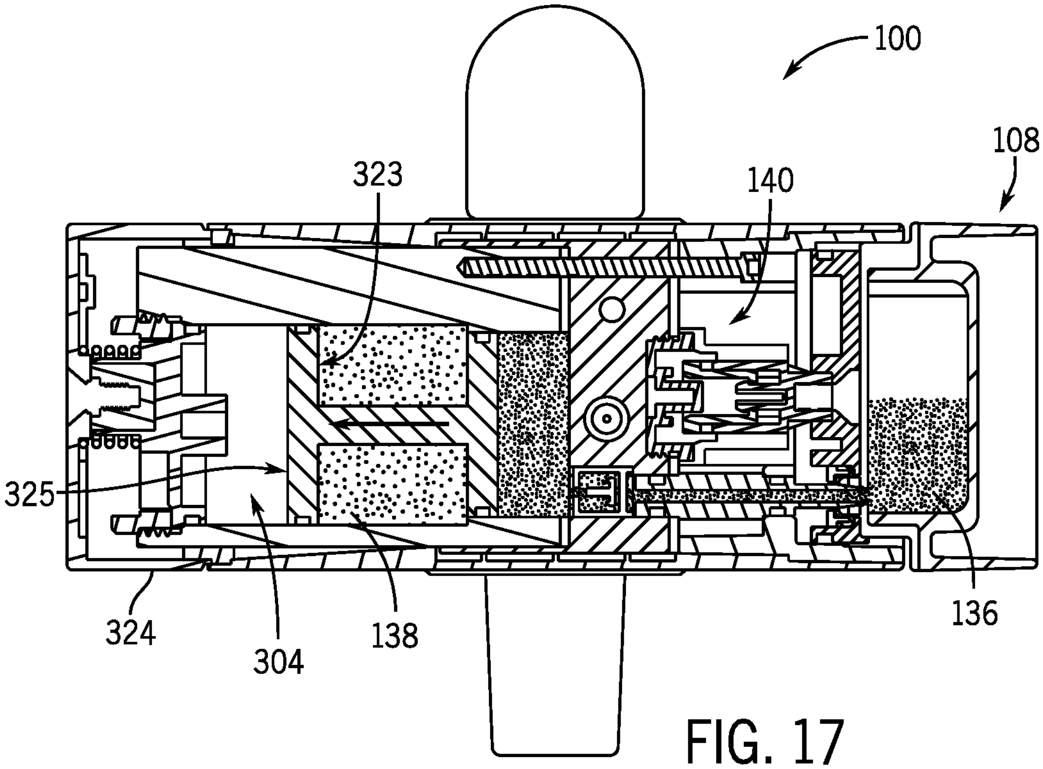
FIG. 17 is a front cross-sectional view of the inline shower device of FIG. 16.
Figure 18:
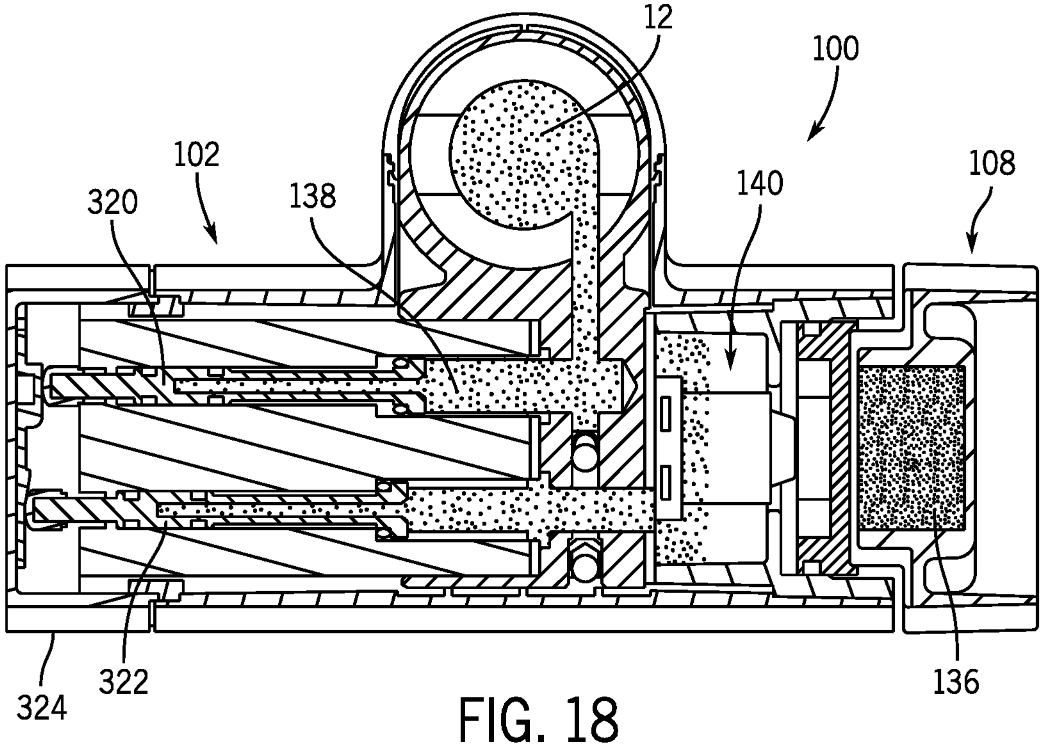
FIG. 18 is a top cross-sectional view of the inline shower device of FIG. 16.

The operation of the dispensing device 100 may be illustrated by way of example. Referring to FIG. 15, a method 400 of dispensing a fluid into an inlet waterway of a shower enclosure is provided, according to an exemplary embodiment. At 402, a first fluid from the inlet waterway is dispensed into a hydraulic chamber on a first side of a piston. The first fluid may be water 138 introduced into the dispensing device 100 of FIGS. 1-14. For simplicity, similar numerals will be used herein to identify similar components. Operation 402 may include repositioning each of the first valve 320 and the second valve 322. For example, as shown in FIGS. 16-18, operation 402 may include depressing the first valve 320 inward (e.g., away from the knob 324) in order to fluidly couple the inlet waterway 12 with the hydraulic chamber 304 on the first side 323 of the water-driven piston 306. Operation 402 may further include retracting the second valve 322 outward, toward from the knob 324 (and away from the housing 102), to allow water 138 to redistribute into the hollow space 140 on a side of the dispensing device 100 near the capsule 108. As shown in FIG. 16, operation 402 may include activating (e.g., rotating or otherwise manipulating) the second actuator 300 to reposition the first valve 320 and the second valve 322 simultaneously. In other embodiments, operation 402 may include interacting with another form of lever, button, or switch that is configured to adjust the position of the first valve 320 and the second valve 322.

Figure 19:
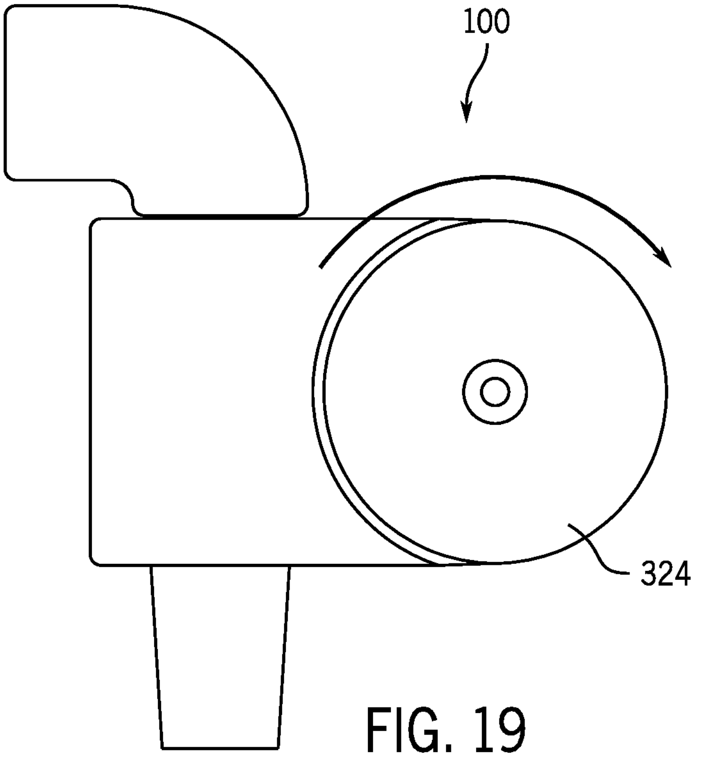
FIG. 19 is a side view of an inline shower device in operation after releasing an actuator, according to another exemplary embodiment.

At 404, a fluid pressure is applied to the first side 323 of the water-driven piston 306 (e.g., a first side of the first piston head 312) to move the water-driven piston 306 (e.g., from right to left as shown in FIG. 17) and to draw a second fluid into the hydraulic chamber 304. As shown in FIG. 17, the second fluid is the aromatic liquid (e.g., fluid 136) from the capsule 108. At 406, the first fluid (e.g., the water 138) is dispensed from the inlet waterway 12 into the hydraulic chamber 304 on the second side 325 of the water-driven piston 306. Operation 406 may include returning each of the first valve 320 and the second valve 322 to an initial position (e.g., the first position). In the example shown in FIGS. 19-21, operation 406 includes retracting the first valve 320 outward (e.g., toward the knob 324) in order to fluidly couple the inlet waterway 12 with the hydraulic chamber 304 on the second side 325 of the water-driven piston 306. Operation 406 may further include depressing the second valve 322 inward, away from the knob 324 (and toward from the housing 102), to allow water 138 from the first side 323 of the water-driven piston 306 to redistribute into the hollow space 140 on the capsule side of the dispensing device 100. As shown in FIG. 16, operation 402 may include returning the second actuator 300 (e.g., automatically via torsion spring 328) to reposition the first valve 320 and the second valve 322 simultaneously.

Figure 20:
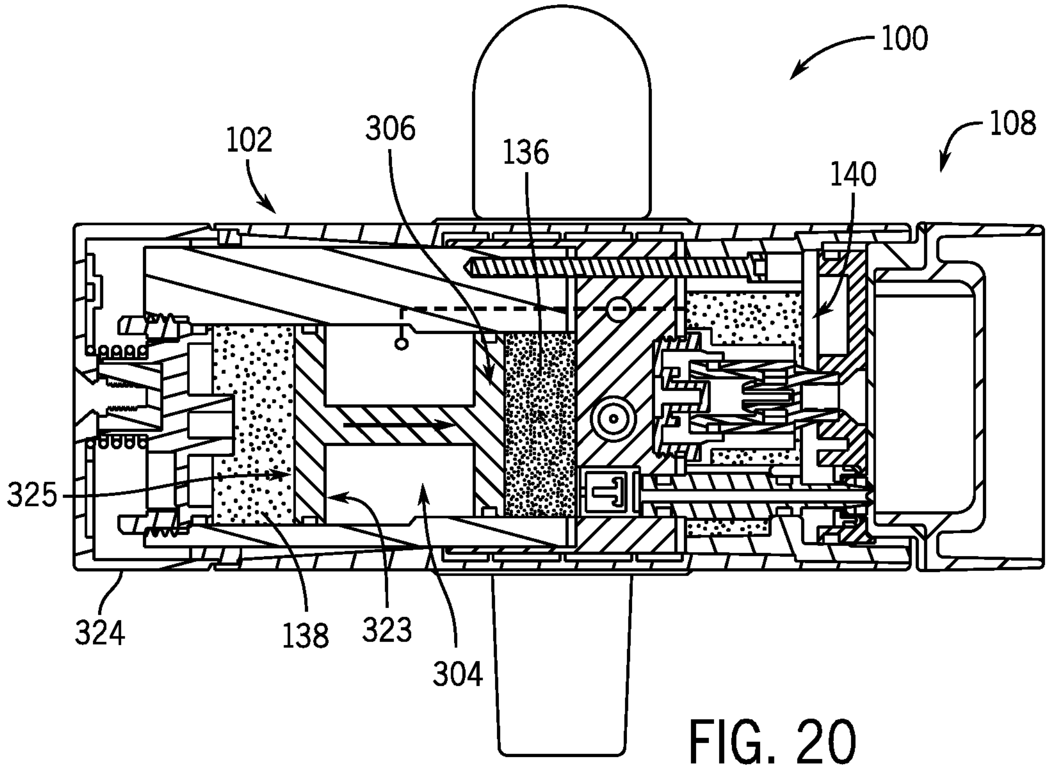
FIG. 20 is a front cross-sectional view of the inline shower device of FIG. 19.
Figure 21:
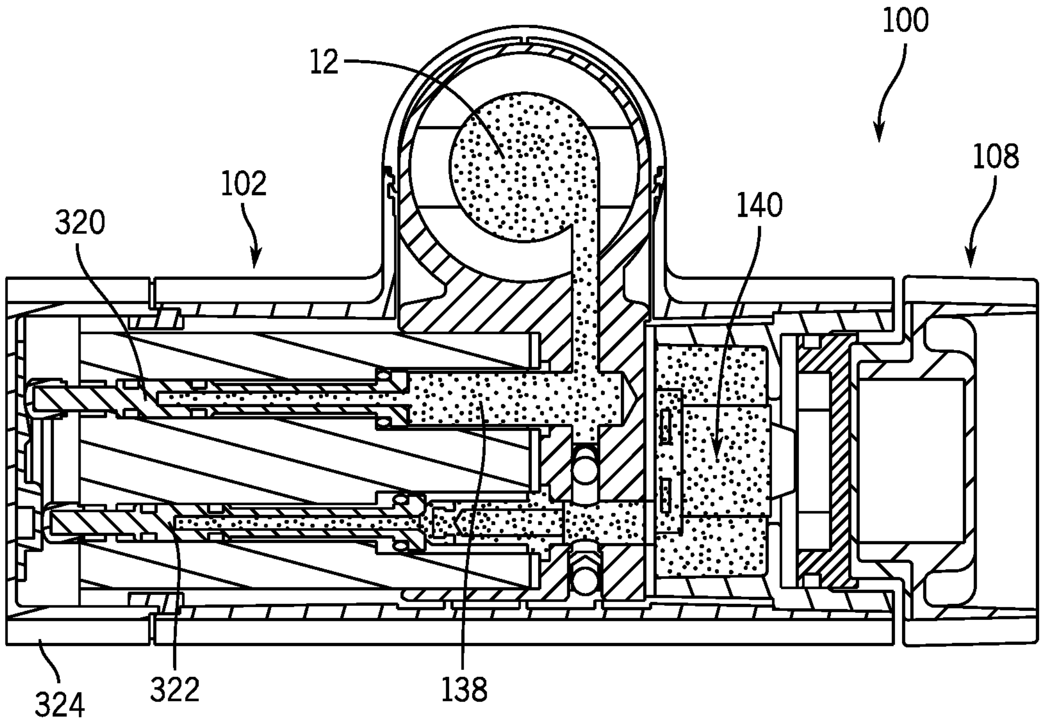
FIG. 21 is a top cross-sectional view of the inline shower device of FIG. 19.

At 408, a fluid pressure is applied to the second side 325 of the water-driven piston 306 (e.g., a second side of the first piston head 312) to move the water-driven piston 306 (e.g., from left to right as shown in FIG. 17) and to eject the second fluid (e.g., fluid 136) from the hydraulic chamber 304 into the inlet waterway 12. As shown in FIG. 20, the second fluid is pushed outward due to the applied fluid pressure on the second side 325 of the water-driven piston 306. The second fluid is pushed from the hydraulic chamber 304 to the orifice 310 and from the orifice 310 to the outlet port 106. The volume of water 138 exhausted into the hollow space 140 on the capsule side of the dispensing device 100 is sealed off from the environment surrounding the dispensing device 100 by the diaphragm 126. According to an exemplary embodiment, the water-driven piston 306 (e.g., a diameter of the water-driven piston 306 and/or the hydraulic chamber 304) is sized so that the force generated by the pressure drop across the water-driven piston 306 is slightly larger than a combination of the frictional forces acting on the water-driven piston 306 and the backpressure of the fluid 136 being dispensed (e.g., the backpressure resulting from the pressure drop across the orifice 310).

Figure 23:
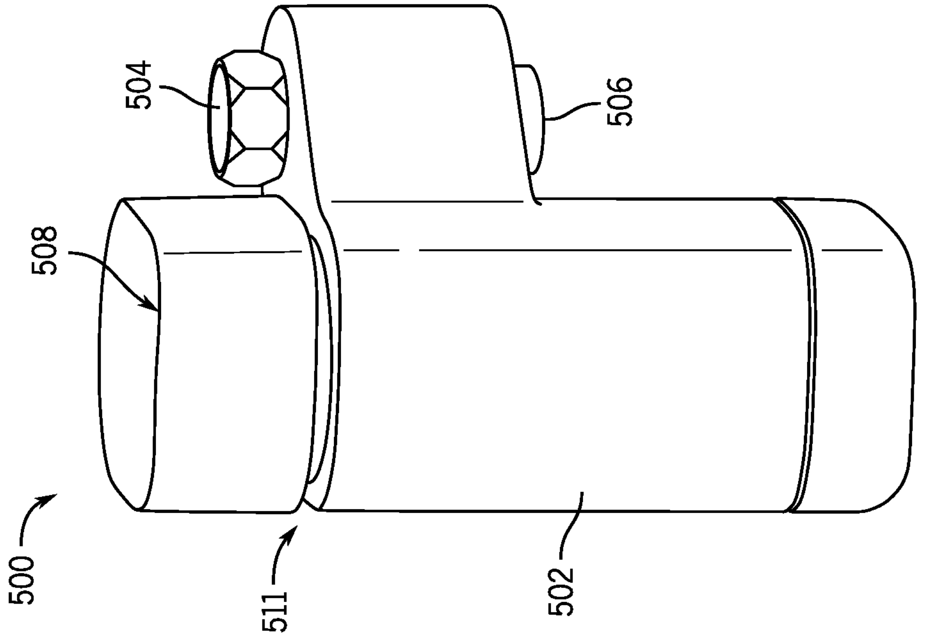
FIG. 23 is a perspective view of the inline shower device of FIG. 22.
Figure 22:
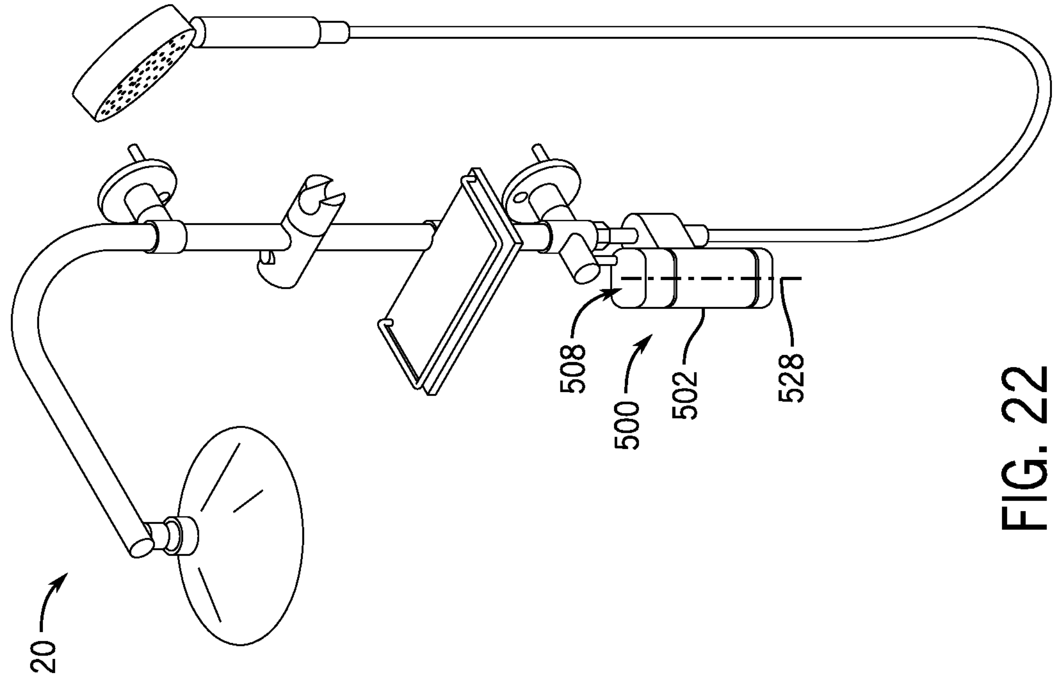
FIG. 22 is a perspective view of a shower enclosure including an inline shower device, according to another exemplary embodiment.

The size, design, and arrangement of components used in the dispensing device 100 of FIGS. 1-2 should not be considered limiting. Many alternatives are possible without departing from the inventive concepts disclosed herein. Referring to FIGS. 22-23, a dispensing device 500 is shown according to another exemplary embodiment. The dispensing device 500 is oriented vertically within a shower enclosure 20, such that a central axis 528 of a housing 502 of the dispensing device 500 is substantially parallel to a direction of gravity (e.g., perpendicular to the floor of the shower enclosure 20, etc.). A capsule 508 is disposed on an upper end 511 of the housing 502. As shown in FIGS. 22-23, the housing 502 includes an inlet port 504 and an outlet port 506. The inlet port 504 is fluidly coupled to a water flow control valve. The outlet port 506 is fluidly coupled to a flexible conduit for a handshower. In other exemplary embodiments, the flow connections between the dispensing device 500 and other components of the shower enclosure 20 may be different. For example, the outlet port 506 from the dispensing device 500 may be coupled to a showerhead (e.g., a rain head, etc.) instead of the handshower. In other exemplary embodiments, the dispensing device 500 may be coupled to, or include, a diverter valve configured to switch the flow of water leaving through the outlet port 506 between the handshower and the showerhead. In yet other exemplary embodiments, the dispensing device 500 may be used in a shower enclosure that only includes a handshower (e.g., as shown for the dispensing device 100 of FIG. 1) or a showerhead.

Figure 24:
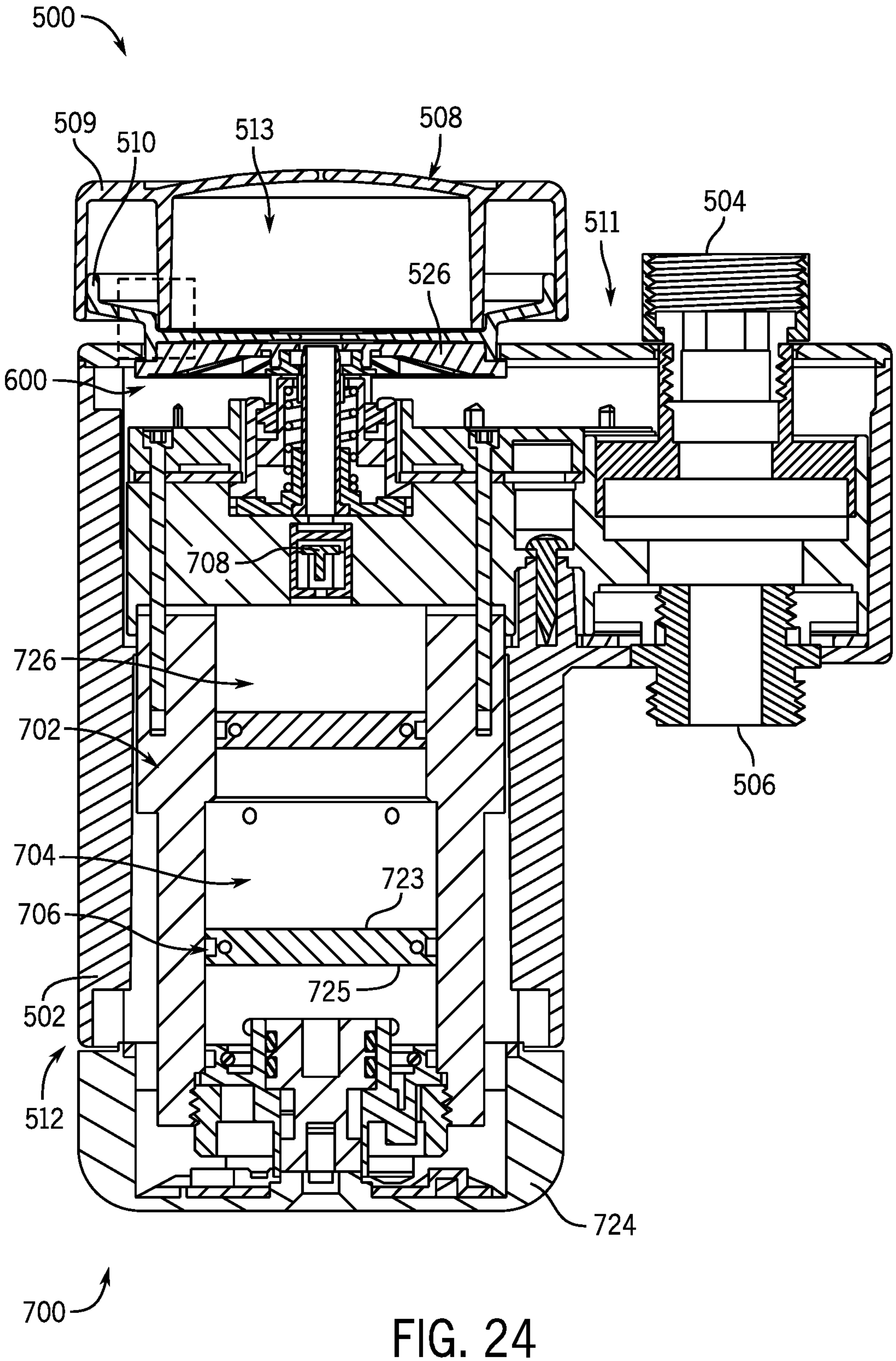
FIG. 24 is a side cross-sectional view of the inline shower device of FIG. 22.
Figure 25:
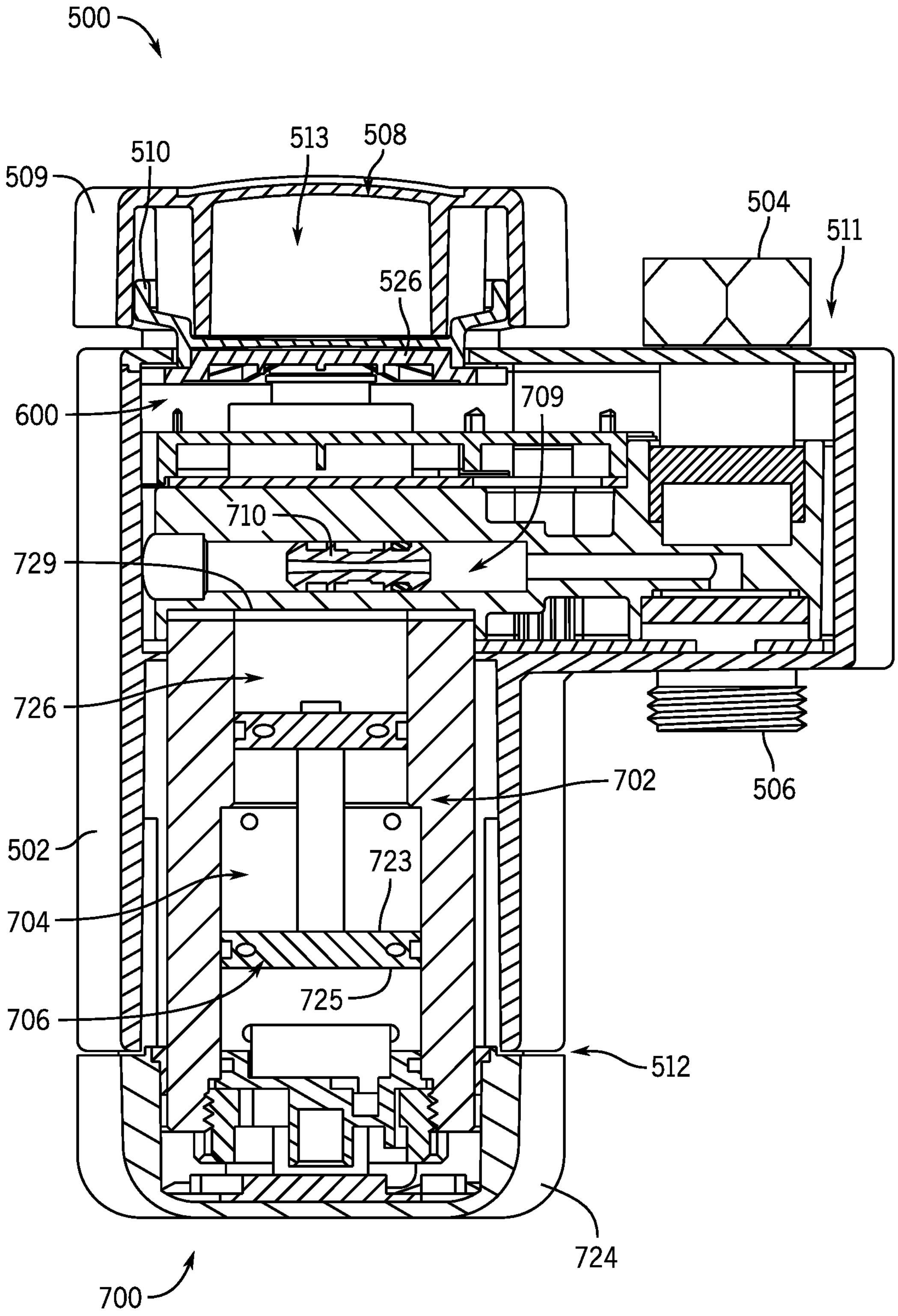
FIG. 25 is another side cross-sectional view of the inline shower device of FIG. 22.

FIGS. 24-25 show cross-sectional views through the dispensing device 500. The dispensing device 500 includes a housing 502 and a first actuator 600 disposed substantially within the housing 502. The first actuator 600 is structured to fluidly couple the capsule 508 to the dispensing device 500. The dispensing device 500 also includes a second actuator 700 that is disposed within the housing 502. The second actuator 700 may be manually manipulated by a user to dispense a fluid (e.g., an aromatic liquid, etc.) into a stream of water that flows from the dispensing device 500 through the outlet port 506. The second actuator 700 includes a cartridge 702, which may be similar to the cartridge 302 described with reference to FIGS. 11-14. As shown in FIGS. 24-25, the cartridge 702 defines a hydraulic chamber 704 configured to receive water from the inlet port 504. The dispensing device 500 additionally includes a water-driven piston 706, which is disposed within the hydraulic chamber 704. Water may be received in one of two spaces within the hydraulic chamber 704, in either a first space on a first side 723 of the water-driven piston 706, or a second space on a second side 725 of the water-driven piston 706. The flow of water between the first space and the second space may be controlled using one of two flow valves, as will be further described. Water may also be allowed to leave through the outlet port 506, depending on the position of one of the valves. A third space 726, toward the upper end of the hydraulic chamber 704 as shown in FIGS. 24-25, is configured to receive fluid from the capsule 508. As shown in FIG. 24, the cartridge 702 additionally includes a check valve 708 configured to prevent fluid that is received within the third space 726 from flowing back into the capsule 508. As shown in FIG. 25, the third space 726 is fluidly coupled to the outlet port 506 via opening 729. The opening 729 fluidly couples the third space 726 to a fluid ejecting passage 709, which extends between the opening 729 and the outlet port 506. The dispensing device 500 additionally includes an orifice 710 disposed in the fluid ejecting passage 709. The orifice 710 is configured to meter the flow of fluid from the third space 726 into the outlet port 506.

Figure 26:
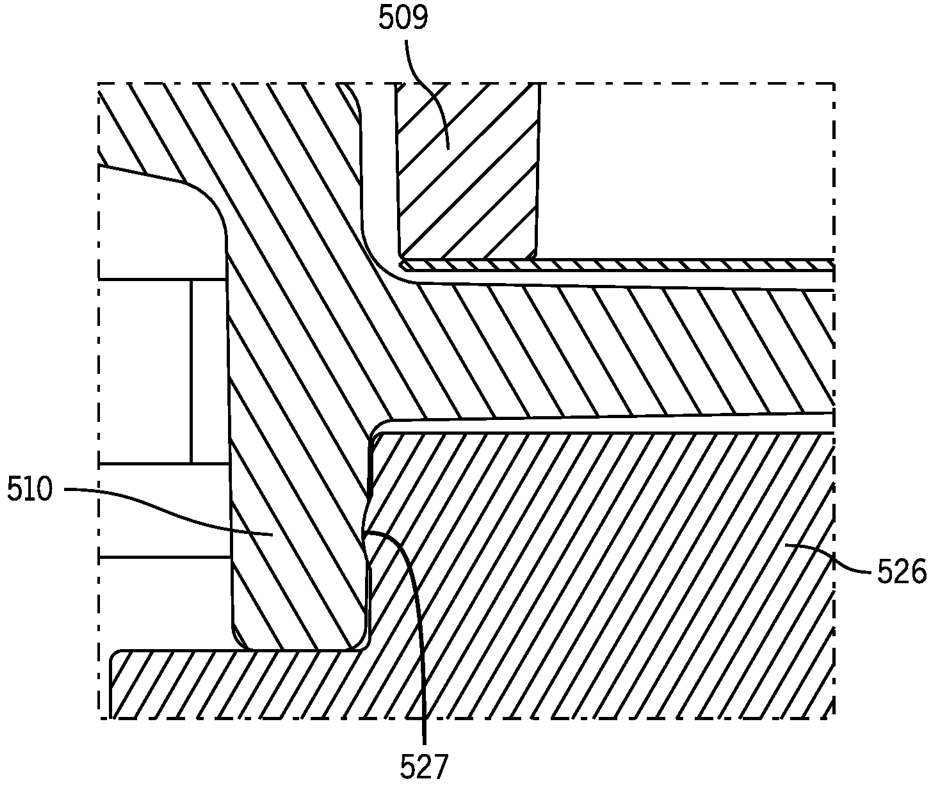
FIG. 26 is a reproduction of FIG. 24 at a location where a capsule engages a diaphragm of the inline shower device.
Figure 27:
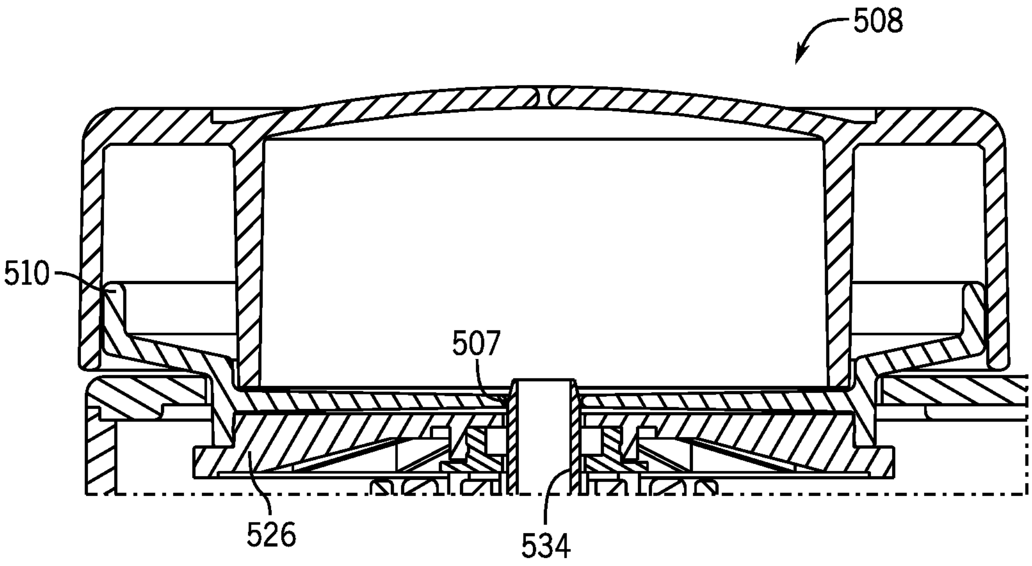
FIG. 27 is another reproduction of FIG. 24 at a location where the capsule engages a diaphragm of the inline shower device.

As shown in FIGS. 24-25, the capsule 508 is coupled to the housing 502 via a diaphragm 526 that is disposed on the upper end 511 of the housing 502. The capsule 508 includes an upper body portion 509 (e.g., upper body, cap, top, etc.) and a lower body portion 510 (e.g., lower body, etc.) coupled to the upper body portion 509. Together, the upper body portion 509 and the lower body portion 510 define an internal cavity 513 into which a volume of fluid is received. As shown in FIGS. 24-25, the lower body portion 510 defines a recessed area configured to receive the diaphragm 526 therein to removably couple the capsule 508 to the housing 502. A diameter of the recessed area is sized to provide mechanical interference between the capsule 508 and the diaphragm 526 in a friction fit arrangement to retain the capsule 508 on the diaphragm 526 during use (see FIG. 26). In some embodiments, as shown in FIG. 26, the diaphragm 526 includes a protrusion 527 (e.g., a projection, bump, etc.) that engages with an outer wall of the recessed area to help retain the capsule 508 in position. The capsule 508 is engaged with the lower body portion 510 along a perimeter of the recessed area, which helps maintain the capsule 508 in coaxial alignment with the diaphragm 526. As shown in FIG. 27, the capsule 508 includes an opening 507 disposed centrally within the lower body portion 510. The opening 507 is sized to receive a hollow pin 534. The hollow pin 534 defines a passageway that guides (e.g., directs) the fluid from the capsule 508, through the check valve 708 (see FIG. 24), and into the hydraulic chamber 704 (e.g., the third space 726). Among other benefits, the position of the opening 507 eliminates the need for any pre-alignment between the capsule 508 and the diaphragm 526. In other words, the position of the opening 507 eliminates the need to rotationally align the opening 507 on the capsule 508 with a region where the hollow pin 534 is located on the diaphragm 526.

Figure 28:
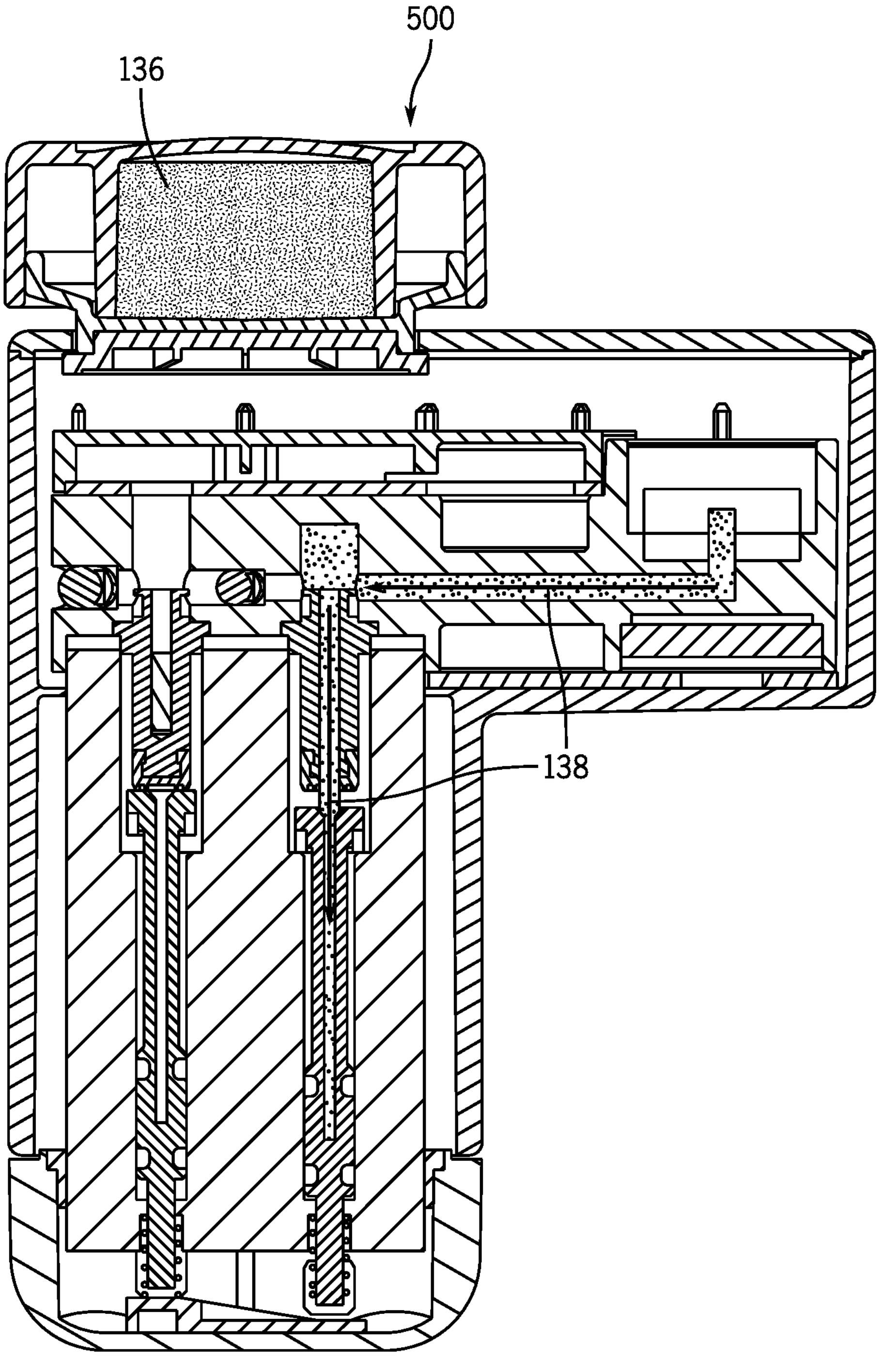
FIG. 28 is another side cross-sectional view of the inline shower device of FIG. 22.
Figure 29:
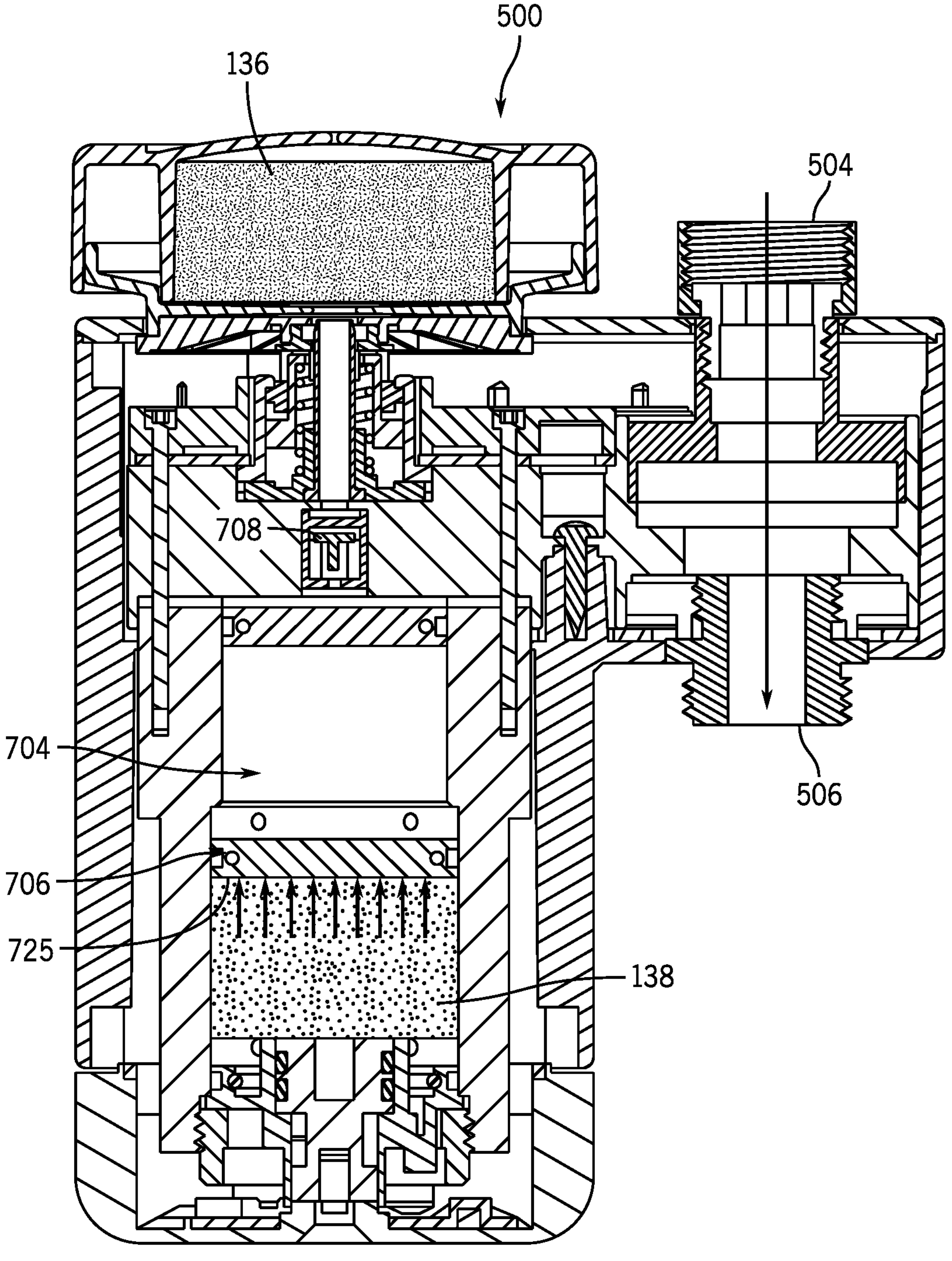
FIG. 29-34 are side cross-sectional views of the inline shower device of FIG. 22 in various stages of operation.

The second actuator 700 may be manually manipulated to draw the fluid (see FIGS. 26-27) out of the capsule 508 and to dispense the fluid into the outlet port 506. As shown in FIGS. 24-25, the second actuator 700 includes a knob 724 disposed on the lower end 512 of the housing 502. In operation, the knob 724 rotates relative to the housing 502 to control a position of a plurality of flow control valves within the cartridge 702. The flow control valves are structured to selectively control the flow of water from the inlet port 504 to different parts of the cartridge 702. FIGS. 28-34 conceptually illustrate the function of the dispensing device 500. As shown in FIG. 28-29, the valves may be positioned in a first orientation to allow water 138 from the inlet port 504 to enter the hydraulic chamber 704 on the second side 725 of the water-driven piston 706. As shown in FIG. 29, water pressure acting on the second side 725 of the water-driven piston 706 forces the water-driven piston 706 upward toward the check valve 708.

Figure 30:
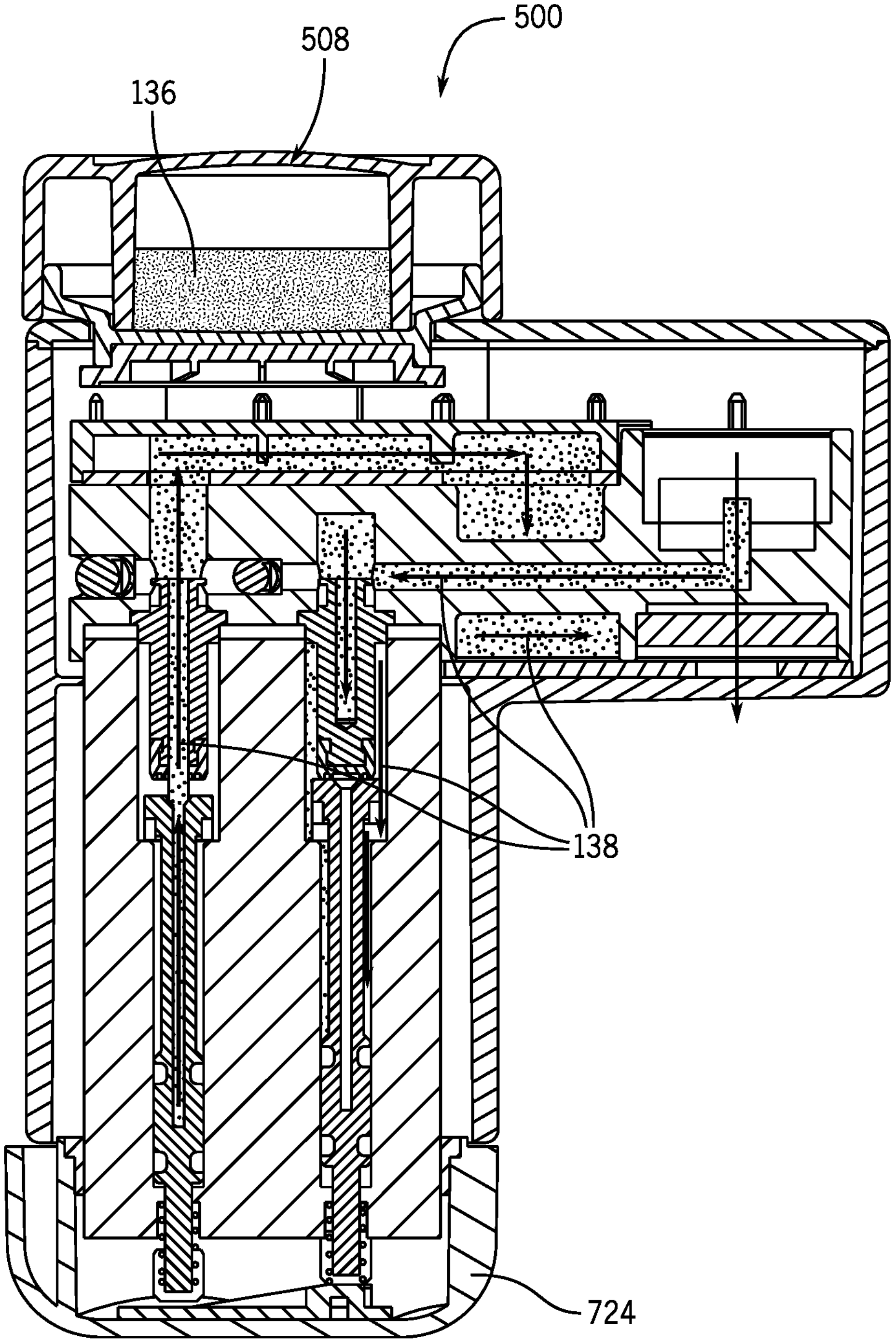
Figure 31:
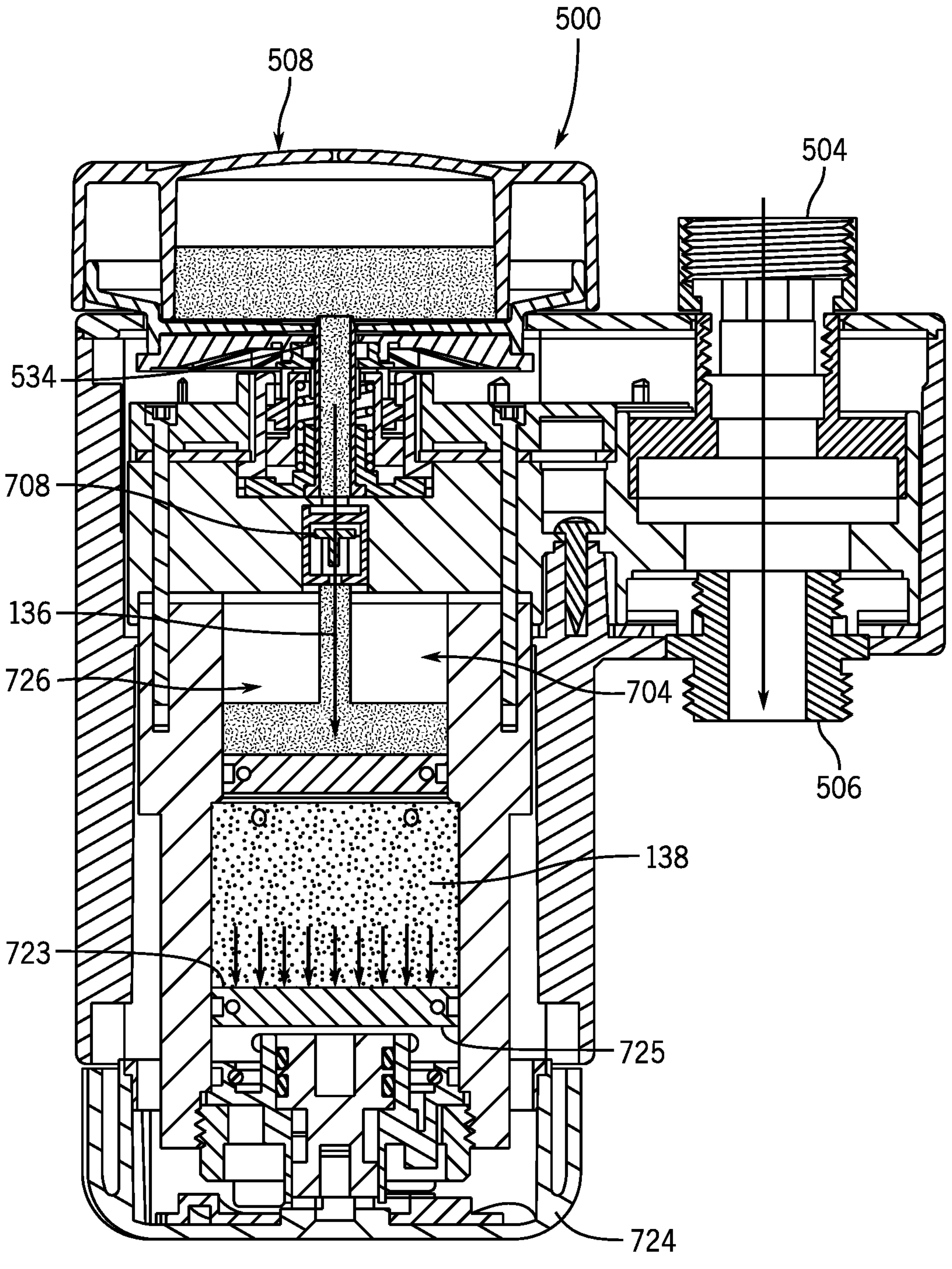

FIGS. 30-31 show the dispensing device 500 after actuating the knob 724 and switching the valves to a second orientation in which water is directed from the second side 725 of the water-driven piston 706 to the first side 723 of the water-driven piston 706. Water pressure acting on the first side 723 causes the water-driven piston 706 to move downward and away from the check valve 708. The movement of the water-driven piston 706 draws fluid 136 from the capsule 508 through the hollow pin 534 and the check valve 708, and into the third space 726. The size of the hydraulic chamber 704 and the water-driven piston 706 determine the maximum amount of fluid 136 that can be drawn from the capsule 508 in a single dispensing cycle. According to an exemplary embodiment, the water-driven piston 706 draws approximately 15 mL of fluid 136 in from the capsule 508. In other exemplary embodiments, the amount of fluid 136 drawn in from the capsule 508 may be different.

Figure 32:
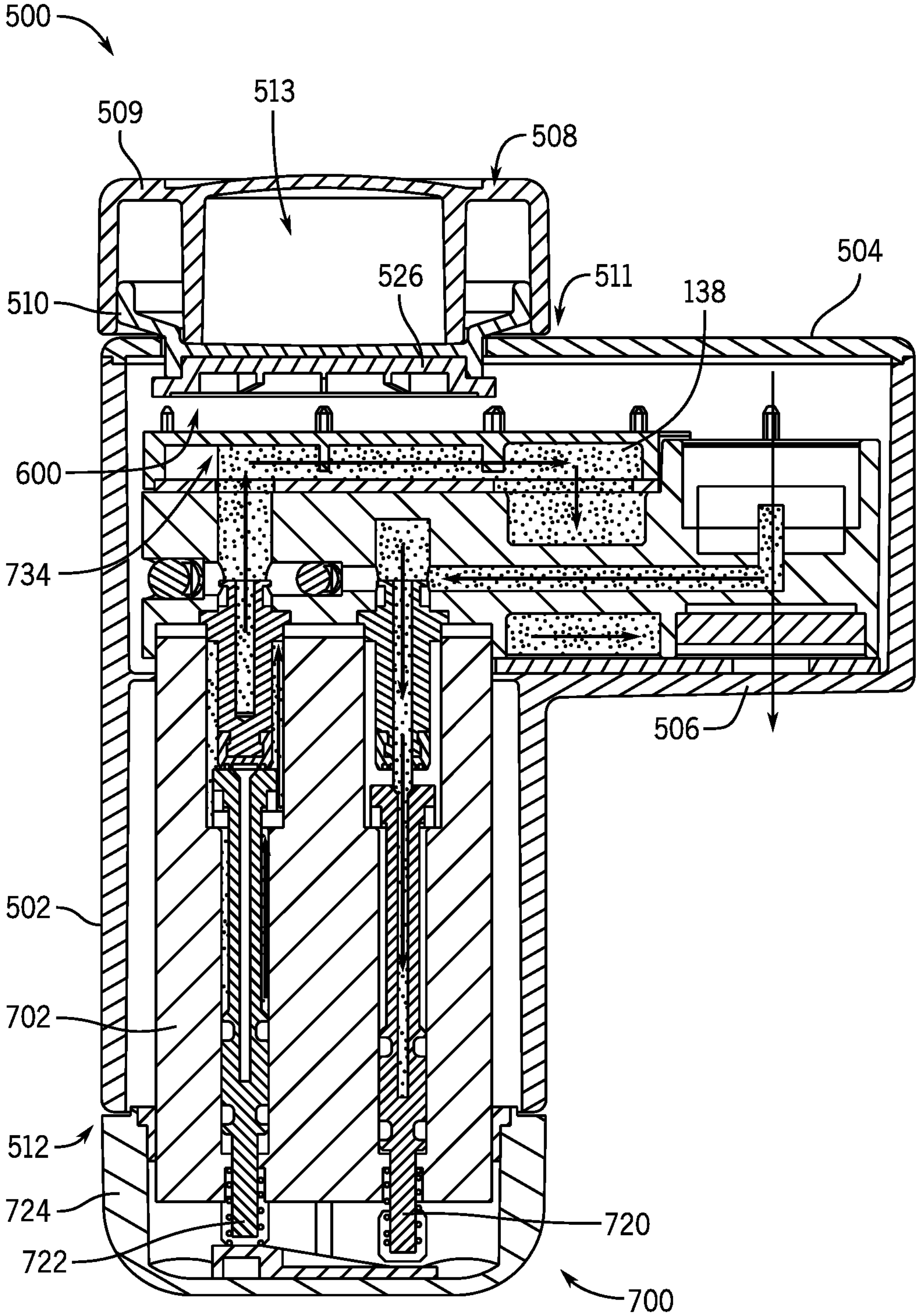
Figure 33:
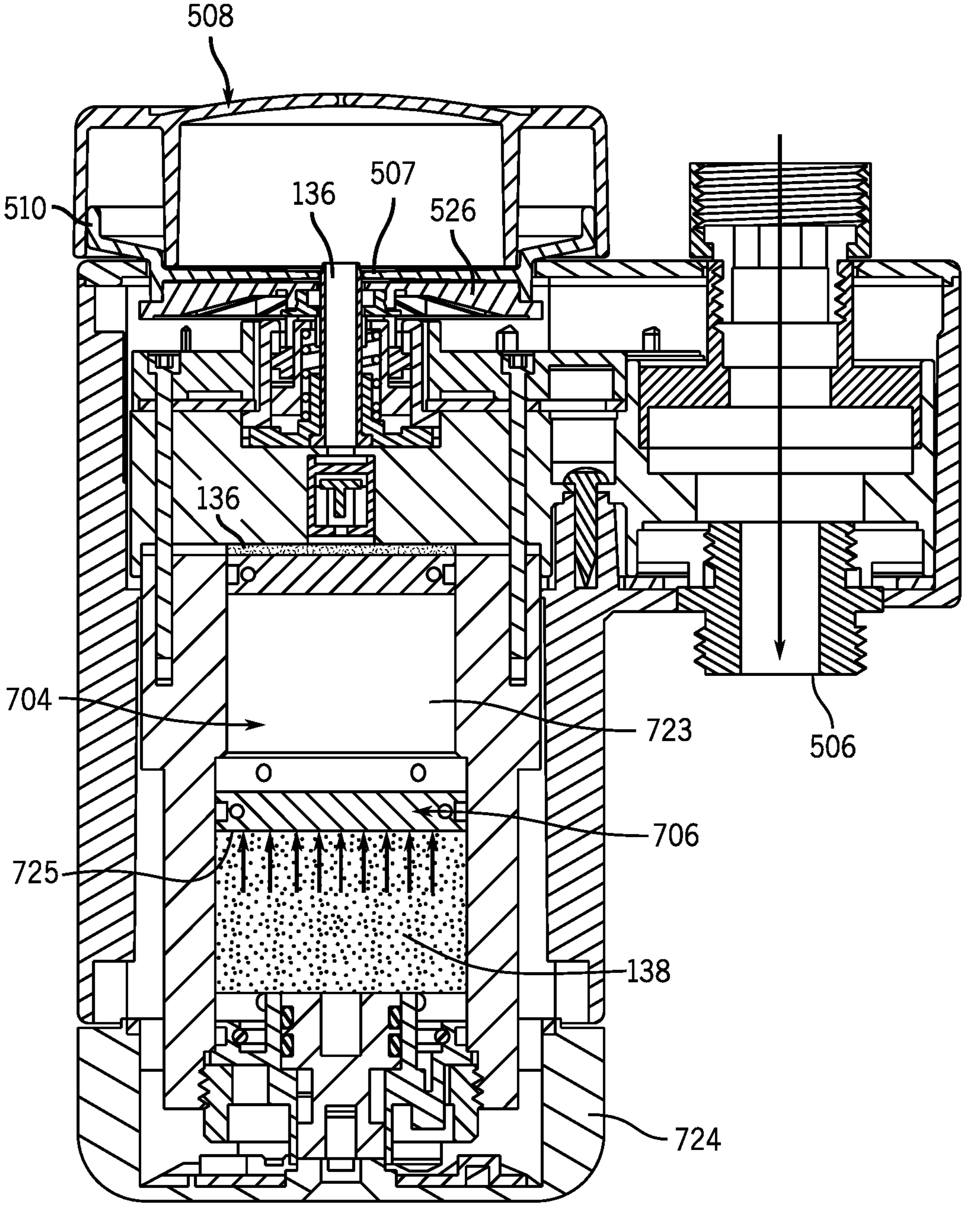
Figure 34:
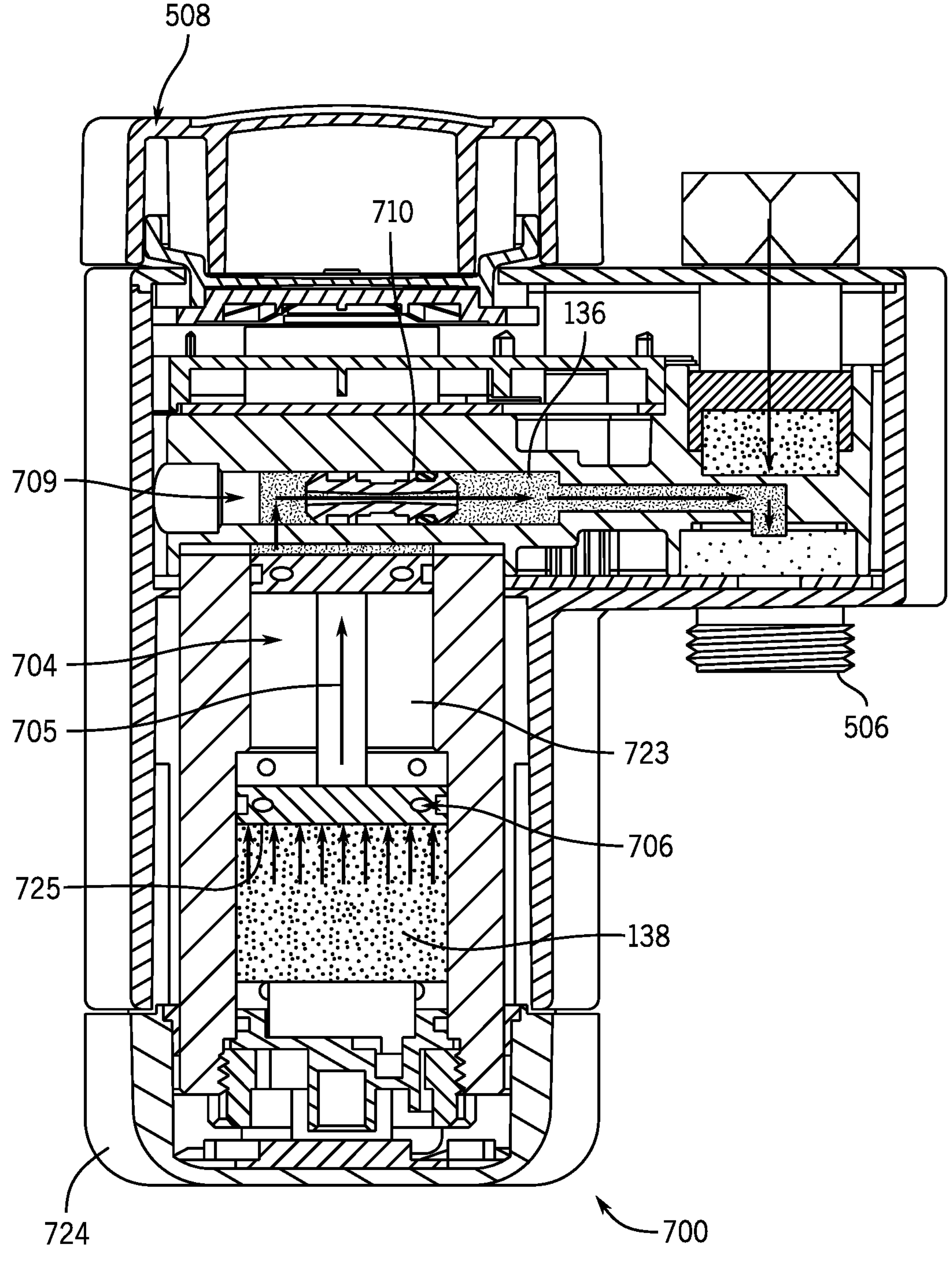

FIGS. 32-34 show cross-sectional views of the second actuator 700 after the knob 724 has been released (e.g., actuated, returned to an initial position) to release fluid 136 from the third space 726 into the outlet port 506. As shown in FIG. 32, a first valve 720 is retracted away toward the knob 724 (e.g., away from a side of the housing 502 near the capsule 508) to allow water 138 to reenter the hydraulic chamber 704 on the second side 725 of the water-driven piston 706 (see also FIGS. 26-27). A second valve 722 is depressed inward, away from the knob 724 (e.g., toward the side of the housing 502 near the capsule 508), to allow water 138 stored in the hydraulic chamber 704 on the first side 723 of the water-driven piston 706 to exit through a flow conduit 734. As shown in FIG. 24, a first end of the flow conduit 734 is fluidly coupled to the hydraulic chamber 704 and a second end of the flow conduit 734 is fluidly coupled to the outlet port 506.

The fluid pressure exerted by the water 138 on the second side 725 of the water-driven piston 706 moves the water-driven piston 706 vertically upward (e.g., from bottom of the hydraulic chamber 704 to the top of the hydraulic chamber 704 as shown by arrow 705 in FIG. 33), which ejects the fluid 136 from the hydraulic chamber 704. As shown in FIG. 34, fluid 136 leaving the hydraulic chamber 704 passes through the fluid ejecting passage 709, which extends between the hydraulic chamber 704 and the outlet port 506. The fluid 136 leaving the hydraulic chamber 704 passes through the orifice 710, which ensures a consistent delivery rate of fluid 136 to the handshower or other fluid delivery device during operation.

Figure 35:
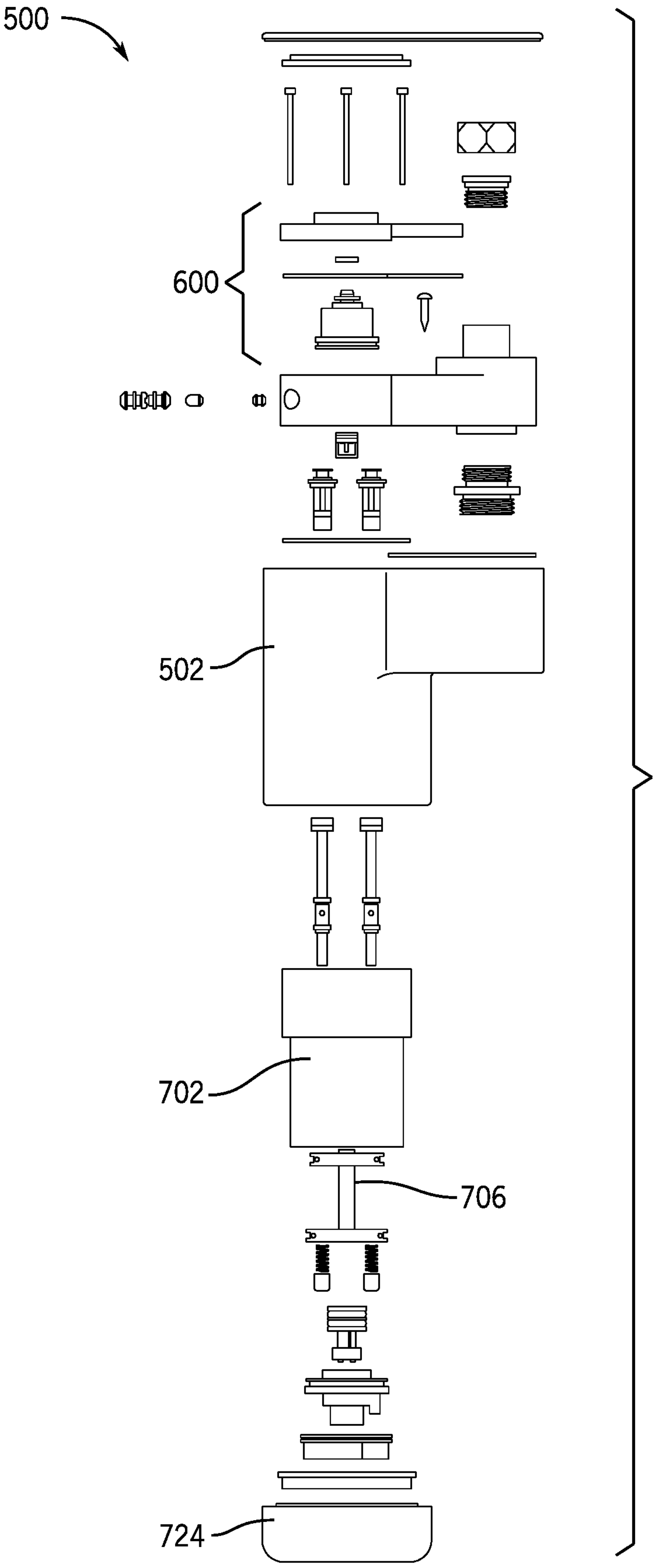
FIGS. 35-37 are exploded views of the inline shower device of FIG. 22.
Figure 36:
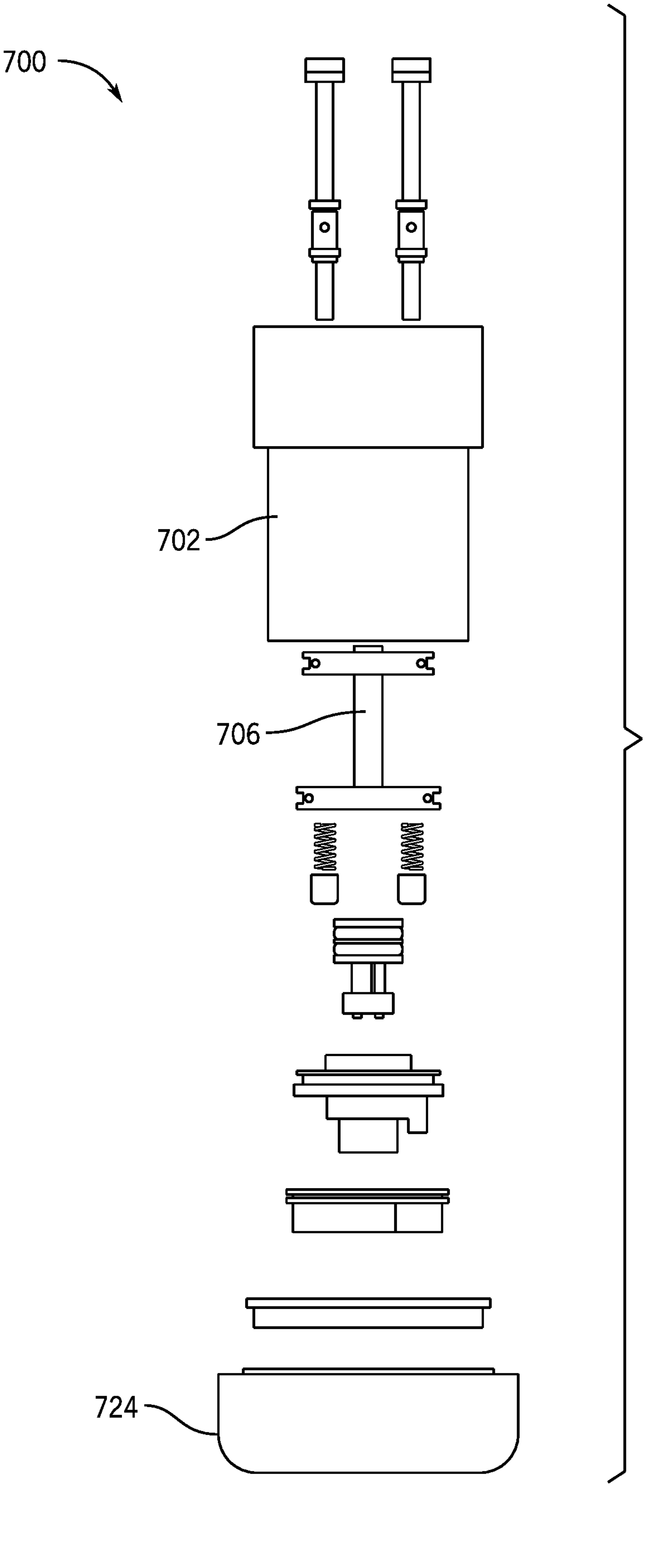
Figure 37:
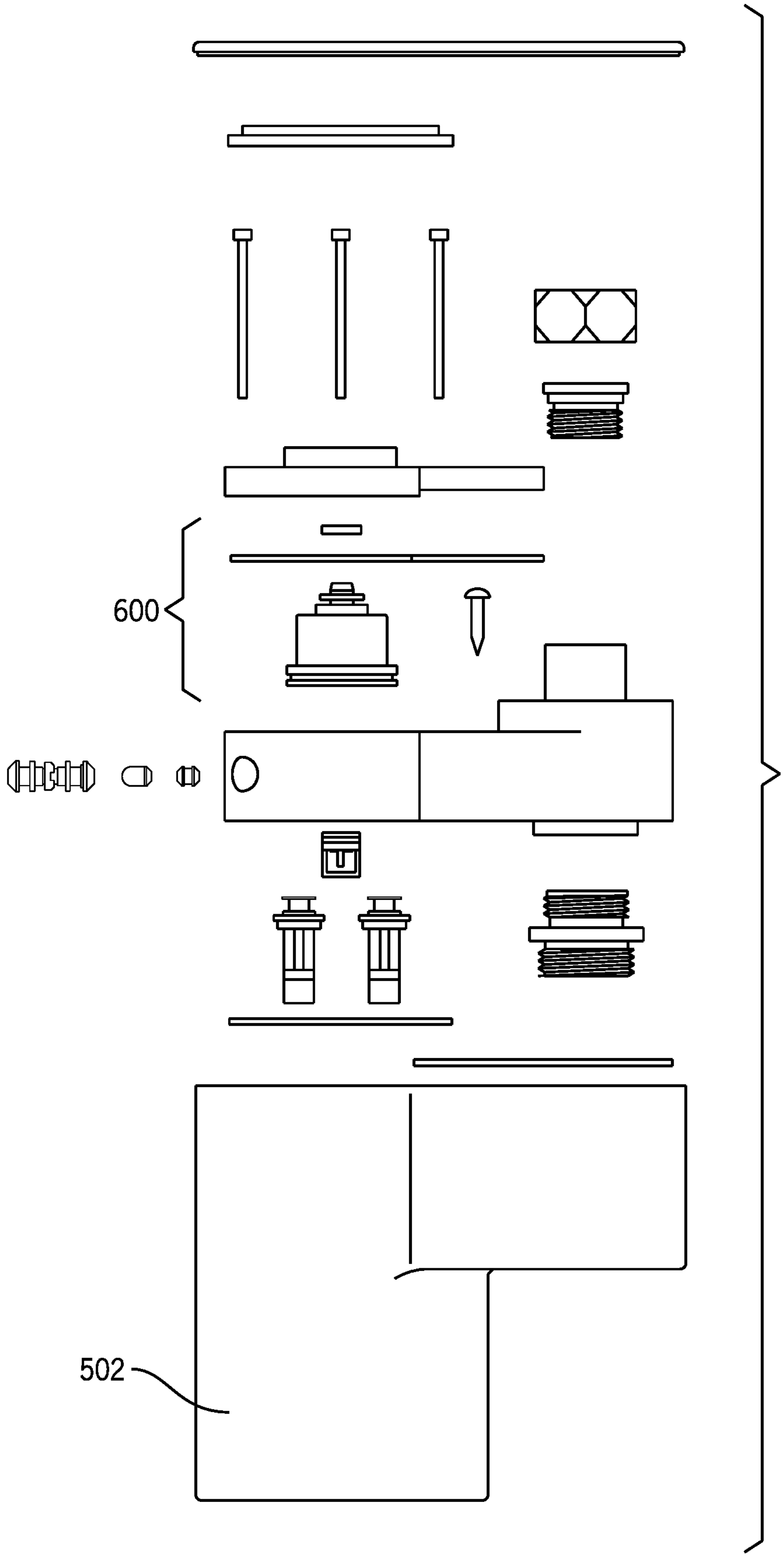

FIGS. 35-37 show exploded views of the dispensing device 500 of FIGS. 22-23. FIG. 35 shows an exploded view of the entire dispensing device 500. FIG. 36 shows an exploded view of a lower portion of the dispensing device 500 including the second actuator 700. FIG. 37 shows an exploded view of an upper portion of the dispensing device 500 including the first actuator 600.

Figure 38:
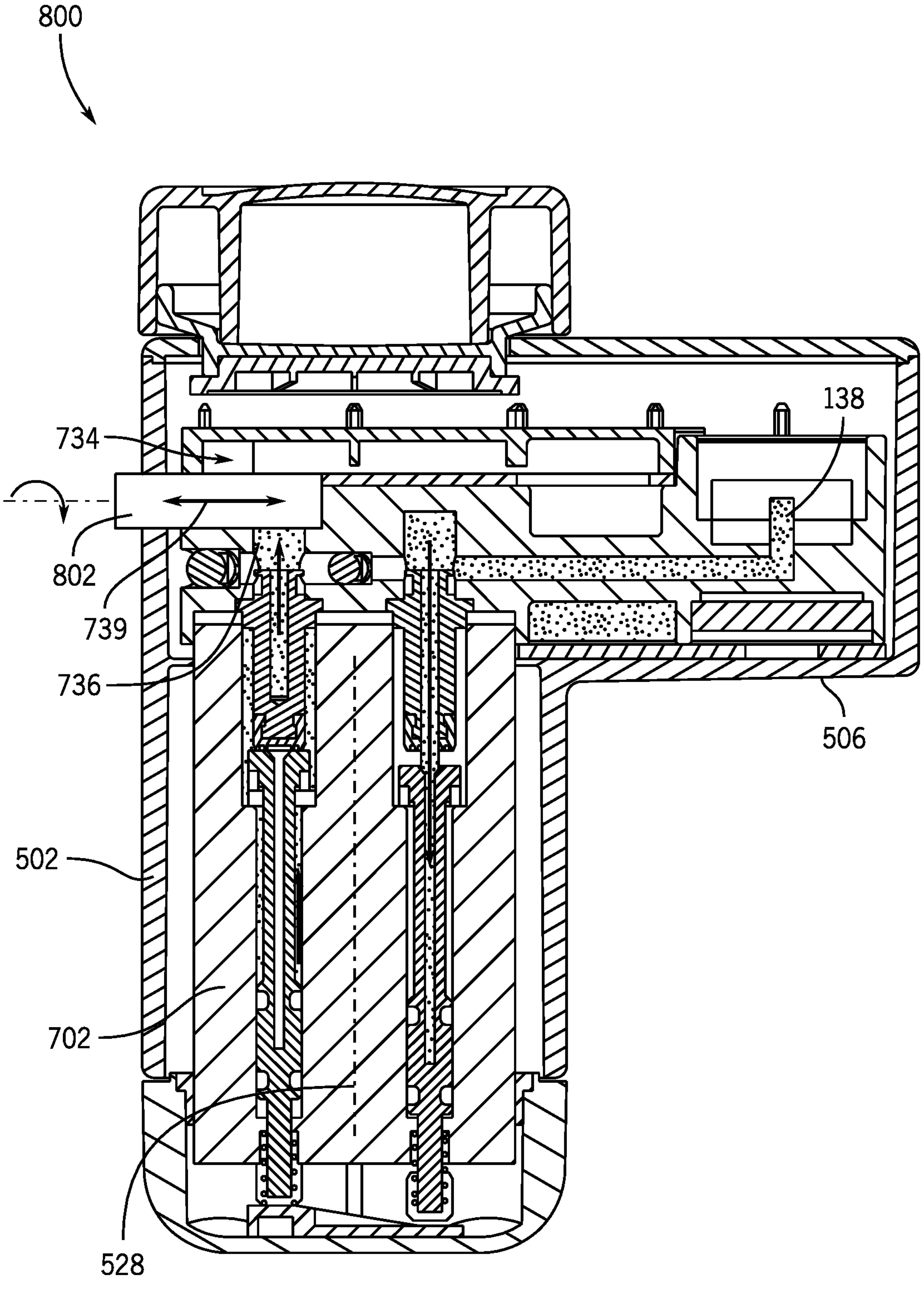
FIG. 38 is a side cross-sectional view of an inline shower device, according to another exemplary embodiment.

In some exemplary embodiments, the dispensing device is configured to pause or stop the delivery of fluid 136 and/or to control the flow rate of fluid 136 that is delivered to the outlet port 506. Referring to FIG. 38, a dispensing device 800, similar to the dispensing device 500 of FIGS. 22-23, is shown to include a pause device 802. The pause device 802 is configured to control the flow of water leaving the hydraulic chamber 704 (see also FIG. 34) on the first side 723 of the water-driven piston 706 during the fluid 136 release/ejection operation. The pause device 802 includes a button, lever, or another form of actuator that is manually repositionable by a user of the dispensing device 800. As shown in FIG. 38, the pause device 802 is a button. A first end of the pause device 802 extends at least partially into the flow conduit 734, proximate to where the flow conduit 334 connects to the hydraulic chamber 704 (e.g., proximate to an opening 736 in the flow conduit 734 that fluidly couples the flow conduit 734 with the hydraulic chamber 704). A second end of the pause device 802 extends outwardly from the housing 502, in a substantially radial direction with respect to the central axis 528 of the housing 502, such that the button protrudes from a forward facing surface of the housing 502. Among other benefits, the position of the button improves user accessibility from within the shower enclosure 20 (see also FIG. 22). The button is repositionable between a first position in which the first end of the button is spaced a distance from the opening 736 (such that the flow conduit 734 is fluidly coupled to the hydraulic chamber 704); and a second position in which the button substantially covers the opening 736 (such that water 138 is prevented from leaving the hydraulic chamber 704 through the opening 736).

In some exemplary embodiments, the button is slidably engaged with the cartridge 702 and moves in a radial direction relative to the central axis 528 of the housing 502 (e.g., left to right as shown in FIG. 38) toward and away from the housing 502 (see arrow 737). In other exemplary embodiments, the button is rotatably coupled to the cartridge 702 (see arrow 739). In an implementation where the button is rotatably coupled to the housing 502, the button may include an internal passage. The internal passage may be structured to fluidly couple the opening 736 and the flow conduit 734 depending on a rotational position of the button. In other words, the button may be structured to fluidly couple the internal passage to the opening 736 in a first rotational position, and to isolate the internal passage from the opening 736 in a second rotational position. In some embodiments, the pause device 802 further includes a spring or another position control member suited to return the button automatically from the second position to the first position. In other exemplary embodiments, the button may engage the cartridge 702 in a different location to prevent the flow of fluid 136 through the outlet port 506. For example, the button may engage with the fluid ejecting passage 709 upstream or downstream of the orifice 710 (see also FIG. 39).

Figure 39:
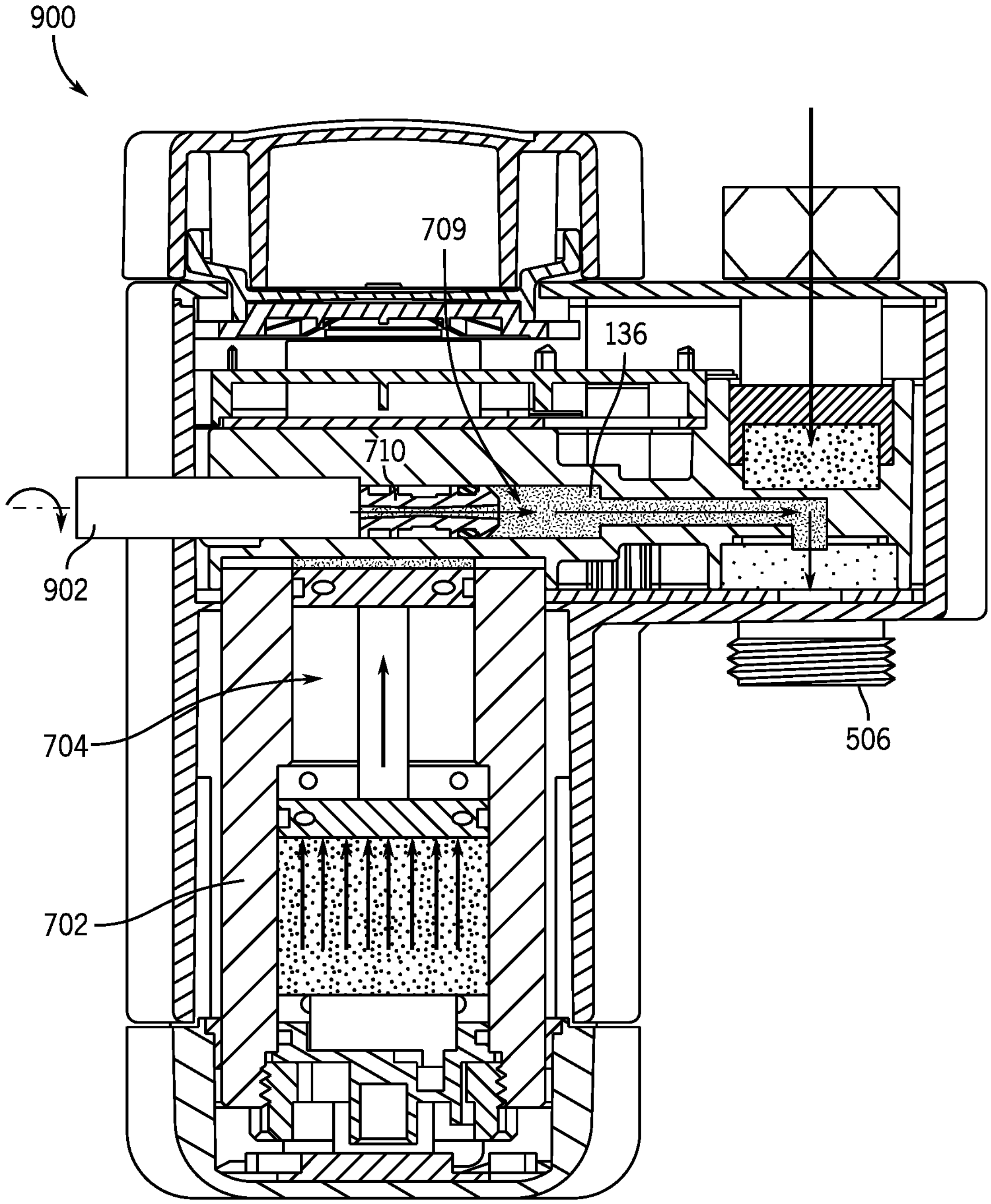
FIG. 39 is a side cross-sectional view of an inline shower device, according to another exemplary embodiment.
Figure 40:
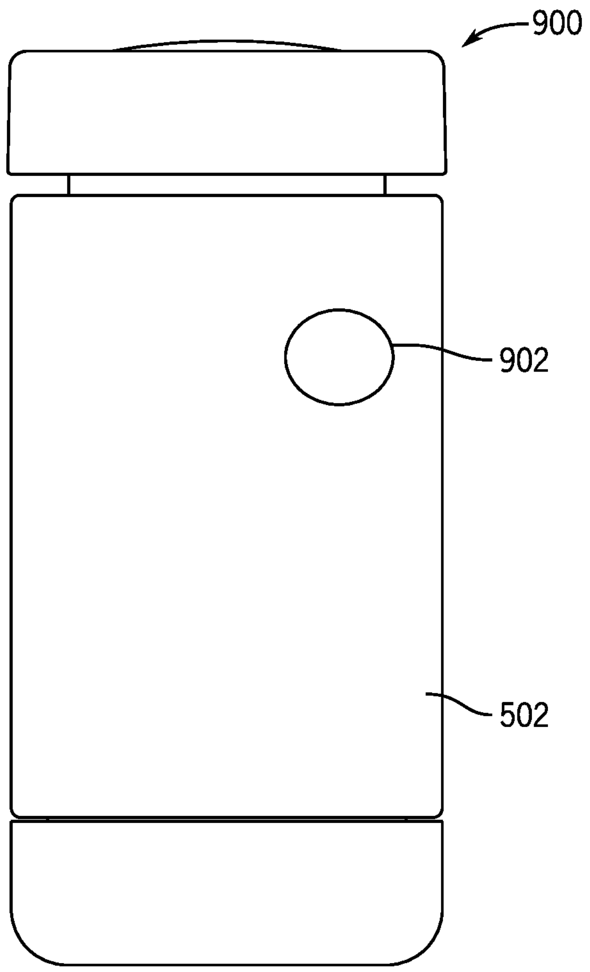
FIG. 40 is a front view of the inline shower device of FIG. 39.

Referring to FIGS. 39-40, a dispensing device 900 is shown to include an intensity control member 902. The intensity control member 902 is structured to control a flow rate of fluid 136 leaving the hydraulic chamber 704 through the outlet port 506. In the exemplary embodiment of FIGS. 39-40, the intensity control member 902 is a dial that is at least partially disposed in the fluid ejecting passage 709, upstream from the orifice 710. The dial protrudes outwardly from the housing 502, from a forward facing surface of the housing 502, for ease of access by a user. The dial may be structured to control the diameter of the orifice 710 via rotation of the dial. For example, the dial may include multiple internal passages having different passage diameters. In other exemplary embodiments, the dial is threadably engaged with the cartridge 702 selectively controls an amount of restriction between the hydraulic chamber 704 and the orifice 710. In an exemplary embodiment, the dial may be rotated to modify the effective orifice diameter (e.g., the diameter of an orifice that provides equivalent restriction to the fluid ejecting passage 709, between the hydraulic chamber 704 and the outlet port 506) within a range between approximately 0.03 in and 0.04 inches. In other exemplary embodiments, the adjustment range provided by the dial may be different. In some exemplary embodiments, the dial may be structured to prevent the flow of fluid 136 through the fluid ejecting passage 709. For example, the dial may completely block the flow of fluid 136 through the fluid ejecting passage in at least one rotational position.

Figure 41:
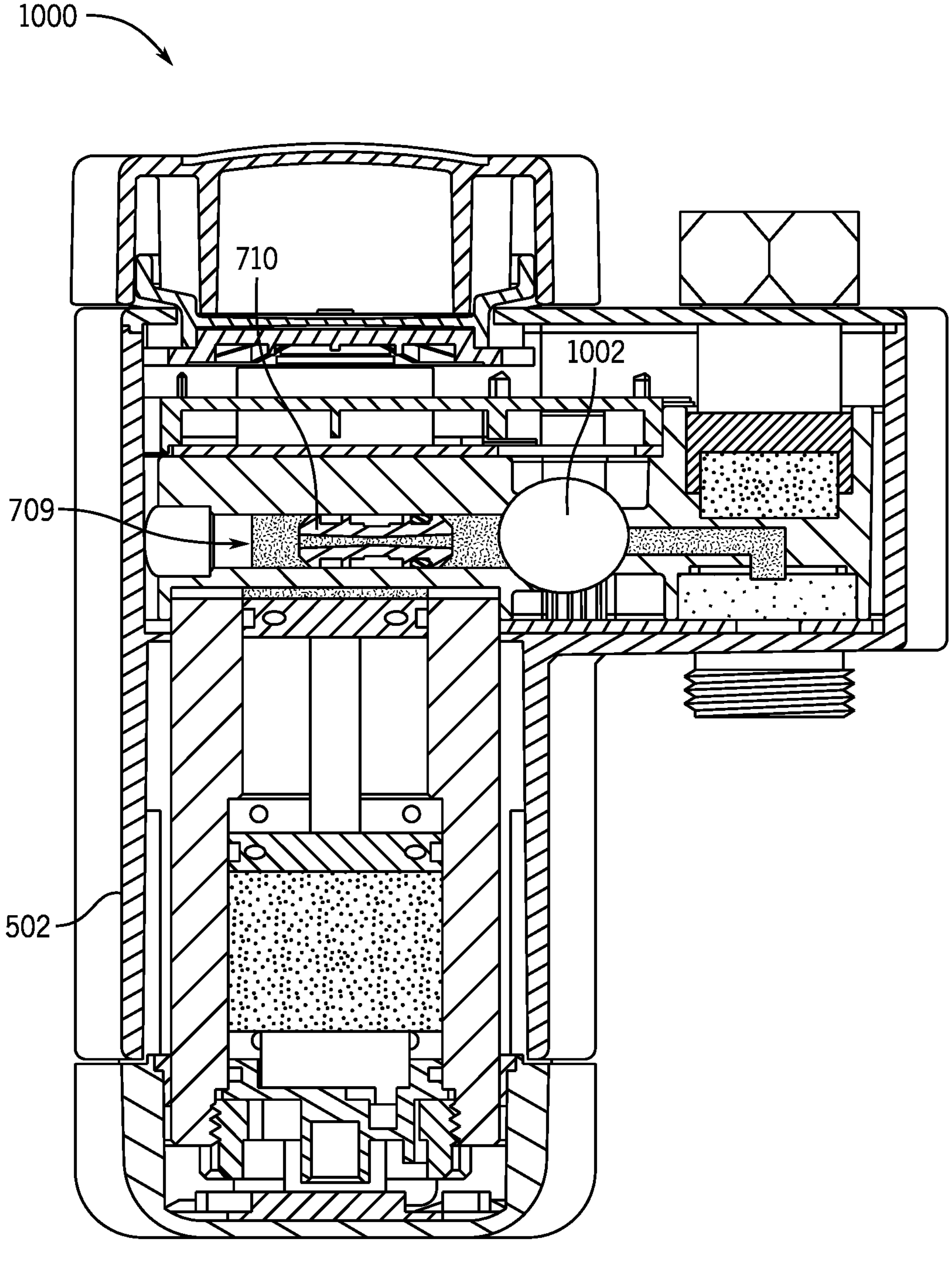
FIG. 41 is a side cross-sectional view of an inline shower device, according to another exemplary embodiment.
Figure 42:
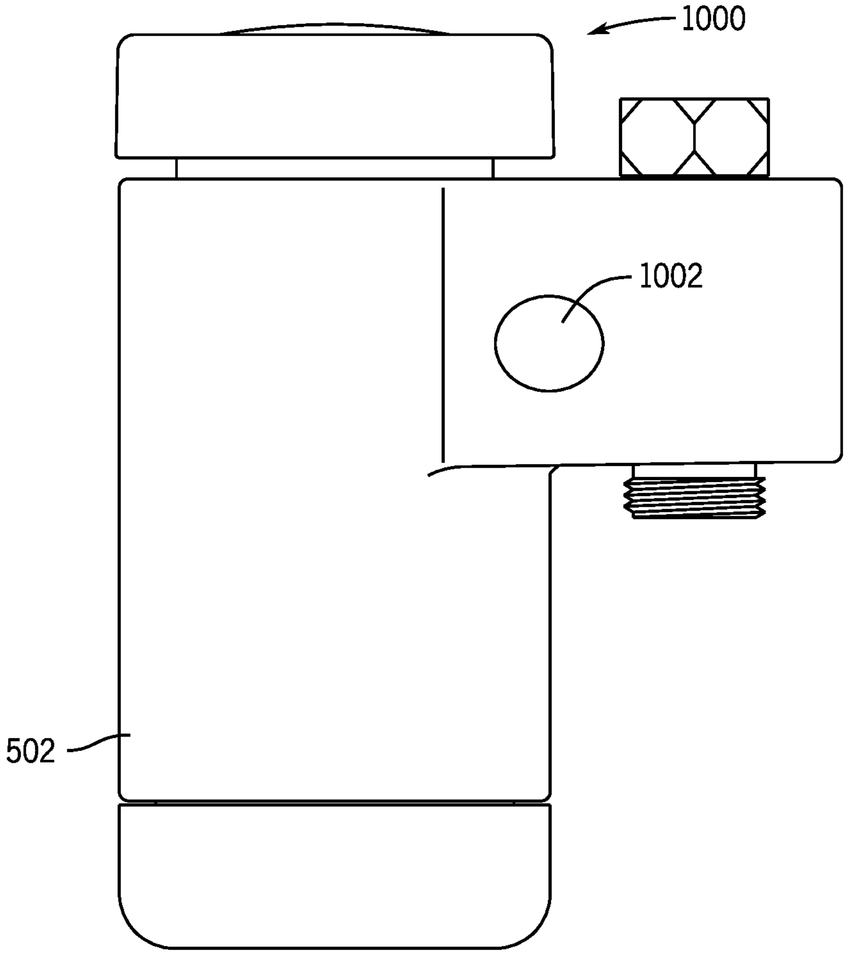
FIG. 42 is a front view of the inline shower device of FIG. 41.

Another exemplary embodiment of a dispensing device 1000 that includes an intensity control member 1002 is shown in FIGS. 41-42. The intensity control member 1002 includes a dial that extends at least partially into the fluid ejecting passage 709 downstream of the orifice 710. The dial protrudes outwardly from the housing 502, from a side facing surface of the housing 502, such that the dial is at least partially concealed from a user's view within the shower enclosure (e.g., such that the dial is at least partially concealed behind the housing 502 when the dispensing device 1000 is positioned within the shower enclosure 20). The dial may include internal passages, each having a different diameter. In other exemplary embodiments, the dial may be configured to at least partially block the fluid ejecting passage 309 to increase the restriction (e.g., pressure drop) through the fluid ejecting passage 309. The amount of restriction provided by the dial may vary based on the rotational position of the dial. In the exemplary embodiment of FIGS. 41-42, the dial includes a hex shaped opening that is sized to receive a tool or key to facilitate repositioning of the dial to at least partially prevent readjustment of the dial during use. In other exemplary embodiments, other opening shapes and/or interface structures may be used.

Figure 43:
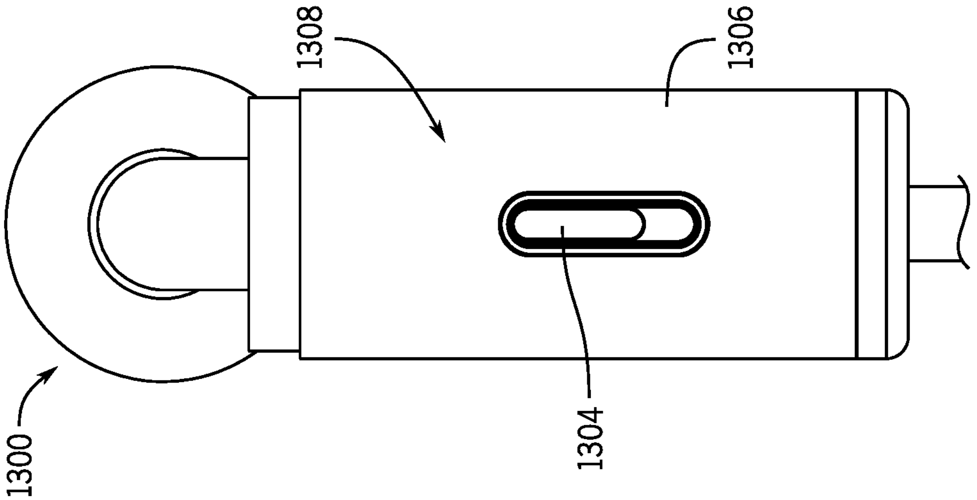
FIG. 43 is a front view of an inline shower device, according to another exemplary embodiment.

The design of the actuator (e.g., knob) used to activate the dispensing device (e.g., to begin dispensing the second fluid, aromatic liquid, etc.) may be different in various exemplary embodiments. For example, FIG. 43 shows an exemplary embodiment of a dispensing device 1300 in which the second actuator 1302 includes a slider 1304 on a front face 1306 of the housing 1308. Similar to the dispensing device 500 of FIGS. 22-37, the dispensing device 1300 is configured to be oriented substantially vertically within a shower enclosure. The slider 1304 is slidably engaged with the housing 1308 and includes a self-return mechanism to simplify activation of the dispensing device 1300.

Figure 45:
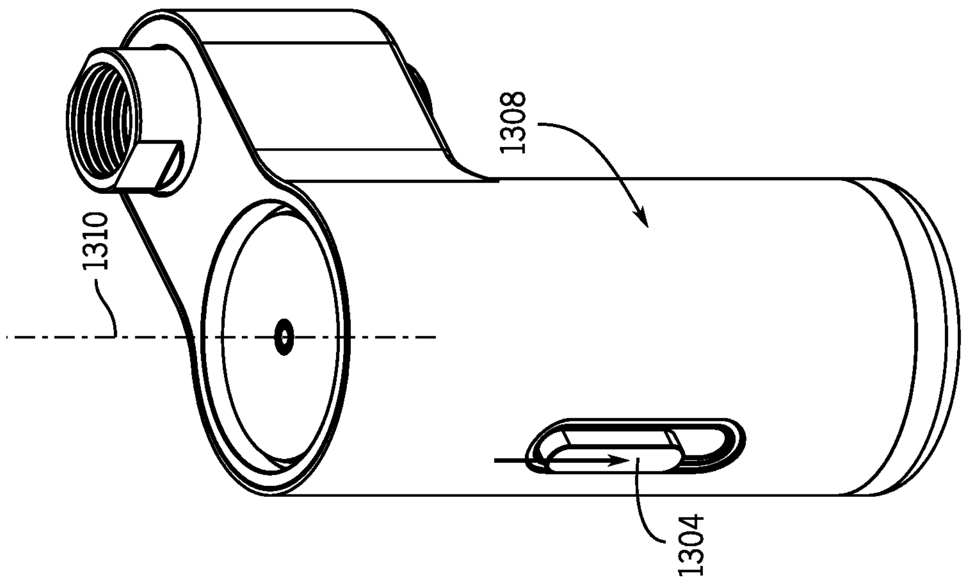
FIG. 45 is a perspective view of the inline shower device of FIG. 43.
Figure 44:
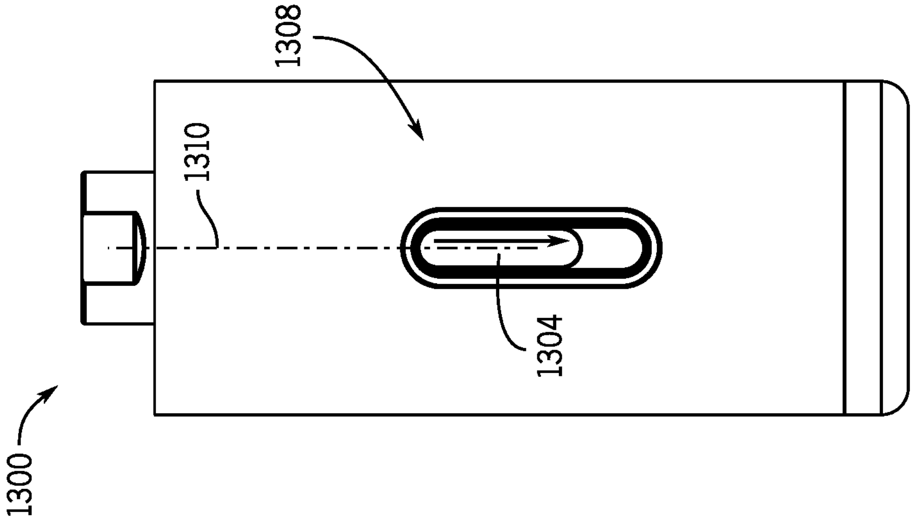
FIG. 44 is another front view of the inline shower device of FIG. 43.
Figure 46:
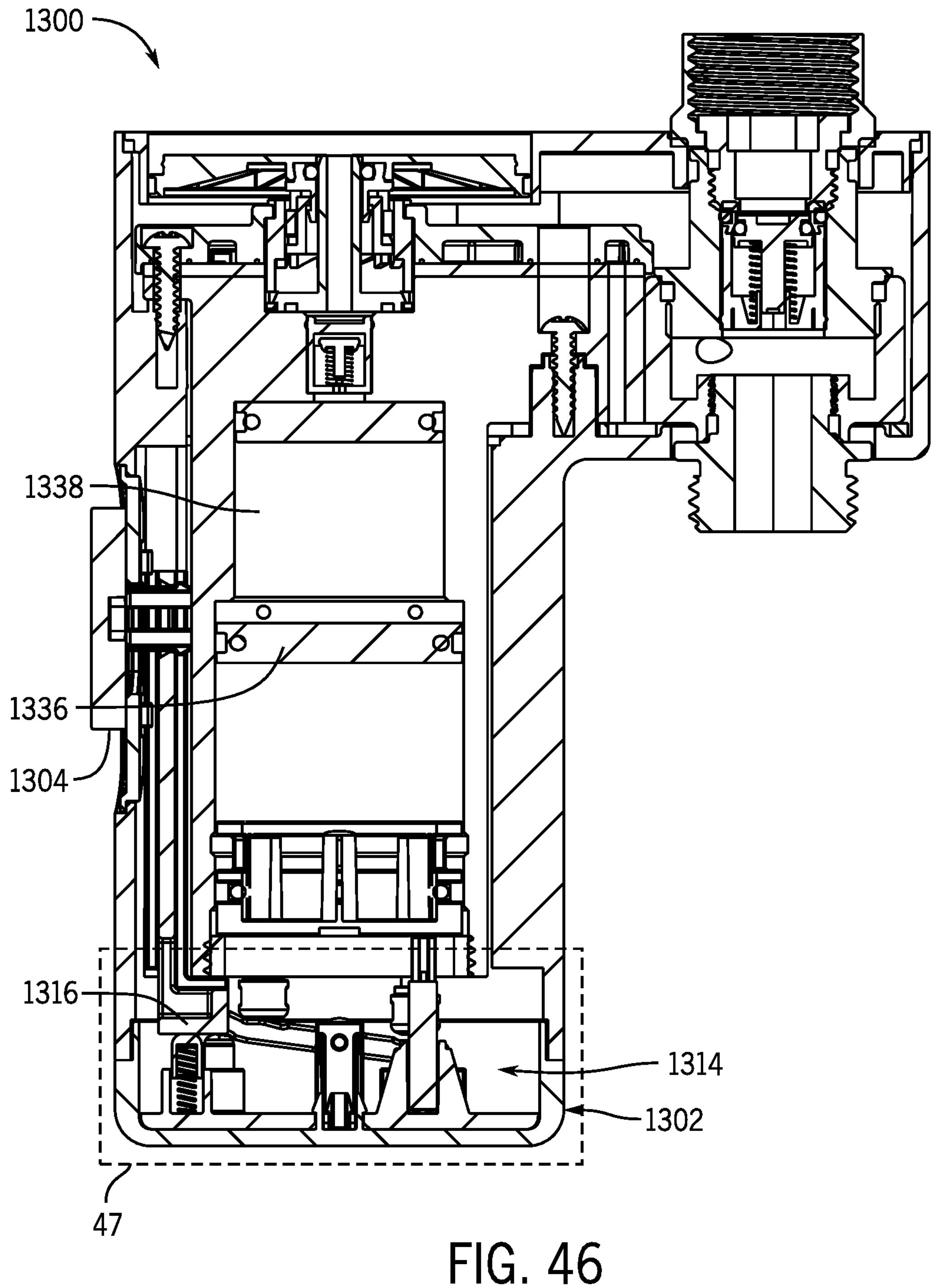
FIG. 46 is a side cross-sectional view of the inline shower device of FIG. 43 in a first operating state.
Figure 47:
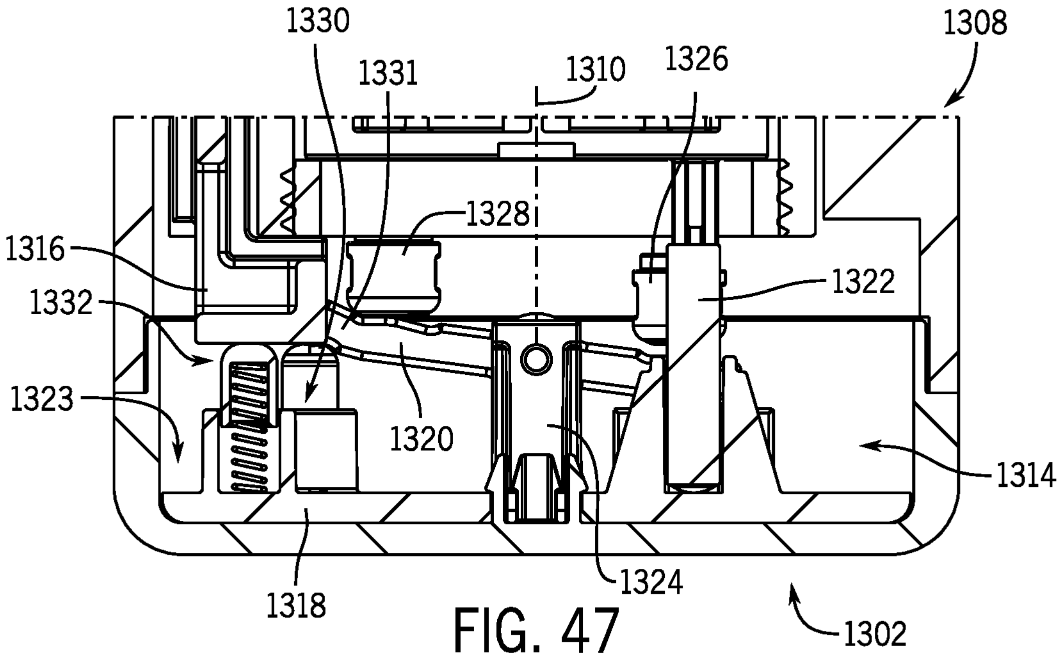
FIG. 47 is a reproduction of a portion of FIG. 46 near a self-return mechanism.
Figure 48:
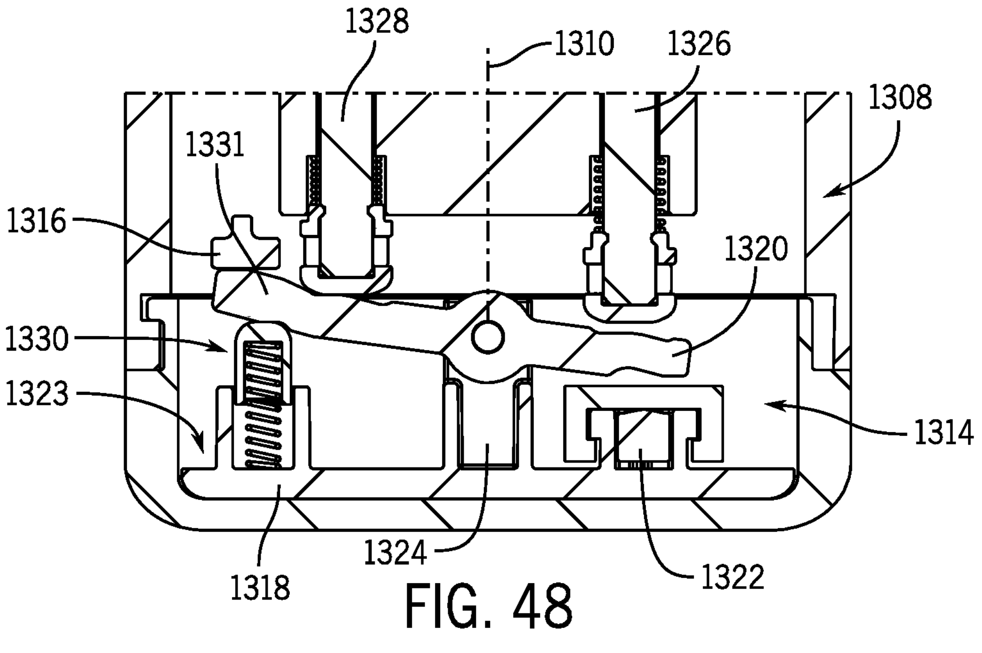
FIG. 48 is a side cross-sectional view the self-return mechanism in the first operating state.

As shown in FIGS. 44-45, the slider 1304 is configured to move in a direction that is substantially parallel to a central axis 1310 of the dispensing device 1300 (e.g., housing 1308). In order to begin dispensing operations (e.g., to deliver the second fluid through an outlet port 1312) a user moves the slider 1304 downwardly (e.g., parallel to a direction of gravity, vertically down as shown in FIGS. 43-45, etc.) toward a lower end of the housing 1308. FIGS. 46-48 show a cross-sectional view through the dispensing device 1300 of FIGS. 43-45. As shown in FIG. 46, the second actuator 1302 of the dispensing device 1300 includes a self-return mechanism 1314 configured to coordinate operation of the valves during dispensing operations and to return the slider 1304 to its original position automatically. The slider 1304 engages the self-return mechanism 1314 via an "L" shaped interface member 1316 that is disposed within the housing 1308. An upper end of the interface member 1316 is coupled to the slider 1304. A lower end of the interface member 1316 engages the self-return mechanism 1314.

As shown in FIGS. 47-48, the self-return mechanism 1314 includes a base 1318, a rocker arm 1320, and a timing element 1322. The base 1318 is disposed in a recessed area 1323 at a lower end of the housing 1308. The rocker arm 1320 is pivotably coupled to the base 1318, to an upper end of a tab 1324 that is disposed at a central position along the base 1318. The tab 1324 extends upwardly from the base 1318 in substantially parallel orientation relative to the central axis 1310. According to an exemplary embodiment, the rocker arm 1320 is a lever that pivots with respect to the base 1318 to control a position of the first valve 1326 and the second valve 1328.

As shown in FIG. 48, an upper surface of the rocker arm 1320 is configured to engage a lower end of both the first valve 1326 and the second valve 1328, on opposing ends of the rocker arm 1320. The rocker arm 1320 also includes a spring loaded actuator 1330 that is configured to maintain the rocker arm 1320 in fixed position in between dispensing operations. The spring loaded actuator 1330 includes a spring and a button. The spring and the button are slidably engaged with a projection extending upwardly from the base 1318. As shown in FIG. 48, the button is disposed at a first end 1331 of the rocker arm 1320, beneath the second valve 1328. The spring loaded actuator 1330 is positioned such that the second valve 1328 is normally depressed inwardly (e.g., vertically upward as shown in FIG. 47) and the first valve 1326 is retracted outwardly (e.g., vertically downward as shown in FIG. 47). In other embodiments, the spring loaded actuator 1330 is a torsion spring positioned at the pivot point between the rocker arm 1320 and the tab 1324. In yet other embodiments, the spring loaded actuator 1330 is directly mechanically coupled to a second side 1333 of the rocker arm 1320 and pulls the second side 1333 downwardly toward the base 1318 in between dispensing operations. As shown in FIG. 47, the interface member 1316 is engaged with the upper surface of the rocker arm 1320 at the first end 1331 of the rocker arm 1320.

As shown in FIG. 47, the self-return mechanism 1314 also includes a second spring loaded actuator, shown as second spring loaded actuator 1332, that is engaged with a lower surface of the interface member 1316. The second spring loaded actuator 1332 is configured to return the slider 1304 (see FIG. 46) to an initial position (at an upper end of the range of movement of the slider 1304) after the user has released the slider 1304. Among other benefits, using a second spring loaded actuator 1332 allows the slider 1304 to return to its initial position independently from the rocker arm 1320.

Figure 49:
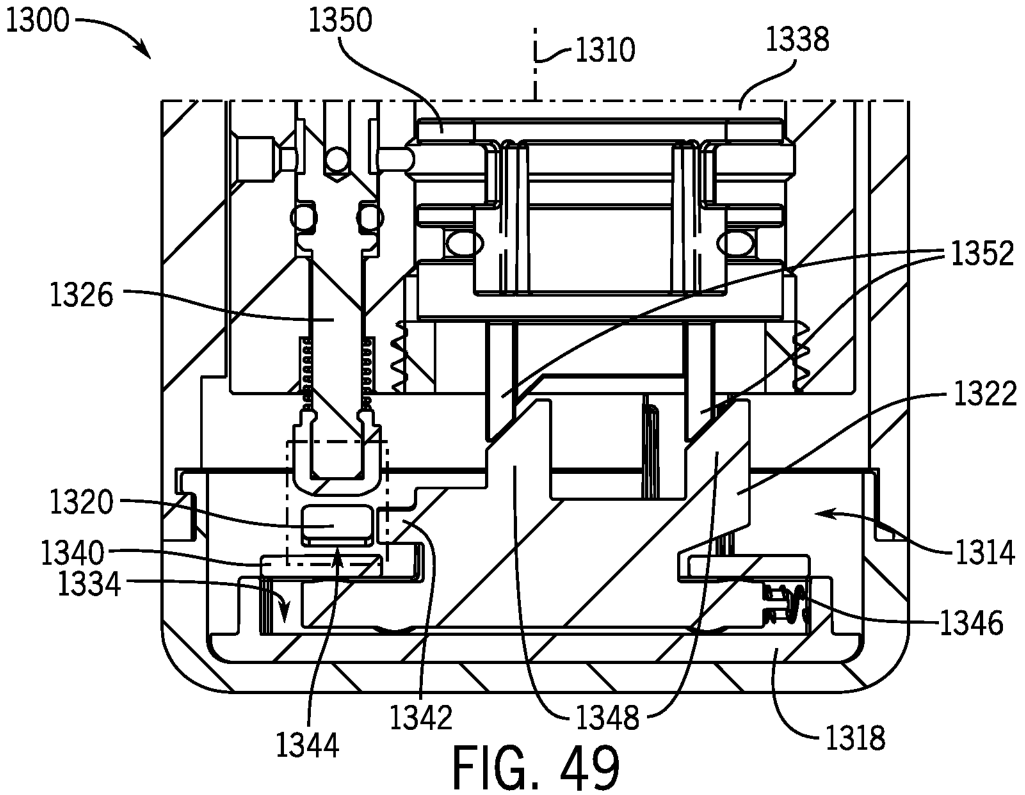
FIG. 49 is another side cross-sectional view of the self-return mechanism in the first operating state.

FIG. 49 shows a side cross-sectional view through the dispensing device 1300 that is offset 90° from the cross-sectional view shown in FIGS. 46-48. In particular, FIG. 49 shows a cross-section through the timing element 1322 of the self-return mechanism 1314. The timing element 1322 is configured to coordinate movement between the rocker arm 1320 and the piston 1336 (see FIG. 46). In particular, the timing element 1322 is configured to maintain engagement between the rocker arm 1320 and the first valve 1326 (e.g., via the spring loaded actuator 1330) until the aromatic liquid has been withdrawn from the capsule to the desired fill level in the hydraulic chamber 1338 (e.g., until approximately 15 mL of fluid or another predefined quantity has been drawn into the hydraulic chamber 1338, etc.).

As shown in FIG. 49, the timing element 1322 is disposed at least partially within a recessed area 1334 defined by the base 1318 and is slidably engaged with the base 1318. According to an exemplary embodiment, the recessed area 1334 defines a rectangular channel (see FIG. 47). As shown in FIG. 49, a lower portion of the timing element 1322 is "sandwiched" or otherwise disposed between the base 1318 and a cover 1340, which prevents the timing element 1322 from separating from the base 1318. An upper portion of the timing element 1322 extends through an opening in the cover 1340. The timing element 1322 includes protrusions (e.g., bumps, rounded projections, etc.) that engage with the base 1318 and the cover 1340 to reduce the frictional force between (i) the timing element 1322 and (ii) the base 1318 and cover 1340. As shown in FIG. 49, the maximum allowable movement of the base 1318 in a lateral direction (e.g., side to side as shown in FIG. 49) is limited by a size of the opening in the cover 1340 and/or spacing between sidewalls of the recessed area 1334.

According to an exemplary embodiment, the timing element 1322 includes an extension piece 1342 (e.g., extension, tab, arm, etc.) that is configured to selectively engage a lower surface 1344 of the rocker arm 1320. As shown in FIG. 49, the self-return mechanism 1314 includes a spring 1346 that is configured to urge the timing element 1322 toward the rocker arm 1320. The timing element 1322 also includes a pair of locating tabs 1348 that are configured to reposition the timing element 1322 based on a fill level of the hydraulic chamber 1338 (e.g., based on a position of the piston 1336 within the hydraulic chamber 1338). As shown in FIG. 49, each of the locating tabs 1348 extends upwardly from the timing element 1322 in substantially parallel orientation to the central axis 1310 of the housing 1308. The locating tabs 1348 are configured to engage a portion of a plunger 1350 that is disposed within and slidably engaged with a lower end of the hydraulic chamber 1338. In particular, each of the locating tabs 1348 are configured to engage a corresponding one of a pair of plunger tabs 1352 extending downwardly from a main body of the plunger 1350. The locating tabs 1348 slidably engage the plunger tabs 1352 along an interface surface (e.g., an upper surface of the locating tabs 1348), which is oriented at an angle with respect to the central axis 1310 of the housing 1308, such that movement of the plunger 1350 toward the timing element 1322 urges the timing element 1322 away from the rocker arm 1320. The number, size, and arrangement of the locating tabs 1348 and plunger tabs 1352 may differ in various exemplary embodiments.

Figure 50:
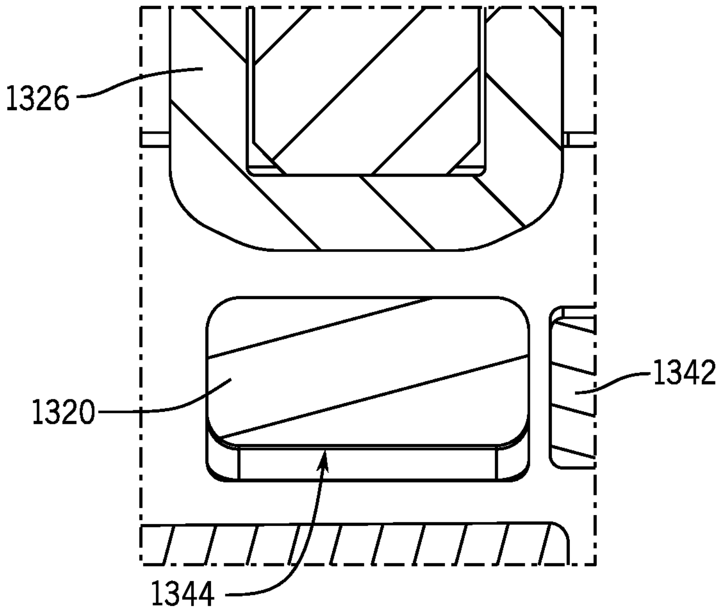
FIG. 50 is a reproduction of a portion of FIG. 49 near a rocker-arm of the self-return mechanism.
Figure 51:
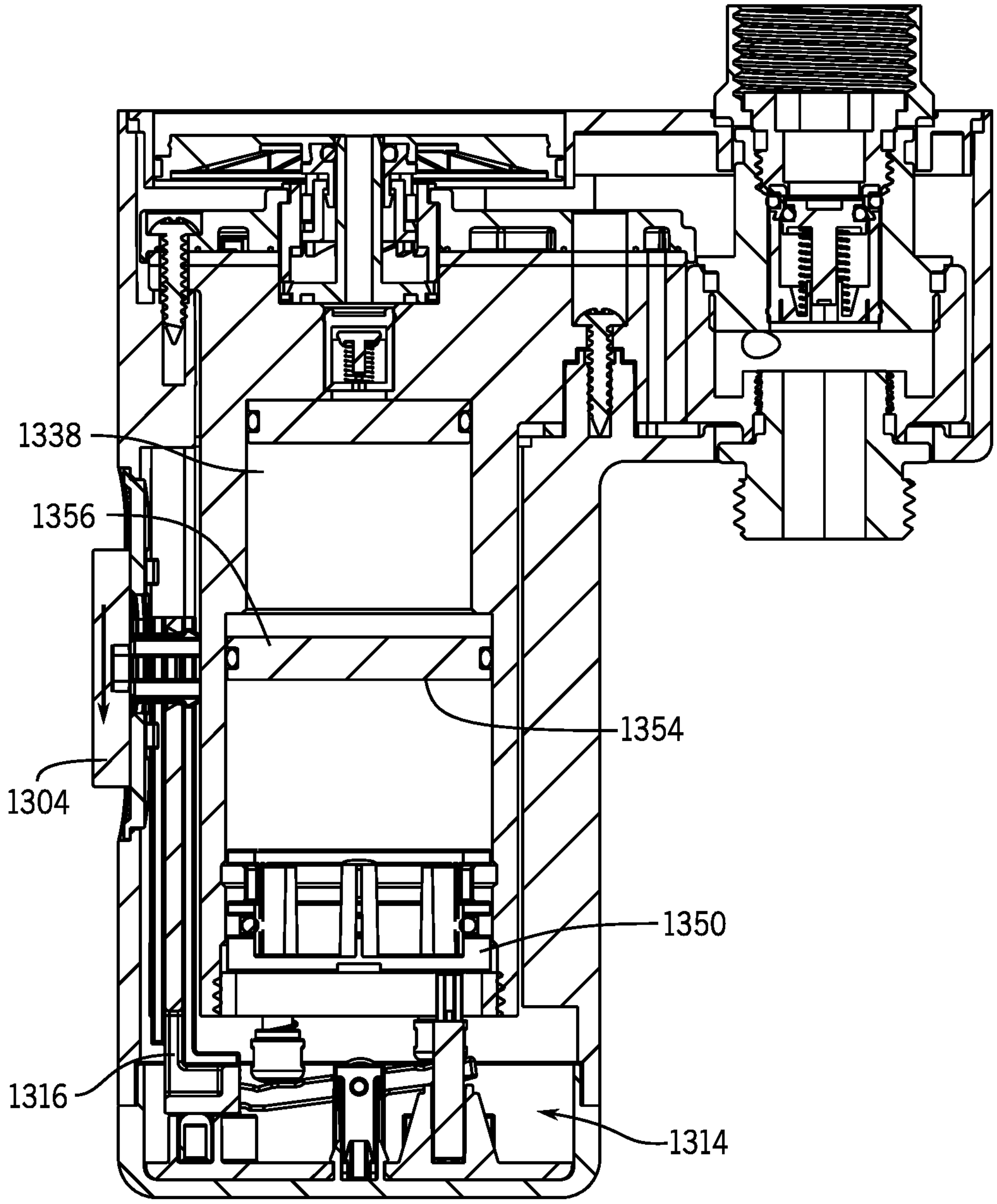
FIG. 51 is a side cross-sectional view of the inline shower device of FIG. 43 in a second operating state.
Figure 52:
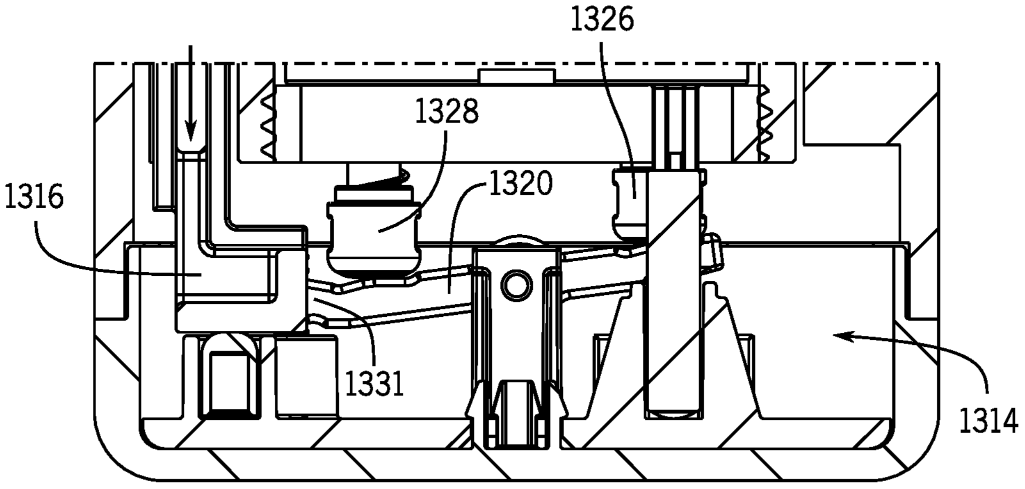
FIG. 52 is a reproduction of a portion of FIG. 51 near the self-return mechanism.
Figure 53:
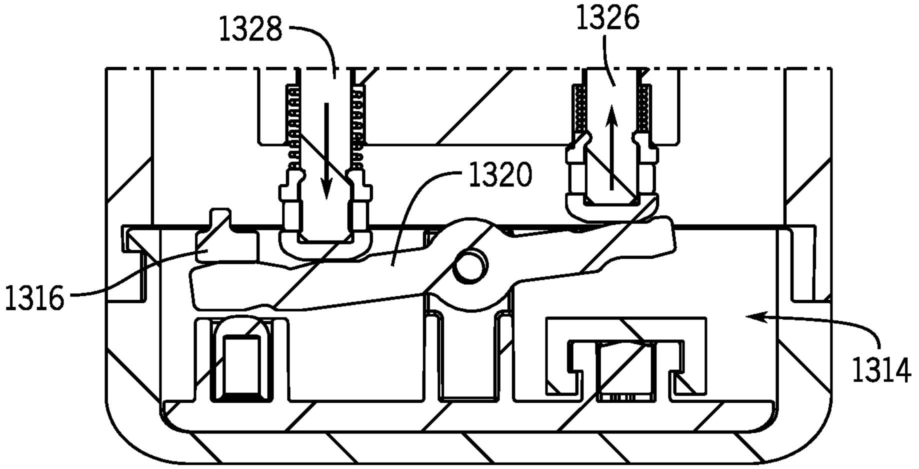
FIG. 53 is a side cross-sectional view the self-return mechanism in the second operating state.
Figure 54:
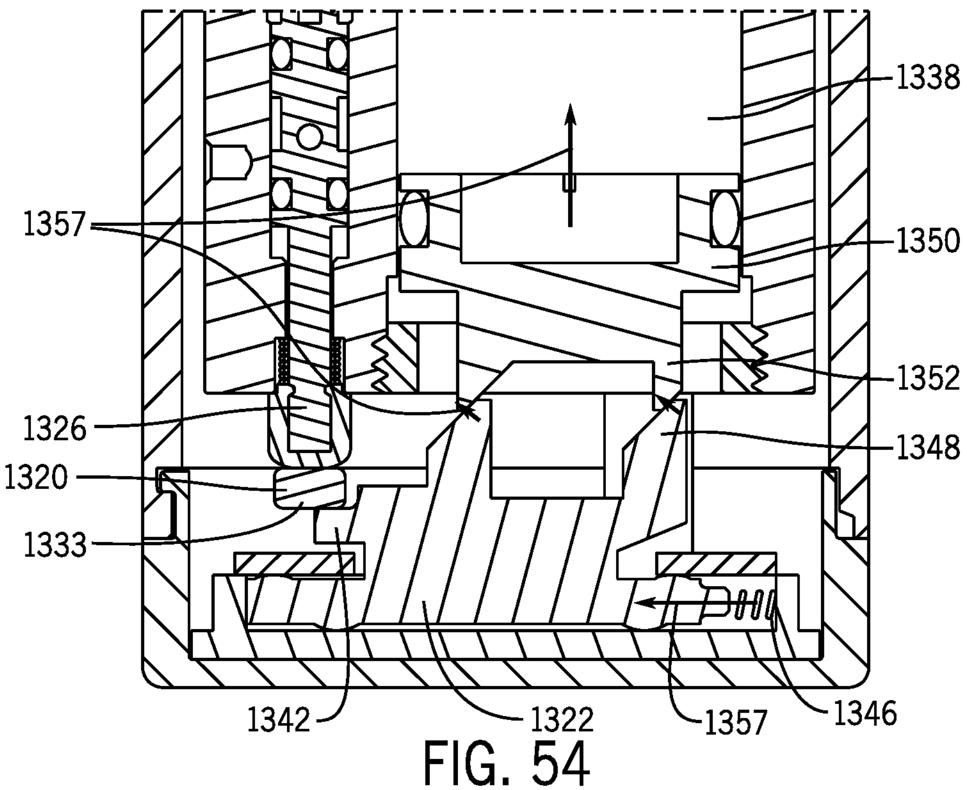
FIG. 54 is a side cross-sectional view of the self-return mechanism in between the first operating state and the second operating state.
Figure 55:
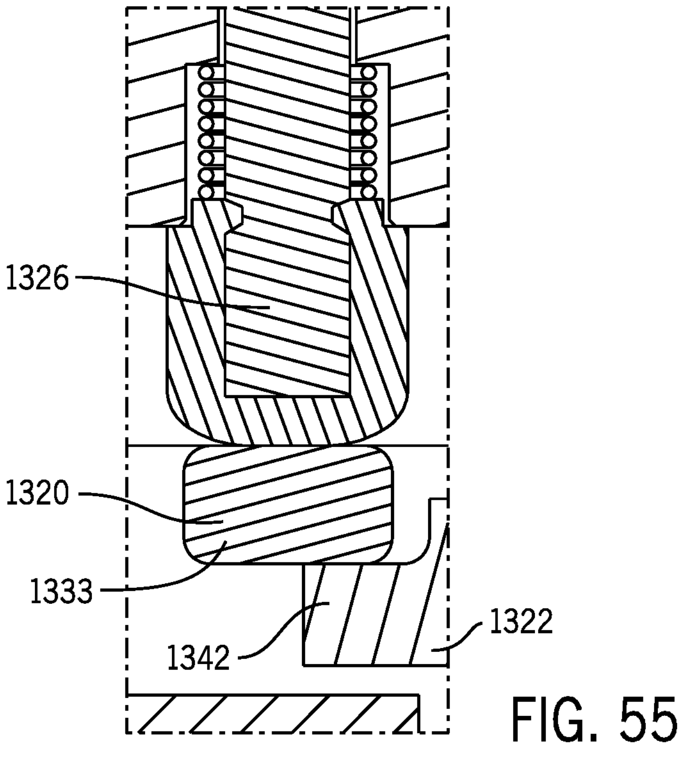
FIG. 55 is a reproduction of a portion of FIG. 54 near the rocker-arm.

FIGS. 49-56 show the position of various parts of the dispensing device 1300 and self-return mechanism 1314 during a dispensing operation. As shown in FIGS. 49-50, before activating the dispensing device 1300, the extension piece 1342 of the timing element 1322 is spaced apart from the rocker arm 1320. FIGS. 51-53 show the position of the self-return mechanism 1314 after depressing the slider 1304 (and interface member 1316). As shown in FIG. 52, a lower end of the interface member 1316 presses downwardly on the first end 1331 of the rocker arm 1320, pivoting the rocker arm 1320 away from the second valve 1328, and bringing the rocker arm 1320 into engagement with the first valve 1326. The change in the position of the valves causes a decrease in the fluid pressure on the second side 1354 of the piston 1356 (e.g. within the hydraulic chamber 1338 between the piston 1356 and the plunger 1350), thereby allowing the plunger 1350 to move upwardly and further into the hydraulic chamber 1338. As shown in FIGS. 54-55, the force acting on the timing element 1322 from the spring 1346 moves the timing element 1322 toward the rocker arm 1320, such that the extension piece 1342 is positioned below the second side 1333. The interaction between the locating tabs 1348 on the timing element 1322 and the plunger tabs 1352 moves the plunger 1350 farther into the hydraulic chamber 1338 and toward the piston 1356. Arrows 1357 in FIG. 54 indicate the direction of the force applied by the spring 1346 on the timing element 1322, and by the timing element 1322 on the plunger 1350.

Figure 56:
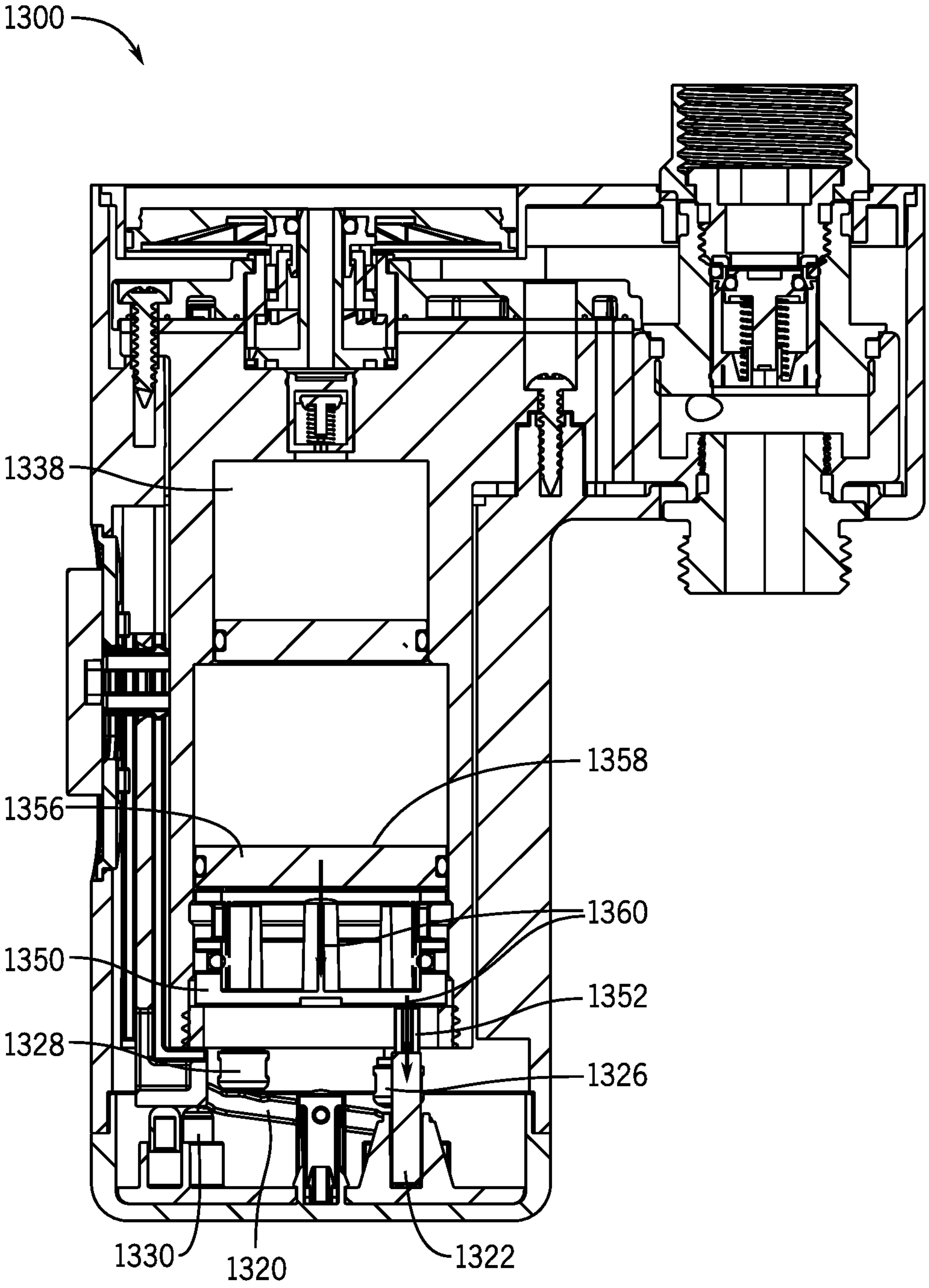
FIG. 56 is a side cross-sectional view of the inline dispensing device of FIG. 43 in a third operating state.

As shown in FIG. 56, the change in fluid pressure in the hydraulic chamber 1338 (e.g., from fluid entering the hydraulic chamber 1338 on the first side 1358 of the piston 1356) causes the piston 1356 to move downwardly toward the plunger 1350. The downward movement of the piston 1356 also draws aromatic liquid into the hydraulic chamber 1338 from the capsule (not shown). As the hydraulic chamber 1338 fills with aromatic liquid, the piston 1356 engages the plunger 1350 and moves the plunger 1350 back toward its initial position at the lower end of the hydraulic chamber 1338. The movement of the plunger 1350 (e.g., plunger tabs 1352) causes the timing element 1322 to retract away from the rocker arm 1320. Arrows 1360 in FIG. 56 indicate the approximate direction of force applied by the piston 1356 to the plunger 1350, and by the plunger 1350 to the timing element 1322. Once extension piece 1342 (see FIG. 55) is removed from below the rocker arm 1320, the spring loaded actuator 1330 pivots the rocker arm 1320 back to its initial position, retracting first valve 1326 and depressing second valve 1328, to eject the aromatic liquid through the outlet port of the dispensing device 1300.

Figure 58:
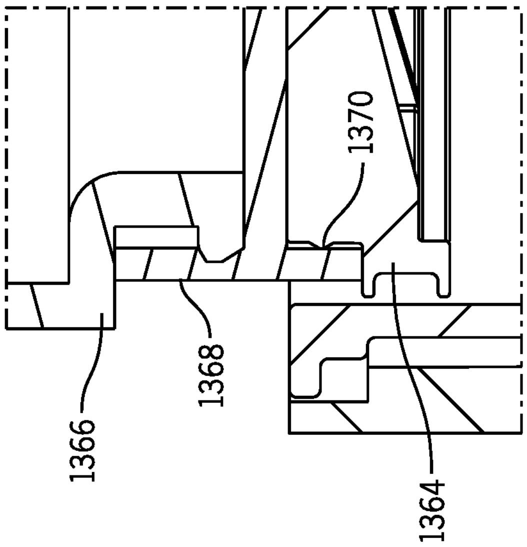
FIG. 58 is a reproduction of a portion of FIG. 57 near a diaphragm.
Figure 57:
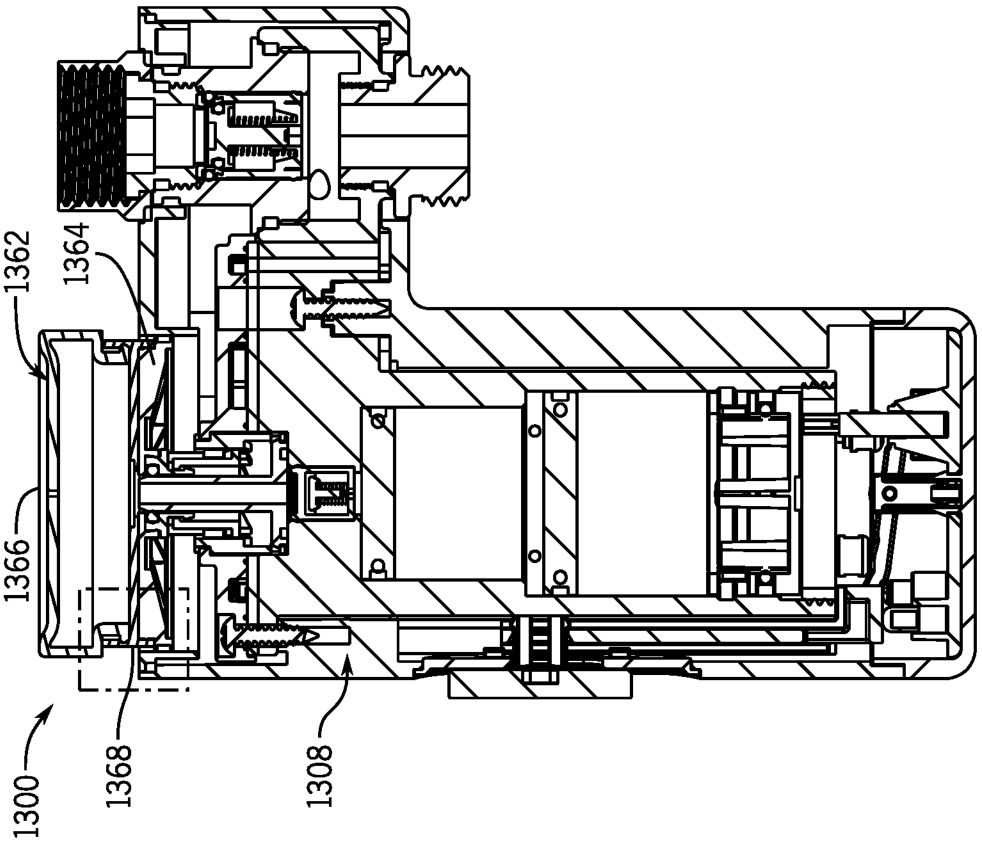
FIG. 57 is another side cross-sectional view of the inline dispensing device of FIG. 43.

FIGS. 57-61 show the mechanical interface between capsule 1362 and the housing 1308. Similar to the capsule 508 described with reference to FIGS. 24-27, the capsule 1362 of FIGS. 57-61 is coupled to the housing 1308 via a diaphragm 1364, which is disposed on the upper end of the housing 1308. The capsule 1362 includes an upper body portion 1366, and a lower body portion 1368 coupled to the upper body portion 1366. The lower body portion 1368 defines a recessed area configured to receive the diaphragm 1364 therein to removably couple the capsule 1362 to the housing 1308. As shown in FIG. 58, the diaphragm 1364 includes a protrusion 1370 (e.g., a projection, bump, etc.) that engages with an outer wall of the recessed area to help retain the capsule 1362 in position (e.g., provides a mechanical interference or friction fit between the capsule 1362 and the diaphragm 1364). According to an exemplary embodiment, the protrusion 1370 extends in a circumferential direction along a perimeter of the diaphragm 1364 to facilitate sealing between the diaphragm 1364 and the lower body portion 1368.

Figure 59:
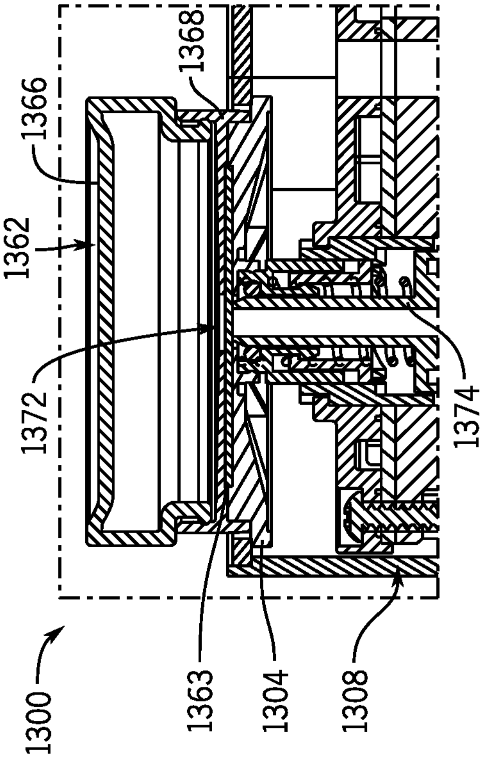
FIGS. 59-61 are side cross-sectional views of a first actuator of the inline dispensing device of FIG. 43, in various states of operation.
Figure 60:
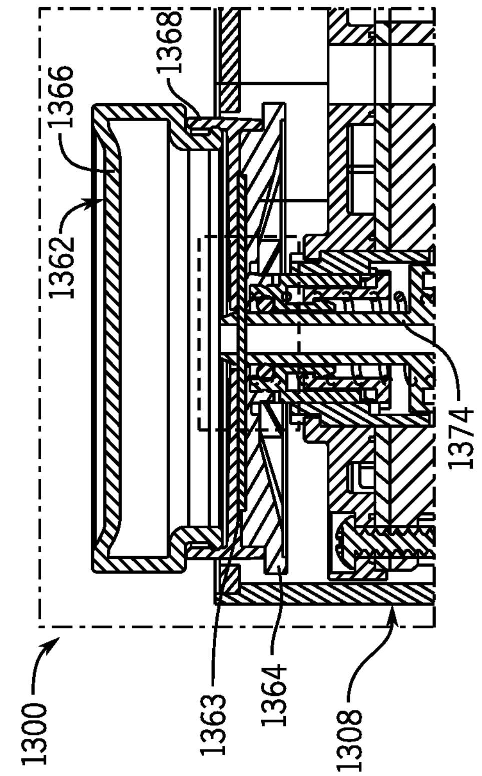
Figure 61:
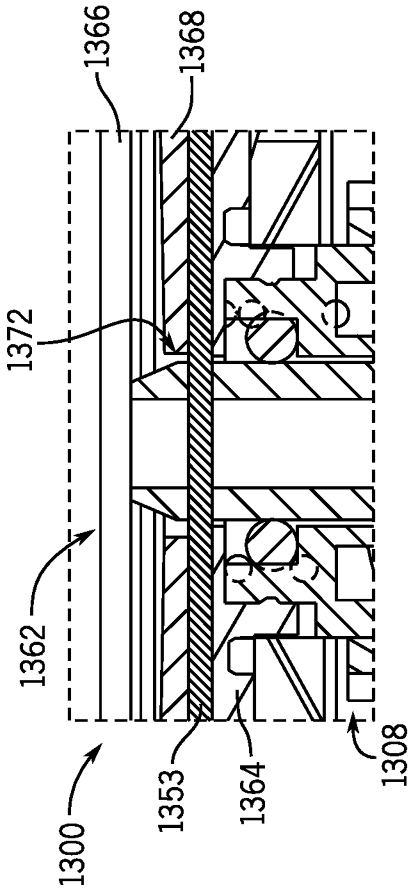

As shown in FIGS. 59-61, the capsule 1362 includes an opening 1372 disposed centrally within the lower body portion 1368. The opening 1372 is sized to receive a hollow pin 1374 of the dispensing device 1300. The hollow pin 1374 defines a passageway that guides (e.g., directs) the fluid from the capsule 1362 and into the hydraulic chamber 1338 (see FIG. 57). FIG. 59 shows the capsule 1362 after being positioned onto the diaphragm 1364, at an upper position that is farthest from the housing 1308. FIG. 60 shows the position of the pin 1374 within the capsule 1362 after applying a downward force to press the capsule 1362 toward the housing 1308. The downward force moves the capsule 1362 and diaphragm 1364 toward the housing 1308 (e.g., a distance of approximately 0.100 in. toward the housing 1308, or another suitable distance to engage the pin 1374 with the capsule 1362), to a lower position. The movement of the capsule 1362 forces the pin 1374 through a sealing member 1363 (e.g., film, etc.) on a lower surface of the capsule 1362 (e.g., lower body portion 1368) and through the opening 1372. FIG. 61 shows the position of the pin 1374 after removing the downward force from the capsule 1362 (after the capsule 1362 has been fully installed onto the dispensing device 1300, with the diaphragm 1364 at an intermediate vertical position the upper position and the lower position).

Figure 62:
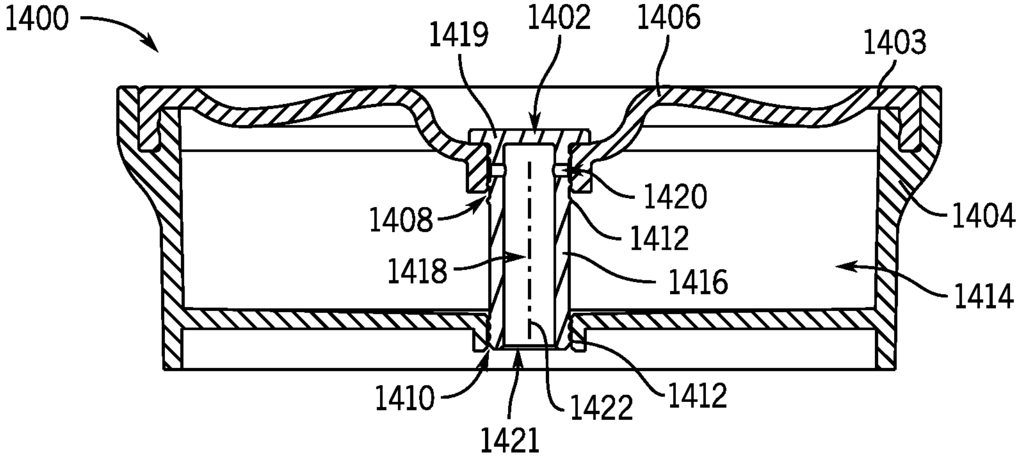
FIG. 62 is a side cross-sectional view of a capsule, according to another exemplary embodiment.

The interaction between the capsule and the dispensing device (e.g., first actuator) may differ in various exemplary embodiments and depending on the design of the capsule. For example, FIG. 62 show another capsule 1400 that can be used with the dispensing device 1300 of FIGS. 57-61. The capsule 1400 includes a sealing plunger 1402 (e.g., plug, pin, etc.) that is configured to interact with the hollow pin in a dispensing device to open of a vent port that facilitates the release of the aromatic liquid from the capsule 1400. As shown in FIG. 62, the capsule 1400 includes an upper body portion 1403 (e.g., cap, cover, etc.) and a lower body portion 1404 coupled to the upper body portion 1403. The upper body portion 1403 defines a raised area 1406 that is curved away from the lower body portion 1404 to reduce water accumulation above the capsule 1400 during use.

The sealing plunger 1402 is configured to engage with and seal against the upper body portion 1403 and the lower body portion 1404 when the capsule 1400 is not in use (e.g., before being installed onto the dispensing device 1300). As shown in FIG. 62, the upper body portion 1403 defines an upper opening 1408 that disposed at a central position along the upper body portion 1403, in substantially coaxial arrangement with a lower opening 1410 in the lower body portion 1404. The upper opening 1408 and lower opening 1410 are sized to receive the sealing plunger 1402 therein. As shown in FIG. 62, the sealing plunger 1402 includes ribs 1412 that form a mechanical interference fit with the upper body portion 1403 and the lower body portion 1404 when the plunger 1402 is fully inserted into the capsule 1400. The ribs 1412 press against the upper body portion 1403 and the lower body portion 1404 to seal an internal cavity 1414 of the capsule 1400 from an environment surrounding the capsule 1400.

As shown in FIG. 62, the plunger 1402 includes a cylindrical body 1416 defining a hollow cavity 1418. In other exemplary embodiments, the cross-sectional shape of the plunger 1402 may be different. The hollow cavity 1418 extends from an upper wall 1419 of the plunger 1402 to an opening 1421 at a lower end of the plunger 1402. The cylindrical body 1416 also defines a pair of vent openings 1420 disposed proximate to the upper wall 1419. The vent openings 1420 extend through the cylindrical body 1416 in a substantially perpendicular orientation relative to a central axis 1422 of the hollow cavity 1418. As shown in FIG. 62, the vent openings 1420 are positioned between an upper surface and a lower surface of the upper body portion 1403 when the plunger 1402 is fully inserted into the capsule 1400, which, advantageously, prevents dirt and/or other contaminants from clogging the vent openings 1420 when the capsule 1400 is not in use. According to an exemplary embodiment, the capsule 1400 includes ribs 1412 positioned on either side of the vent openings 1420 (e.g., above and below the vent openings 1420), which further mitigates the risk of particulate contamination in the vent openings 1420.

Figure 63:
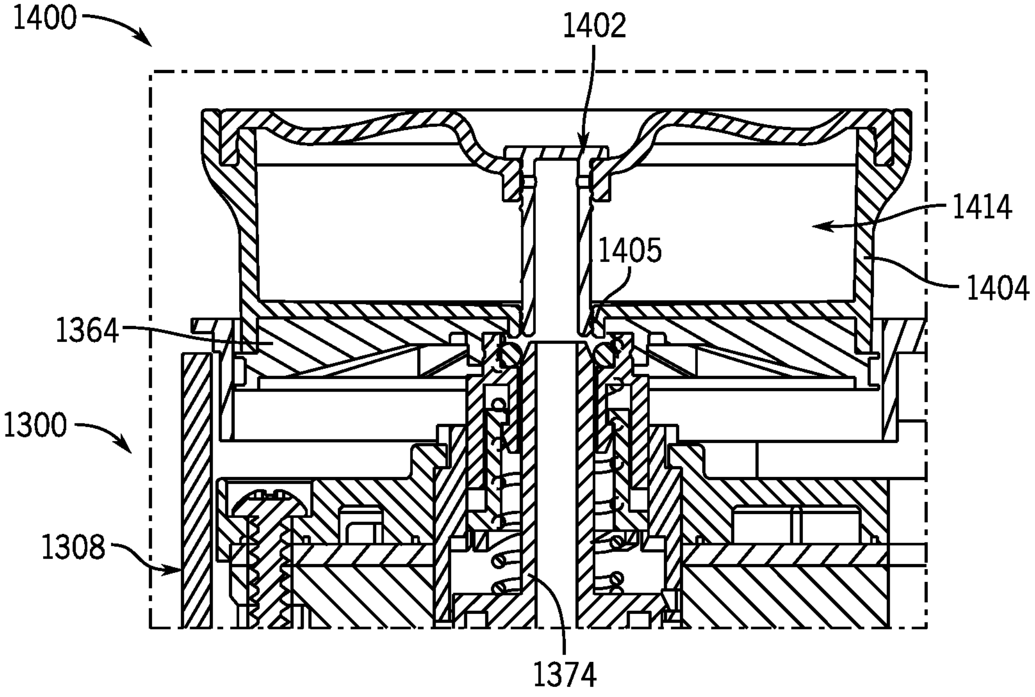
FIGS. 63-65 are side-cross-sectional views of a first actuator portion of an inline dispensing device, in various states of operation, according to another exemplary embodiment.
Figure 64:
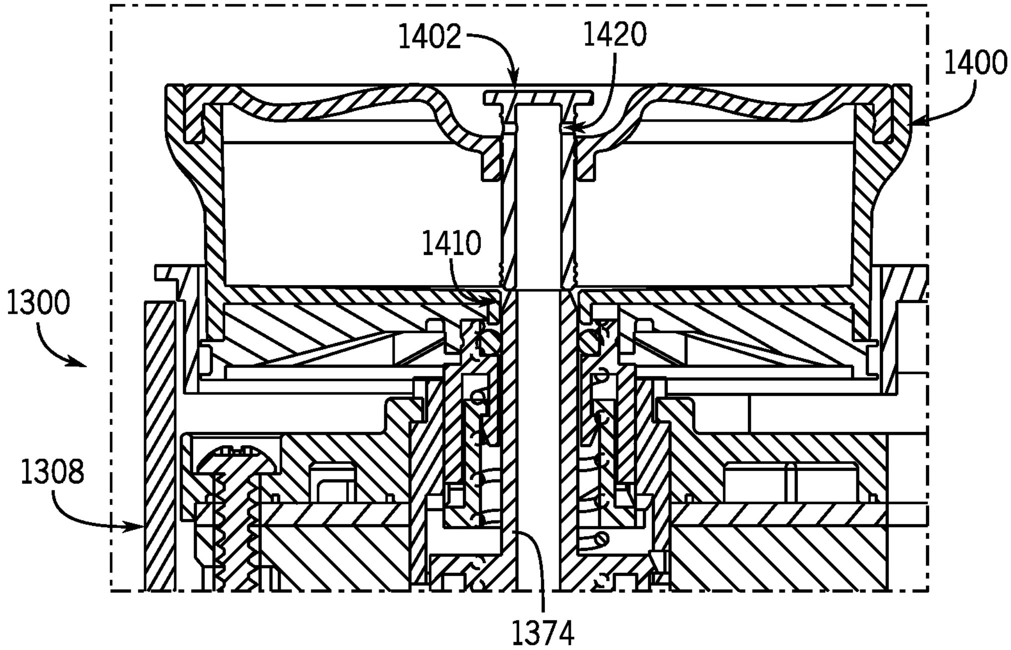
Figure 65:
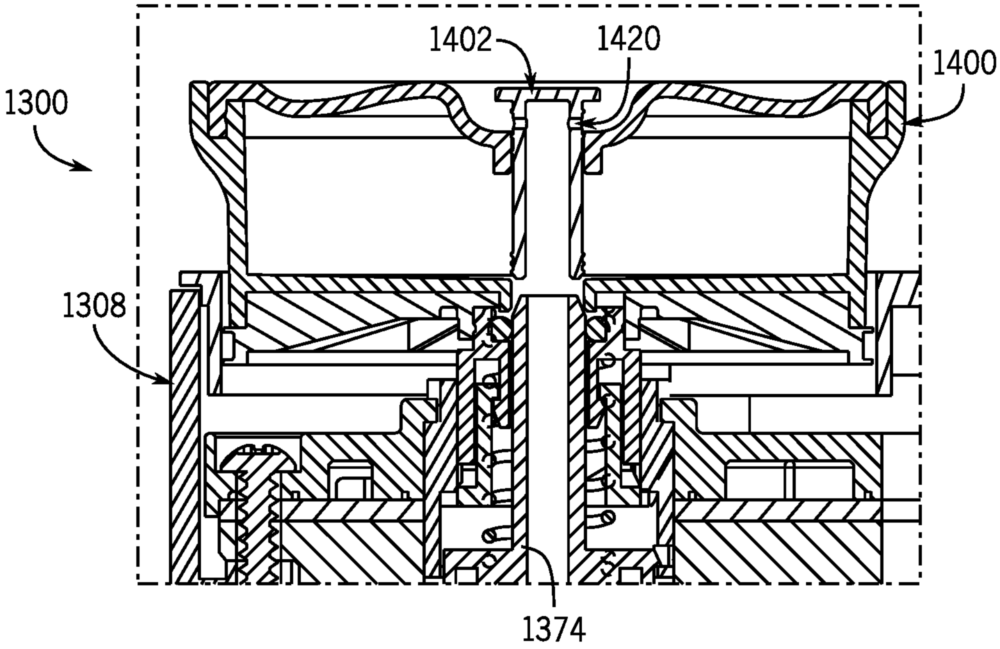

FIGS. 63-65 show the interaction between the plunger 1402 and the hollow pin 1374 during installation of the capsule 1400 onto the dispensing device 1300. FIG. 63 shows the capsule 1400 after being positioned onto the diaphragm 1364, before actuation, at an upper position that is farthest form the housing 1308. The lower body portion 1404 defines a cylindrical extension 1405 that is received within and seals against the diaphragm 1364. As shown in FIG. 63, a diameter of the plunger 1402 is approximately the same as a diameter of the hollow pin 1374 such that the hollow pin 1374 engages the plunger 1402 during actuation. FIG. 64 shows the interaction between the plunger 1402 and the hollow pin 1374 as the capsule 1400 is pressed toward the housing 1308. As the hollow pin 1374 moves through the lower opening 1410, the plunger 1402 is pushed upward and out of the lower opening 1410. Movement of the plunger 1402 also exposes the vent openings 1420.

FIG. 65 shows the position of the plunger 1402 after the capsule 1400 is fully installed onto the dispensing device 1300. As shown, the hollow pin 1374 is retracted away from the lower end of the plunger 1402, exposing a gap between the lower end of the plunger 1402 and the lower body portion 1404, such that fluid can be drawn into the dispensing device 1300 from the capsule 1400. The vent openings 1420 allow air to enter the internal cavity 1414 while fluid is being drawn out of the capsule 1400, which improves fluid delivery during the dispensing operation.

Figure 67:
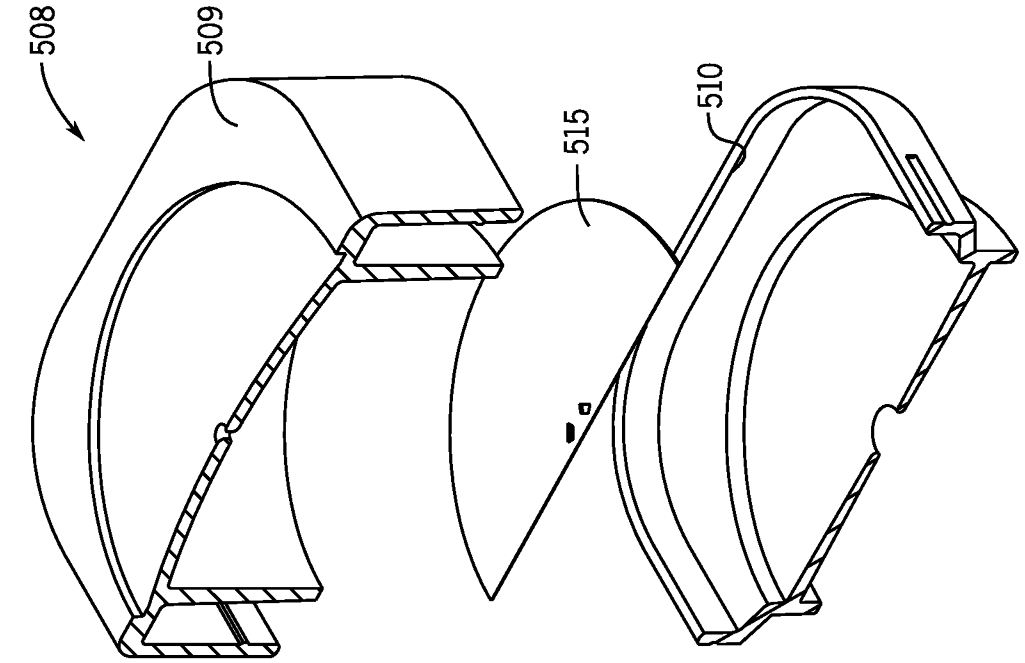
FIG. 67 is an exploded view of the capsule of FIG. 66.
Figure 66:
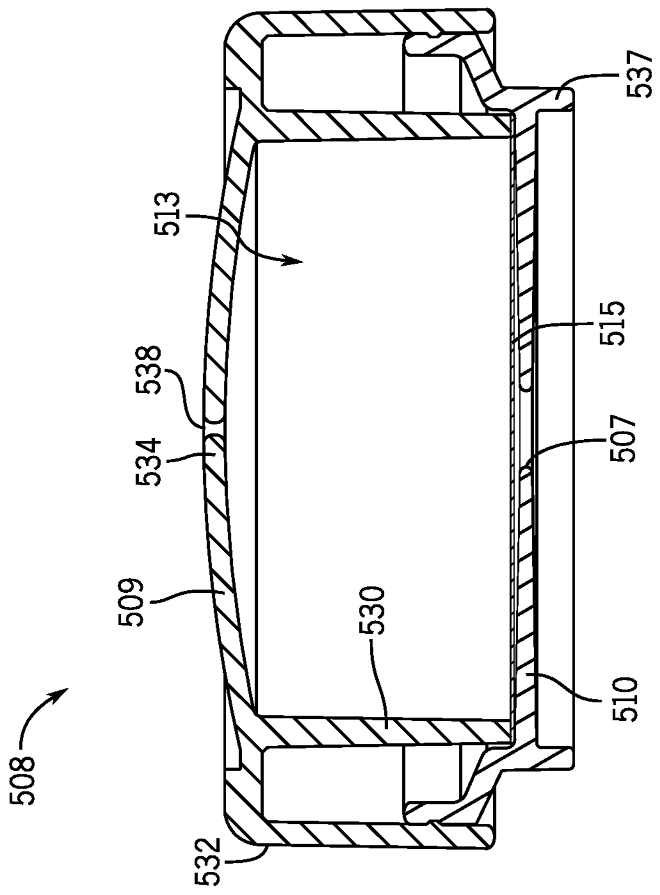
FIG. 66 is a side cross-sectional view of a capsule for the inline shower device of FIG. 22.
Figure 68:
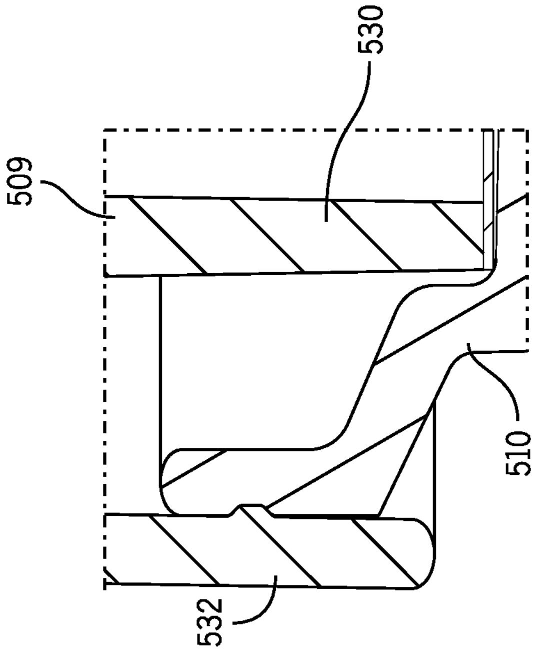
FIG. 68 is a reproduction of FIG. 66 at a location where a lower body portion of the capsule engages an upper body portion of the capsule.

The size, shape, and design of the capsule for the dispensing device may also differ in various exemplary embodiments. FIGS. 66-68 show various views of the capsule 508 that was described generally with respect to FIGS. 24-25. The capsule 508 includes an upper body portion 509 and a lower body portion 510 coupled to the upper body portion 509. The capsule 508 additionally includes a film 515, which is "sandwiched" or otherwise disposed between the upper body portion 509 and the lower body portion 510 proximate to a perimeter of the film 515. Together, the upper body portion 509 and the lower body portion 510 define an internal cavity 513 that is sized to receive a fluid (e.g., an aromatic liquid, etc.) therein. According to an exemplary embodiment, the internal cavity

513 is sized to hold approximately 15 mL of fluid, which may be approximately equal to the volume of fluid that is dispensed by the dispensing device 500 (see FIGS. 22-23) to the handshower or other fluid delivery device during a single use. The film 515 may be induction sealed to the upper body portion 509 or otherwise sealed to the upper body portion 509 to prevent fluid from leaking out of the capsule 508 when not in use (e.g., when the capsule 508 is decoupled/disconnected from the dispensing device).

The upper body portion 509 and the lower body portion 510 may be made from a plastic material via an injection molding operation or another suitable forming process. As shown in FIGS. 66-68, the upper body portion 509 includes an inner extension 530 and an outer extension 532. Both the inner extension 530 and the outer extension 532 extend away from an upper wall 533 of the upper body portion 509 in substantially perpendicular orientation relative to the upper wall 533. The outer extension 532 is spaced apart from the inner extension 530 and substantially surrounds the inner extension 530. Together, the inner extension 530 and the outer extension 532 define a channel 535 configured to receive an outer edge of the lower body portion 510 therein. As shown in FIG. 68, the lower body portion 510 is coupled to the upper body portion 509 via a snap-fit connection with the outer extension 532. In some embodiments, the capsule 508 may be refillable. Fluid may be added to the capsule 508 by separating the upper body portion 509 from the lower body portion 510, refilling the internal cavity 513, replacing the film 515, and reconnecting the upper body portion 509 to the lower body portion 510. Other mechanisms for refilling the capsule may be utilized according to other exemplary embodiments (e.g., the inclusion of an injection port configured to allow fluid to be injected into the capsule, etc.).

Figure 69:
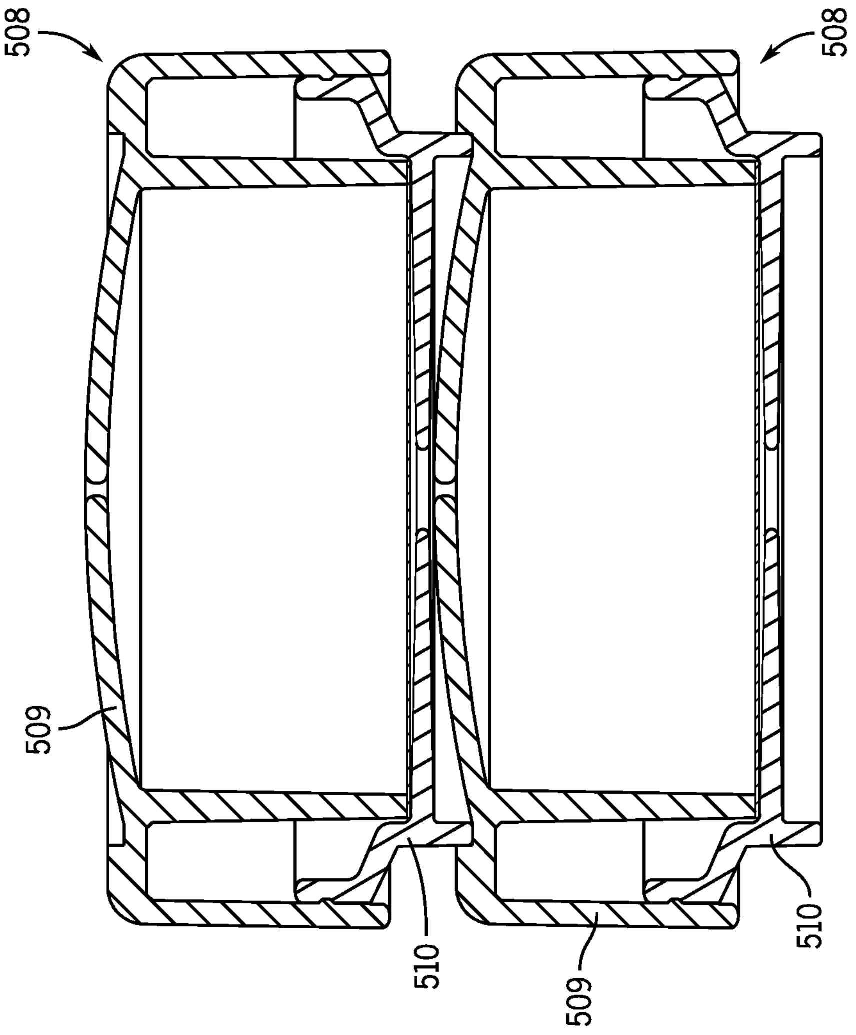
FIG. 69 is a side cross-sectional view of the capsule of FIG. 66 stacked on top of another capsule, according to an exemplary embodiment.

As shown in FIG. 66, an upper surface 536 of the upper wall 533 includes a recessed area, which is sized to receive a portion of a lower extension 537 of the lower body portion 510. Among other benefits, the combination of the recessed area and the lower extension 537 facilitates stacking of multiple capsules 508 on top of one another (e.g., stacking of the capsules 508 when not in use). Multiple capsules 508 are shown in a stacked configuration in FIG. 69. As shown in FIG. 66, the capsule 508 additionally includes an opening 538 (e.g., vent opening, hole, etc.) disposed centrally within the upper wall 533. Among other benefits, the opening 538 facilitates removal of the fluid from the capsule 508 during use by allowing air to enter the internal cavity 513. In the exemplary embodiment of FIG. 66, a diameter of the opening 538 is within a range between approximately 0.03 in. and 0.05 in. In other embodiments, the size of the opening 538 may be different. When not in use, a tape or biodegradable adhesive may be applied over the opening 538 to seal the opening 538 and to prevent any fluid leakage from the capsule 508.

Figure 72:
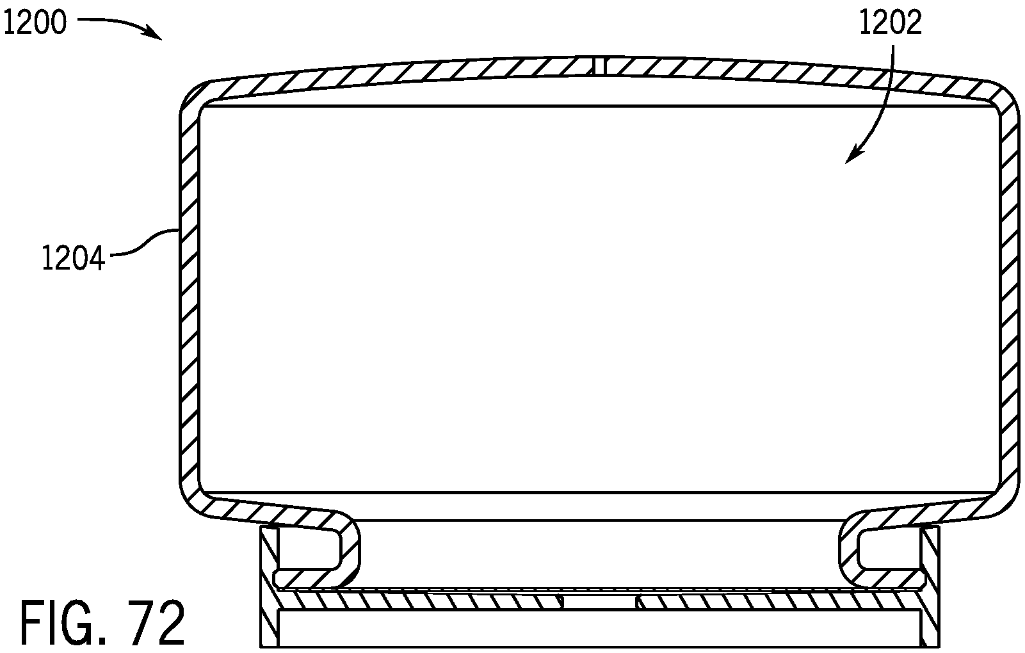
FIG. 72 is a side cross-sectional view of a capsule for an inline shower device, according to another exemplary embodiment.
Figure 73:
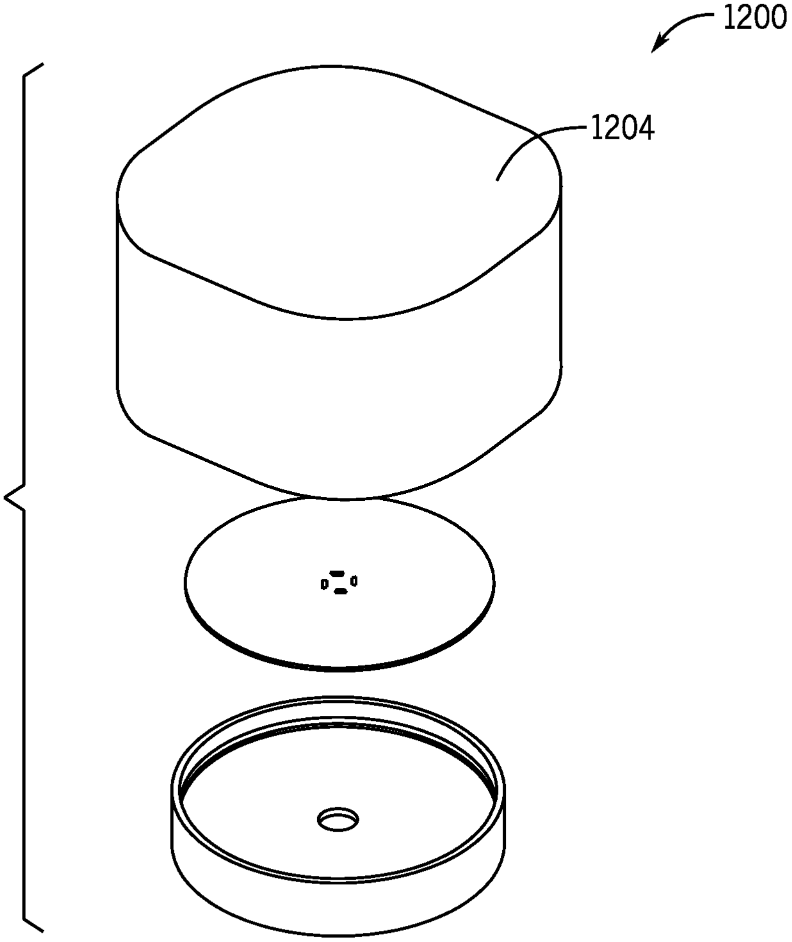
FIG. 73 is an exploded view of the capsule of FIG. 72.

Another exemplary embodiment of a capsule 1100 is shown in FIGS. 70-71. The capsule 1100 includes an upper body portion 1102 and a lower body portion 1104 coupled to the upper body portion 1102. As shown in FIG. 70, the upper body portion 1102 defines a hooked portion 1106 that is configured to engage with an interior surface of the lower body portion 1104. Among other benefits, the geometry of the upper body portion 1102 shown in FIGS. 70-71 may be produced from a plastic material via a blow molding manufacturing operation. FIGS. 72-73 show yet another exemplary embodiment of a capsule 1200. As shown in FIG. 72, an interior cavity 1202 of an upper body portion 1204 of the capsule 1200 is oversized such that it may receive a larger volume of fluid than the capsules 508, 1100 of FIGS. 66-68 and FIGS. 70-71. Among other benefits, the larger interior cavity 1202 allows the dispensing device to operate multiple times before the capsule 1200 needs to be replaced or refilled. In the exemplary embodiment shown, the capsule 1200 is sized to receive a fluid volume of approximately 85 mL, which in some instances, is enough fluid for at least five dispensing cycles.

Figure 75:
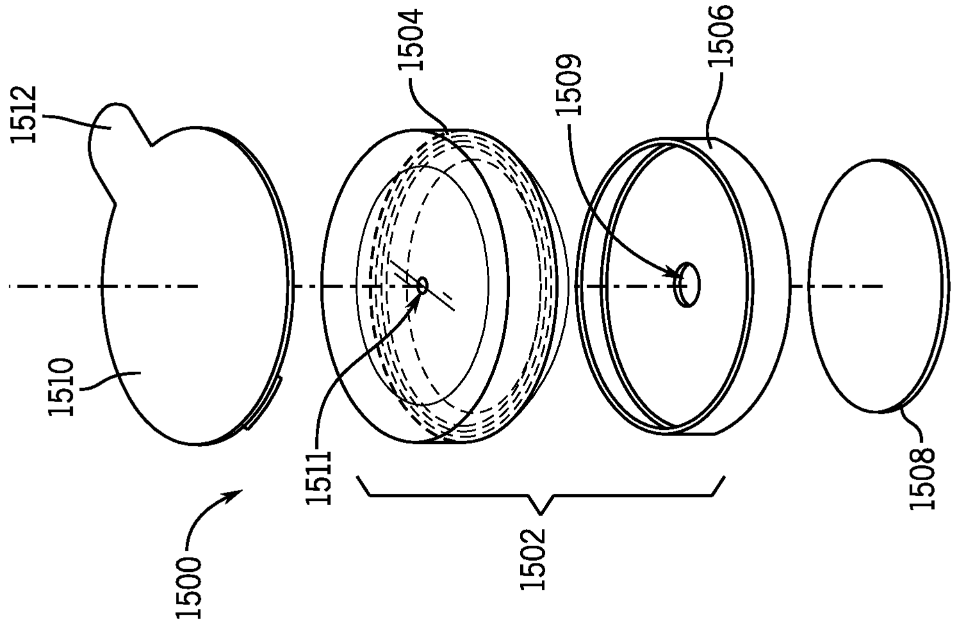
FIG. 75 is an exploded view of the capsule of FIG. 74.
Figure 74:
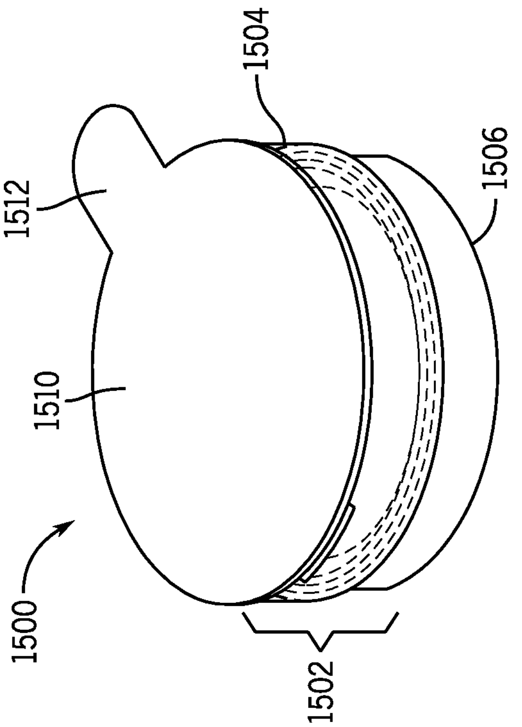
FIG. 74 is a perspective view of a capsule, according to another exemplary embodiment.

Another exemplary embodiment of a capsule 1500 is shown in FIGS. 74-75. In particular, FIGS. 74-75 show how the capsule 1500 may be sealed when not in use (e.g., before installation onto the dispensing device). The capsule 1500 includes a capsule body 1502 including an upper body portion 1504 and a lower body portion 1506. The upper body portion 1504 and the lower body portion 1506 are hermetically sealed to one another via ultrasonic welding, friction welding, or another mechanical connection that substantially prevents fluid from leaking from the capsule 1500. In other embodiments, the capsule 1500 includes glue or another adhesive product to hermetically seal the upper body portion 1504 to the lower body portion 1506. The capsule 1500 also includes a lower sealing member 1508 and an upper label 1510, which cover openings in the capsule 1500 to minimize fluid leakage when the capsule 1500 is not in use. The lower sealing member 1508 is affixed to a lower surface of the lower body portion 1506, such that the lower sealing member 1508 covers a lower opening 1509. The lower sealing member 1508 may be an adhesive film, an induction seal, or another type of bonded covering. The upper label 1510 is affixed to an upper surface of the upper body portion 1504, such that the upper label 1510 covers a vent opening 1511 in the upper body portion 1504. According to an exemplary embodiment, the upper label 1510 is made from the same material as the lower sealing member 1508. In other embodiments, the materials used for the upper label 1510 and the lower sealing member 1508 may be different. In the embodiment of FIGS. 74-75, the upper label 1510 is perforated and also includes a tab 1512 to facilitate manual removal during installation (e.g., to uncover the vent opening 1511).

In some embodiments, the interface between the capsule and the dispensing device may be designed to prevent the use of incorrect/inappropriate capsule designs (e.g., to prevent the use of other third party capsules that may cause damage if used with the dispensing device). For example, the capsules may include an electronic barcode or another identifier that can be used to verify that the correct capsule has been installed onto the dispensing device. The dispensing device may be configured to scan the barcode after installation, and to selectively prevent use of the capsule if the barcode indicates that an incorrect capsule is being used. In other embodiments, the capsule may be designed with a complimentary receiving structure (e.g., a poka-yoke feature, etc.) that prevents incorrect capsules from being installed on the dispensing device, or from being punctured by the hollow pin. For example, the hollow pin in the dispensing device may have a unique cross-sectional shape that matches with the cross-sectional shape of the opening in the capsule (e.g., star shape, hex shape, etc.). In other embodiments, the diaphragm may be specifically designed to prevent sealing when an incorrect capsule is installed onto the dispensing device. For example, the diaphragm may include ribs (e.g., projections, etc.) that extend upwardly from the diaphragm into corresponding slots in the lower body portion of the capsule. The ribs may be sized to prevent an incorrect capsule from engaging the diaphragm. In yet other embodiments, another form of complimentary receiving structure or capsule detection method may be used.

Figure 76:
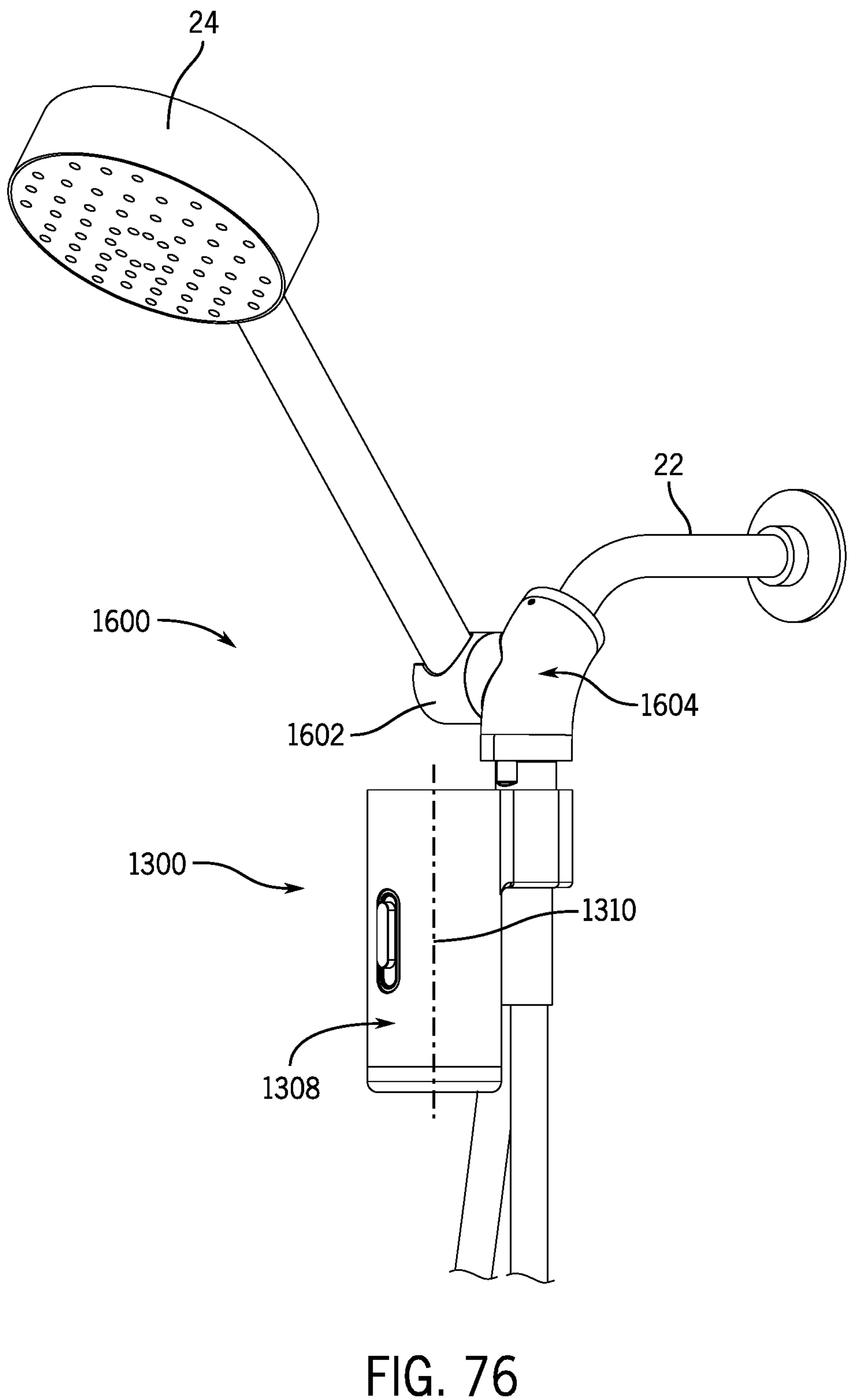
FIG. 76 is a perspective view of a system for installing an inline shower device.
Figure 77:
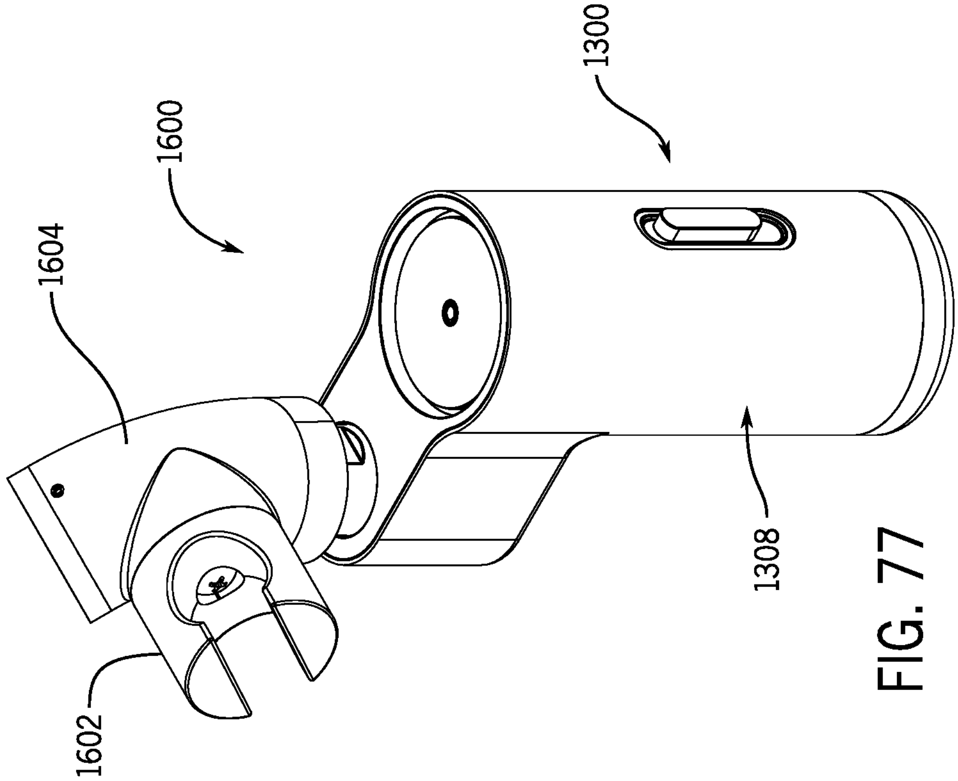
FIG. 77 is a perspective view of the system of FIG. 76.

As described above, the dispensing device may be integrated into an existing shower assembly (e.g., as part of an existing showerhead and/or handshower). Referring to FIGS. 76-77, a system 1600 for installing the dispensing device onto a fluid conduit 22 upstream of a flow distribution device (e.g., handshower 24) is shown, according to an exemplary embodiment. The fluid conduit 22 may be a pipe (e.g., stem, flow tube, etc.) coupled to a residential and/or commercial fluid supply line (e.g., water line at line pressure, within a range between 40 psi and 60 psi, or another suitable supply pressure for a residence or commercial building) that extends into the shower area. The dispensing device may be any one of the dispensing devices described herein. In the embodiment of FIGS. 76-77, the dispensing device is the same as the dispensing device 1300 described with reference to FIGS. 43-61.

Figure 78:
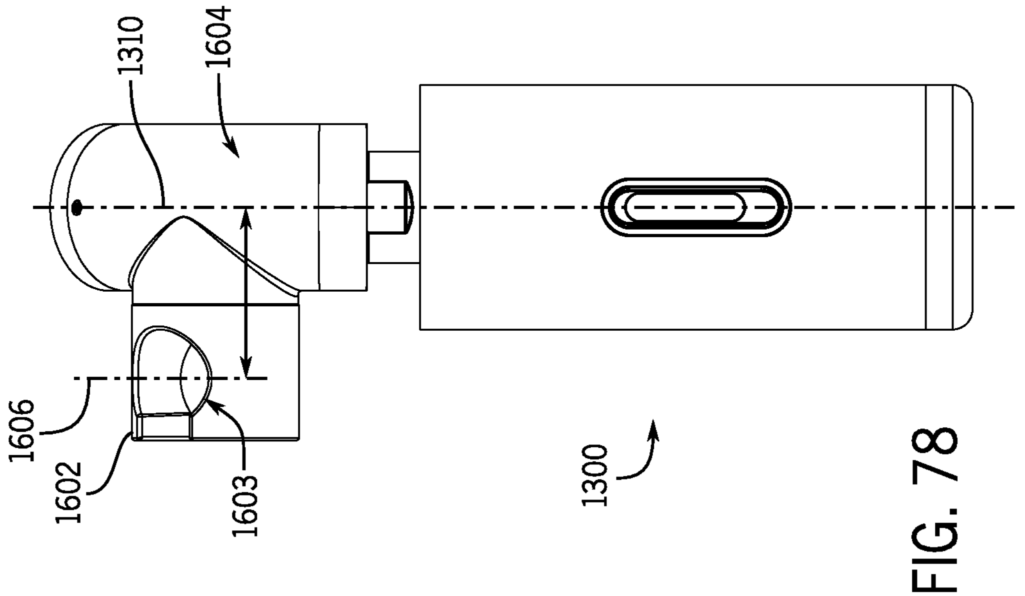
FIG. 78 is a front view of the system of FIG. 76.

According to an exemplary embodiment, the system 1600 is configured to support the dispensing device 1300 on the fluid conduit 22 in a substantially vertical orientation, such that the central axis 1310 of the housing 1308 is oriented parallel to a direction of gravity. As shown in FIGS. 76-77, the system 1600 includes a handshower cradle 1602 and a coupler 1604. The handshower cradle 1602 is configured to receive and support a handshower 24 (e.g., a handle of the handshower 24) alongside the dispensing device 1300. The cradle 1602 extends in substantially perpendicular orientation relative to a flow direction through the coupler 1604. As shown in FIG. 78, the cradle 1602 is disposed alongside the coupler 1604 (e.g., to the left side of the coupler 1604 as shown in FIG. 78), upstream of the dispensing device 1300. The cradle 1602 is rotatably coupled to the coupler 1604. As shown in FIG. 78, the cradle 1602 defines a "C" shaped opening 1603 that is sized to receive a handle of the handshower 24 therein. In the embodiment of FIG. 78, the cradle 1602 is formed from an acrylonitrile butadiene styrene (ABS) plastic material, although other materials may be used in various exemplary embodiments.

As shown in FIG. 78, a central axis 1606 through the opening 1603 is spaced apart from the central axis 1310 of the dispensing device 1300 by approximately 1.5 in., although the spacing may differ in various exemplary embodiments. Among other benefits, positioning the handshower cradle 1602 alongside the coupler 1604 (e.g., away from the dispensing device 1300) avoids pinch points between the handshower 24 and the dispensing device 1300 (see FIG. 76). In other embodiments, the interface between the cradle 1602 and the handshower 24 may be different. For example, the cradle 1602 may include magnets that interact with the handle and/or another part of the handshower 24 to couple the handshower 24 to the system 1600. In other embodiments, the cradle 1602 may include another type of connecting mechanism to receive and support the handshower 24.

Figure 79:
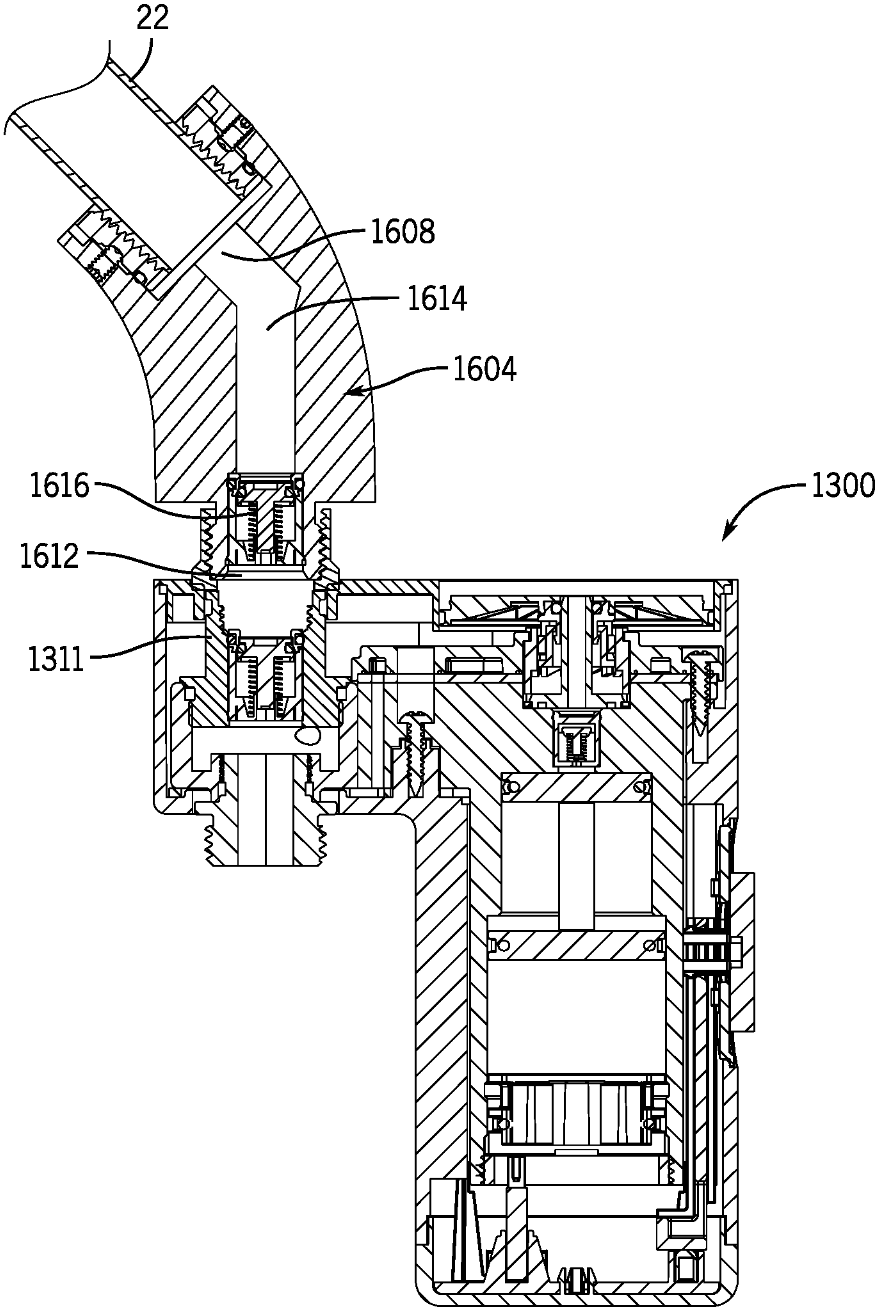
FIG. 79 is a side cross-sectional view of the system of FIG. 76.

FIG. 79 shows a side cross-sectional view through the coupler 1604 and dispensing device 1300. The coupler 1604 is configured to rigidly connect the dispensing device 1300 to the fluid conduit 22. As shown in FIG. 79, an inlet port 1608 of the coupler 1604 is fluidly coupled to a distal end of the fluid conduit 22. An outlet port 1612 of the coupler 1604, downstream of the inlet port 1608, is fluidly coupled to the inlet port 1311 of the dispensing device 1300. The coupler 1604 defines a central channel 1614 that fluidly couples the inlet port 1608 to the outlet port 1612. According to an exemplary embodiment, the coupler 1604 includes a check valve 1616 that is ensures unidirectional flow through the fluid conduit 22. The check valve is disposed within the central channel 1614 proximate to the outlet port 1612. In other embodiments, the location of the check valve 1616 may be different. As shown in FIG. 79, the dispensing device 1300 also includes a check valve, proximate to the inlet port 1311, to prevent backflow through the dispensing device 1300 and into the coupler 1604.

Figure 80:
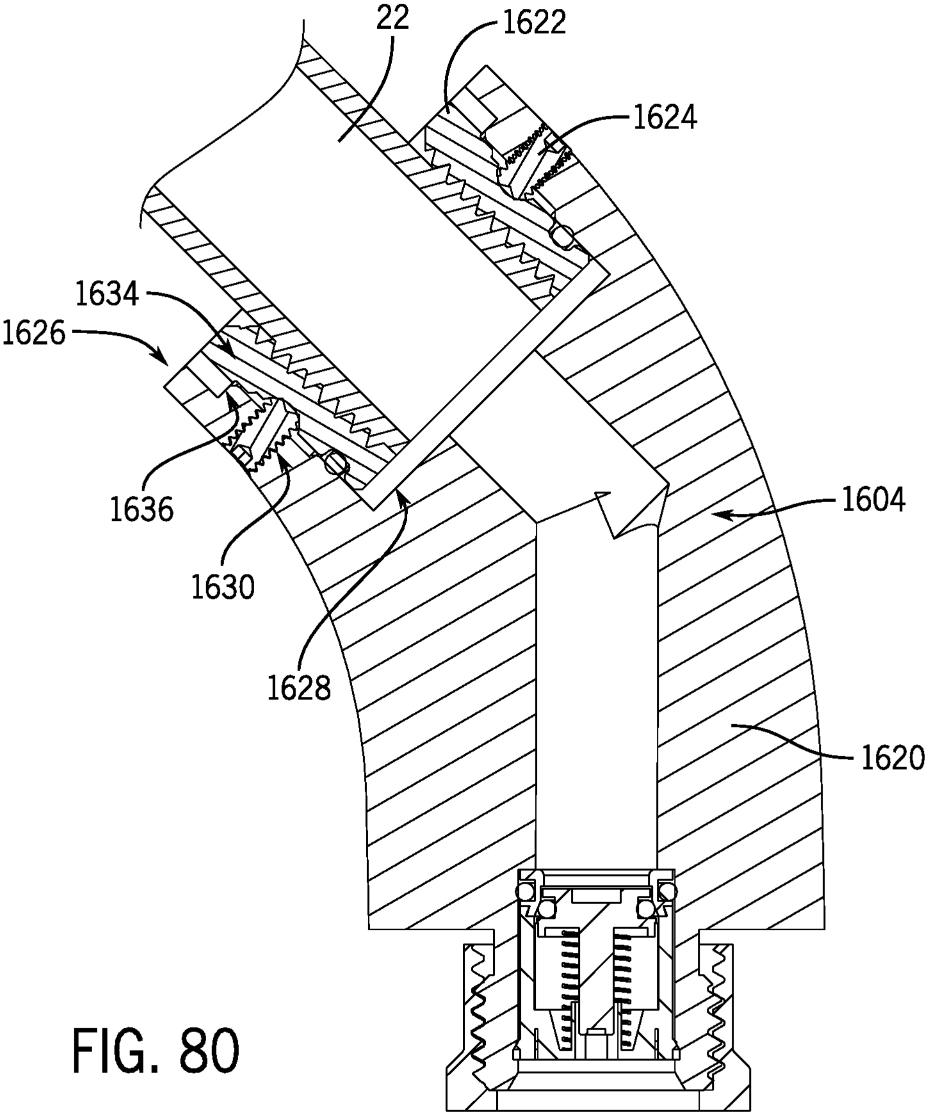
FIG. 80 is a side cross-sectional view through a coupler portion of the system of FIG. 76.

FIG. 80 shows a side cross-sectional view through the coupler 1604. The coupler 1604 is structured to support the dispensing device 1300 (see FIG. 79) in fixed orientation (e.g., vertically) relative to the fluid conduit 22. As shown in FIG. 80, the coupler 1604 includes a main body 1620, an adapter 1622, and a pair of set screws 1624. The adapter 1622 includes a threaded interface (e.g., an NPT interface, etc.) along an inner surface of the adapter 1622 that is configured to engage a threaded portion of the fluid conduit 22. A proximal end 1626 (e.g., upstream end, upper end, etc.) of the coupler 1604 defines a cylindrically-shaped recessed area 1628 configured to receive the adapter 1622 therein. The set screws 1624 are threaded through a pair of diametrically opposed cross-holes 1630 through the main body 1620, and lock the main body 1620 in place relative to the adapter 1622.

Figure 81:
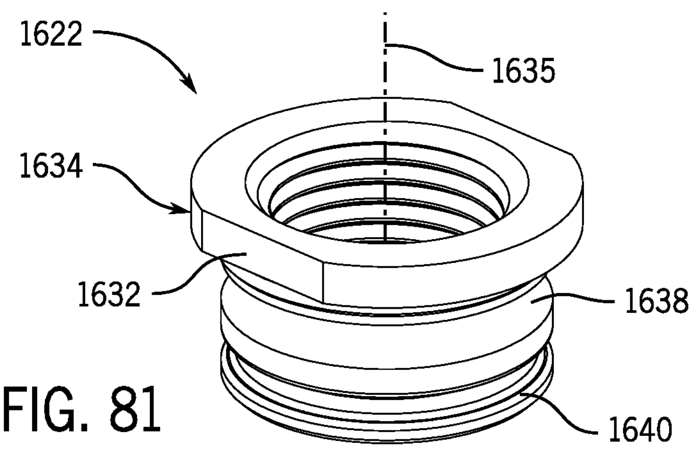
FIG. 81 is a perspective view of an adapter of the system of FIG. 76.

The adapter 1622 is structured to simplify installation of the coupler 1604 onto the fluid conduit 22. As shown in FIG. 81, the adapter 1622 defines a pair of flats 1632 (e.g., planar surfaces) on opposing sides of the adapter 1622 to facilitate threading of the adapter 1622 onto the fluid conduit 22 (e.g., via a wrench or another fastening tool). The flats 1632 are disposed an upper flange 1634 (e.g., lip, etc.) of the adapter 1622. As shown in FIG. 81, the upper flange 1634 extends radially outwardly from a central axis 1635 of the adapter 1622. As shown in FIG. 80, the flange 1634 is sized to engage with a step 1636 at a proximal end of the recessed area 1628 to position the adapter 1622 within the recessed area 1628 before fixing the rotational position of the main body 1620 with respect to the adapter 1622.

As shown in FIG. 81, the adapter 1622 defines a pair of grooves, including a mounting groove 1638, and a sealing groove 1640 disposed below the mounting groove 1638, toward a distal end of the adapter 1622. As shown in FIG. 80, the set screws 1624 are configured to interface with the adapter 1622 at the mounting groove 1638. The mounting groove 1638 is substantially "U" shaped (see FIG. 81), which, advantageously, urges the main body 1620 into alignment with the adapter 1622 as the set screws 1624 are being tightened. As shown in FIG. 80, the sealing groove 1640 is sized to receive an O-ring, gasket, or other sealing member therein. The sealing member is "sandwiched" or otherwise disposed between the main body 1620 (see FIG. 80) and the adapter 1622 to form a radial seal to prevent fluid leakage through in interface between the adapter 1622 and the main body 1620. According to an exemplary embodiment, the main body 1620 and adapter 1622 are both made from brass (e.g., plated brass forging for the main body 1620 and a machined brass for the adapter 1622). In other embodiments, the materials used for the main body 1620 and the adapter 1622 may be different.

Figure 82:
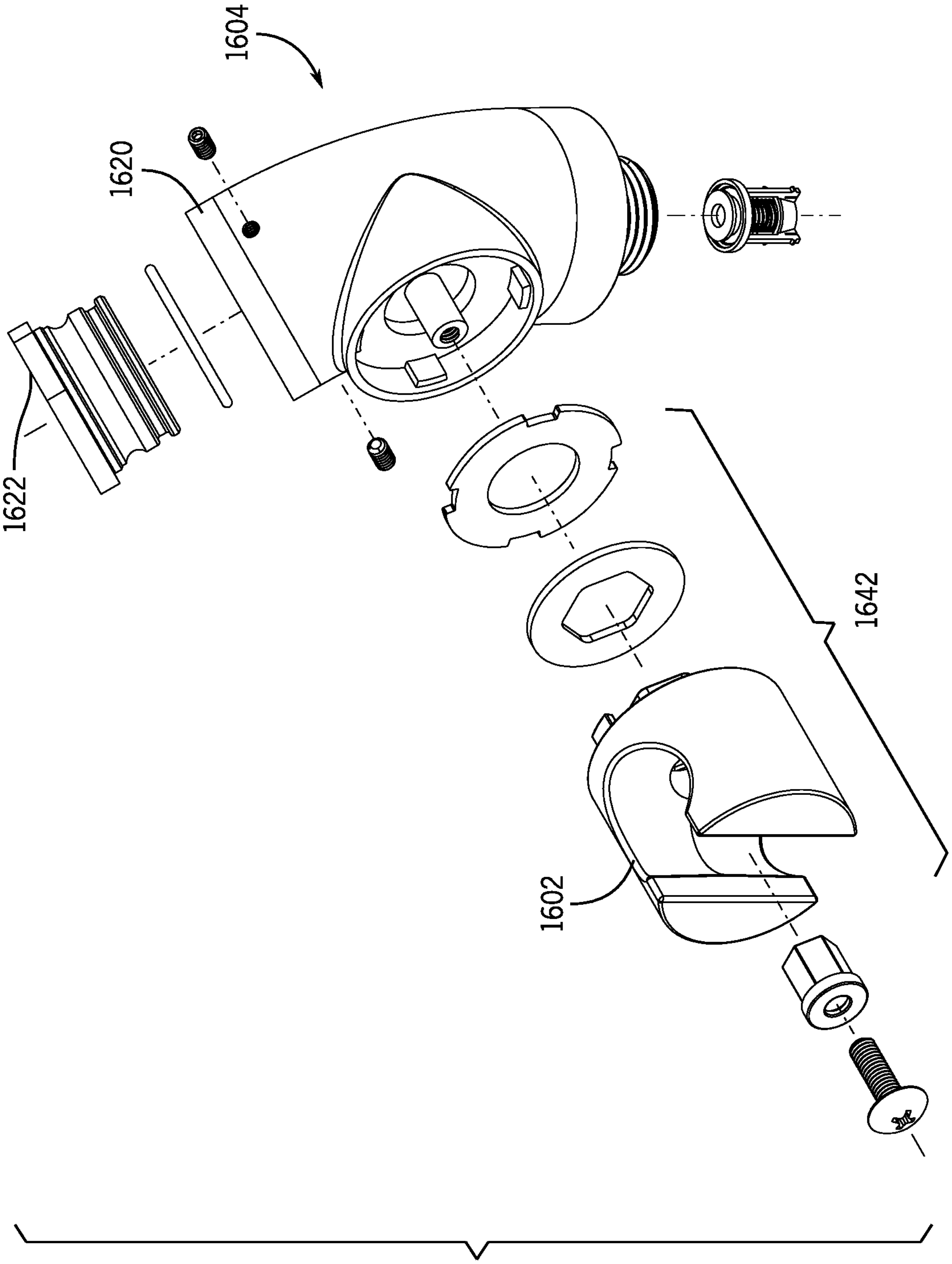
FIG. 82 is an exploded view of the system of FIG. 76.

FIG. 82 shows an exploded view of the coupler 1604, which shows a connection assembly 1642 for the hand-shower cradle 1602. The connection assembly 1642 includes a plurality of washers configured to facilitate alignment and sealing between the cradle 1602 and the main body 1620. The connection assembly 1642 also includes a fastener (e.g., screw, bolt, etc.) configured to secure the cradle 1602 to the main body 1620. According to an exemplary embodiment, the washers are made from acetal plastic such as polyoxymethylene (POM) or another suitable plastic material, while the fastener is made from stainless steel. However, it will be appreciated that other materials may also be used for various parts of the coupler 1604 without departing from the inventive concepts disclosed herein.

Figure 84:
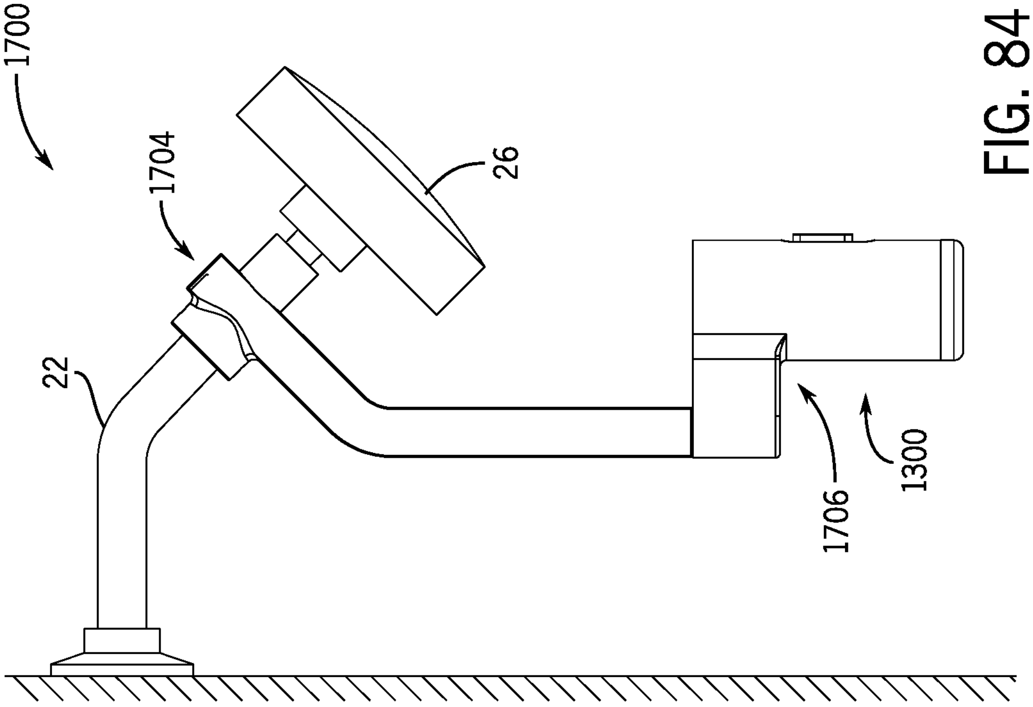
FIG. 84 is a side view of the system of FIG. 83.
Figure 83:
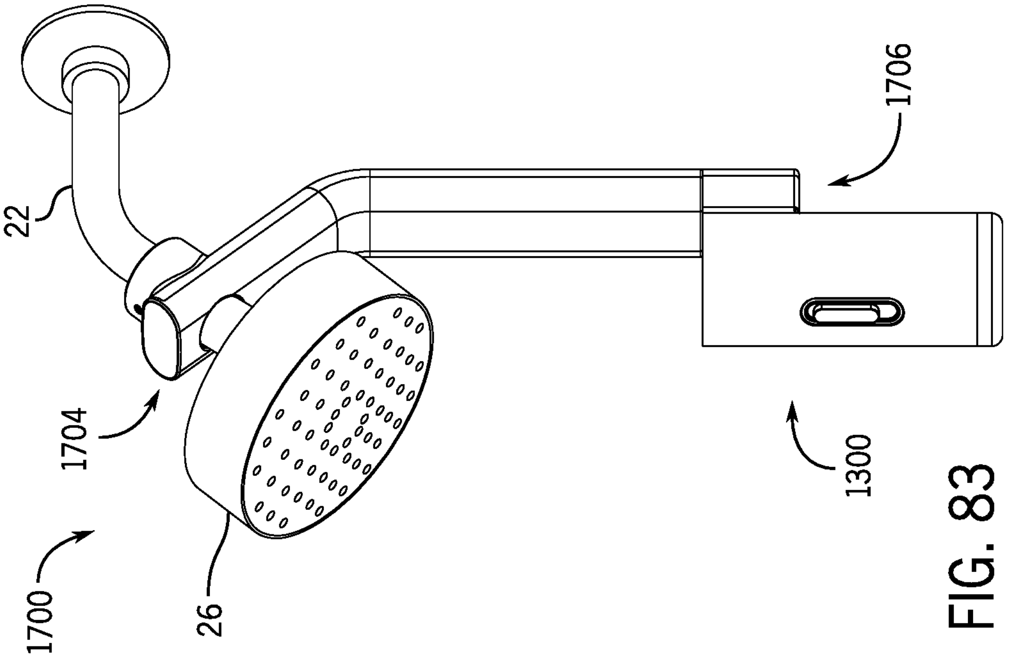
FIG. 83 is a perspective view of a system for installing an inline shower device, according to another exemplary embodiment.

Referring to FIGS. 83-84, another exemplary embodiment of a system 1700 for installing a dispensing device (e.g., dispensing device 1300) onto a fluid conduit 22 is shown. As shown in FIGS. 83-84, the system 1700 is configured to be installed to the fluid conduit 22, between the fluid conduit 22 and the showerhead 26. As with the system 1600 of FIGS. 76-77, the system 1700 of FIGS. 83-84 is configured to support the dispensing device 1300 on the fluid conduit 22 in a substantially vertical orientation.

Figure 85:
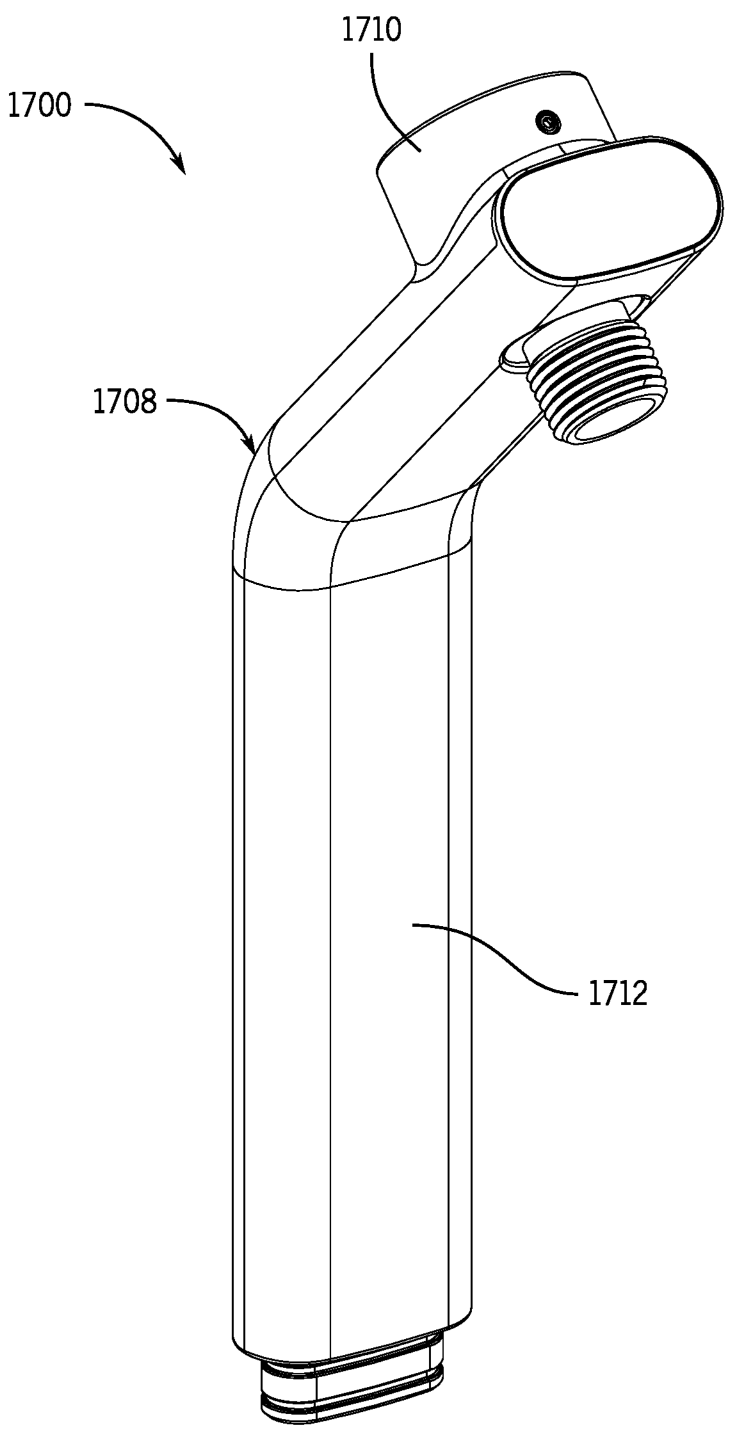
FIG. 85 is another perspective view of the system of FIG. 83.

As shown in FIGS. 83-84, the system 1700 is a drop down elbow assembly that extends between the fluid conduit 22 and the dispensing device 1300. A proximal end 1704 (e.g., upper end as shown in FIGS. 83-84 of the system 1700 is coupled to the fluid conduit 22, while a distal end 1706 (e.g., lower end) is coupled to the dispensing device 1300. As shown in FIG. 85, the system 1700 includes a housing 1708 including an upper housing portion 1710 and a lower housing portion 1712. The housing 1708 may be made from a plated zinc casting or another suitable material. The system 1700 also includes a plurality of flow tubes 1714 (see FIG. 86), which are "sandwiched" or otherwise disposed in a cavity between the upper housing portion 1710 and the lower housing portion 1712. The tubes 1714 may be made from a polyethylene resin, copper, or another suitable material.

Figure 86:
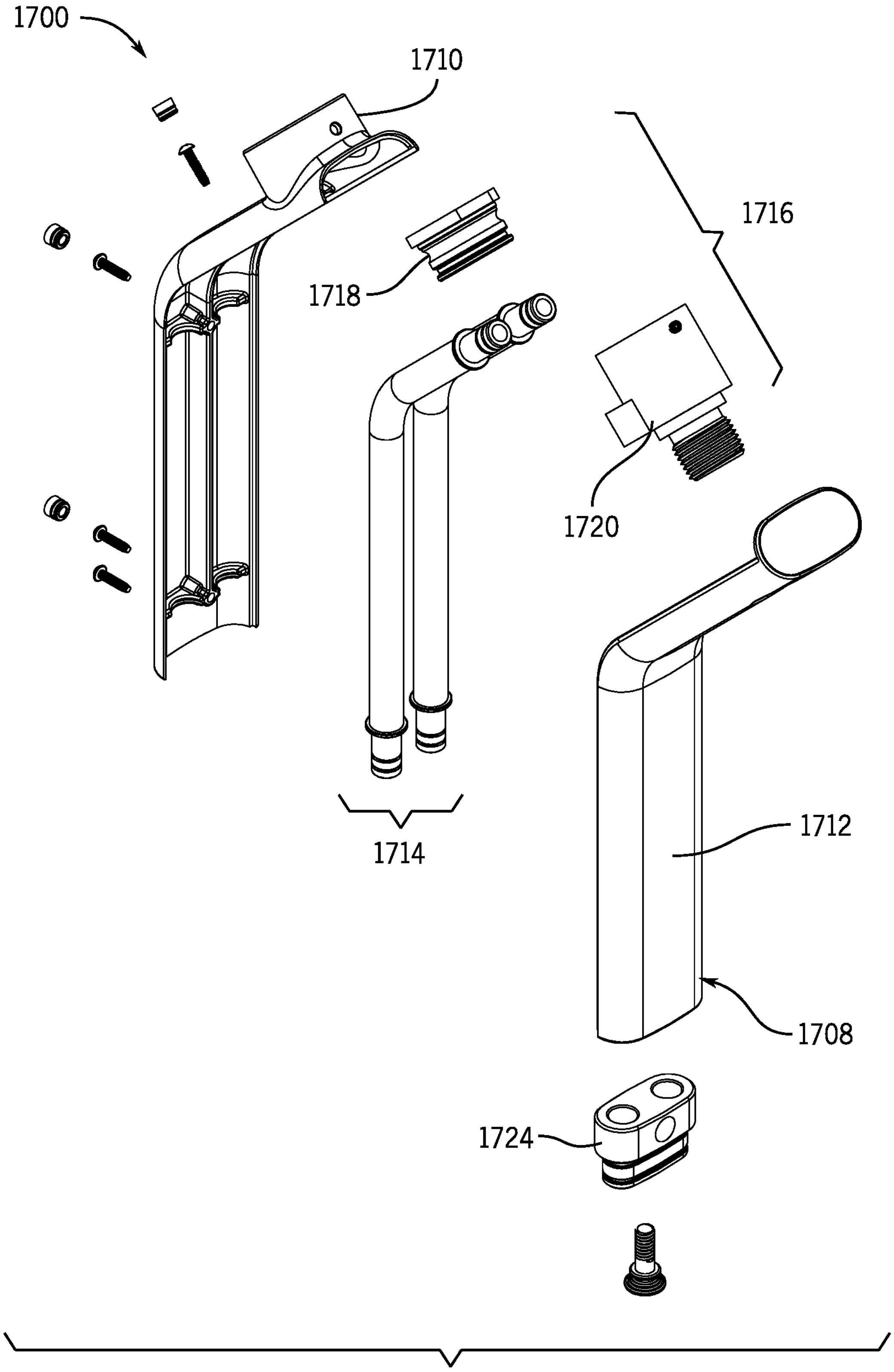
FIG. 86 is an exploded view of the system of FIG. 83.
Figure 87:
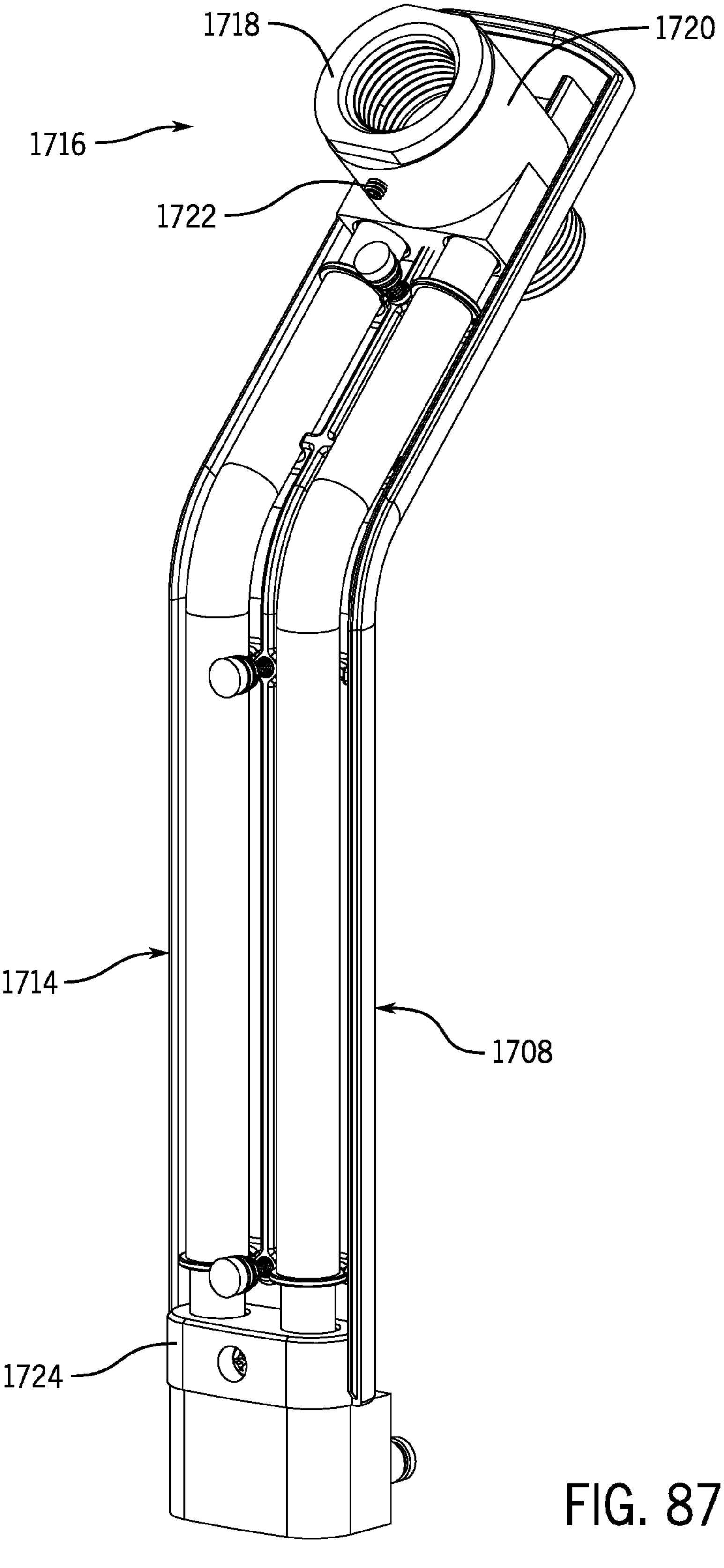
FIG. 87 is a partial sectional view of the system of FIG. 83.

FIGS. 86 and 87 show exploded and partial sectional views of the system 1700 of FIG. 85, respectively. The system 1700 includes an inlet connection assembly 1716, including an adapter 1718 and an upper fluid manifold 1720. In the embodiment of FIGS. 86-87, the adapter 1718 is the same as the adapter 1622 described with reference to FIG. 81. As shown in FIG. 87, the upper fluid manifold 1720 is affixed to the adapter 1718 via set screws 1722. The system 1700 additionally includes a lower fluid manifold 1724 disposed at a distal end of the housing 1708, which is fluidly coupled to the upper fluid manifold 1720 by each of the plurality of flow tubes 1714. According to an exemplary embodiment, the upper fluid manifold 1720 and the lower fluid manifold 1724 are both made from brass. In other embodiments, the upper fluid manifold 1720 and/or the lower fluid manifold 1724 are made from a plastic material (e.g., polyamide, nylon, etc.). As shown in FIG. 86, the system 1700 additionally includes glands (e.g., made from plastic or another suitable material) to fluidly connect the tubes 1714 to the upper fluid manifold 1720 and the lower fluid manifold 1724.

Figure 88:
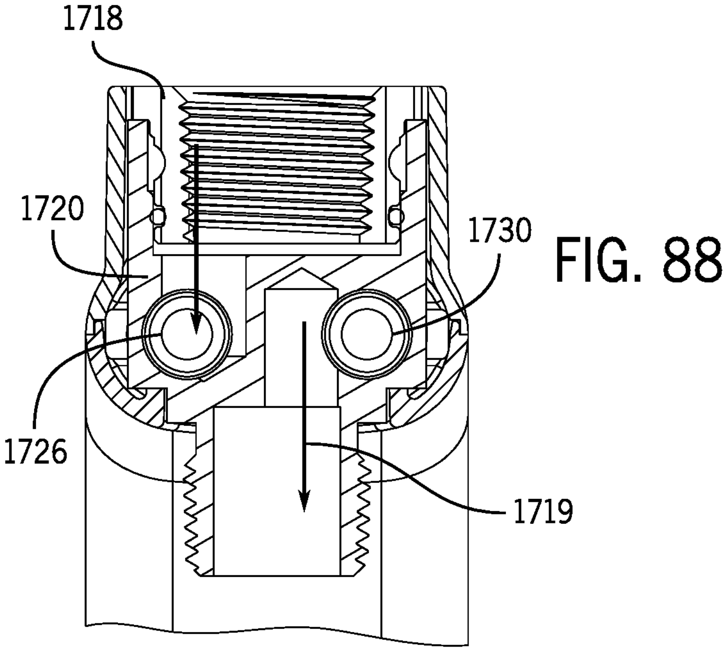
FIG. 88 is a rear cross-sectional view of an upper fluid manifold of the system of FIG. 83.
Figure 89:
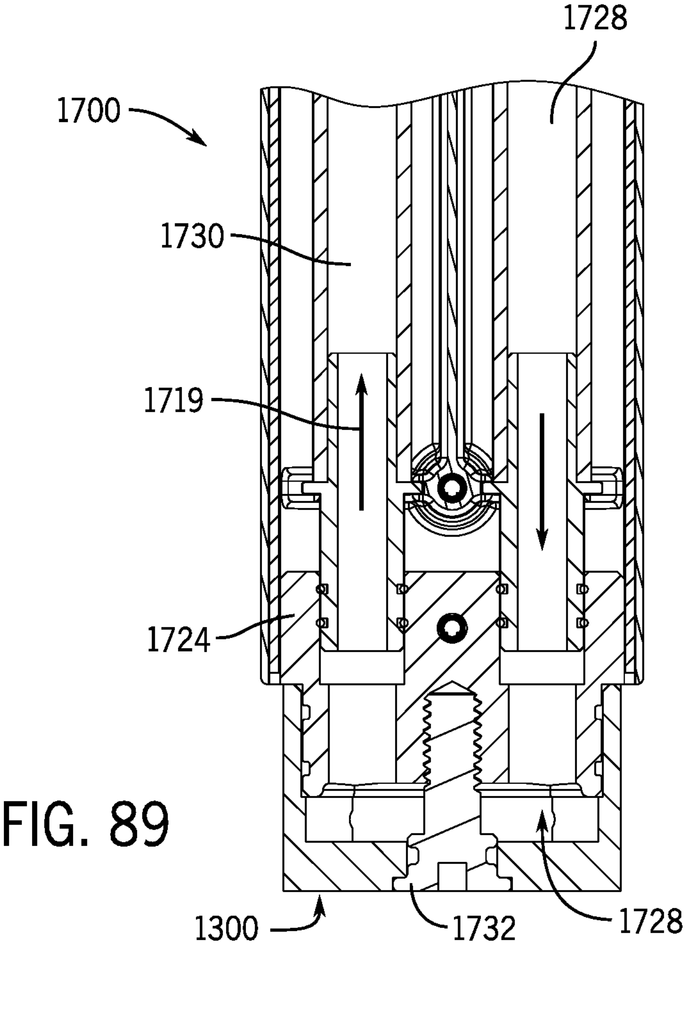
FIG. 89 is a rear cross-sectional view of a lower fluid manifold of the system of FIG. 83.

FIGS. 88-89 show the flow path 1719 of fluid through the upper fluid manifold 1720 and the lower fluid manifold 1724, respectively. As shown in FIG. 88, fluid (e.g., water) entering the upper fluid manifold 1720 through fluid conduit 22 (e.g., adapter 1718) is directed into a first tube 1726 of the plurality of flow tubes 1714. The fluid passes along the first tube 1726 toward the lower fluid manifold 1724 and into a lower cavity 1728 of the system 1700. The fluid may pool within the lower cavity 1728 in between dispensing operations, or return from the lower cavity 1728 to the upper fluid manifold 1720 through the second tube 1730.

According to an exemplary embodiment, the lower cavity 1728 is at least partially defined by the dispensing device 1300 (e.g., a fluid plenum to which both the inlet port and the outlet port are connected). When the dispensing device 1300 is activated, fluid is drawn out from the lower cavity 1728 and into the dispensing device 1300 (into the hydraulic chamber to facilitate dispensing of the aromatic liquid). The aromatic liquid is then returned to the lower fluid manifold 1724 from the dispensing device 1300, where the aromatic liquid mixes with the incoming liquid as it passes through the second tube 1730. The aromatic liquid is redirected from the second tube 1730 to the showerhead 26 by the upper fluid manifold 1720.

As shown in FIG. 89, the dispensing device 1300 is detachably coupled to the distal end of the system 1700 via a lock down fastener 1732, which is threadably engaged with the lower fluid manifold 1724 in between the first tube 1726 and the second tube 1730. According to an exemplary embodiment, the lock down fastener 1732 is made from brass (e.g., plated brass), or another suitably water resistant material. As shown in FIG. 89, the lock down fastener 1732 defines a recessed area that is configured to receive a sealing member therein to prevent fluid from leaking out of the recessed area. Among other benefits, the system 1700 of FIGS. 83-84 allow the dispensing device 1300 to be fluidly connected in-line with the existing fluid conduit 22 and showerhead 26.

Figure 91:
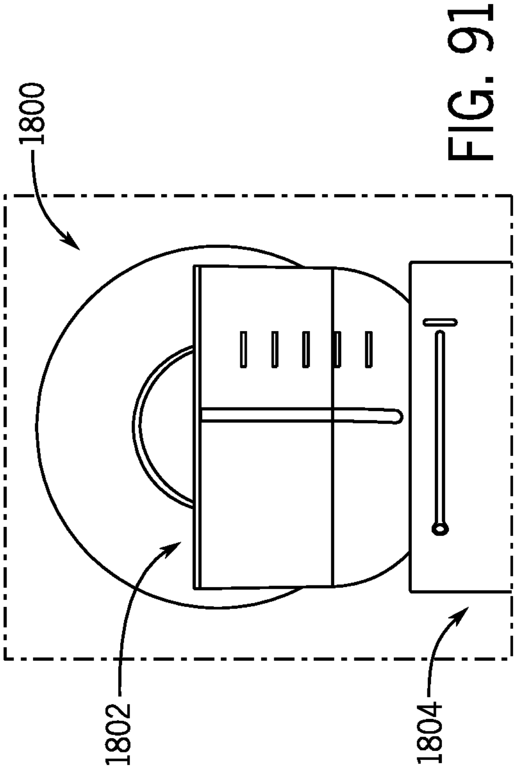
FIG. 91 is a front view of a capsule for the inline shower device of FIG. 90.
Figure 92:
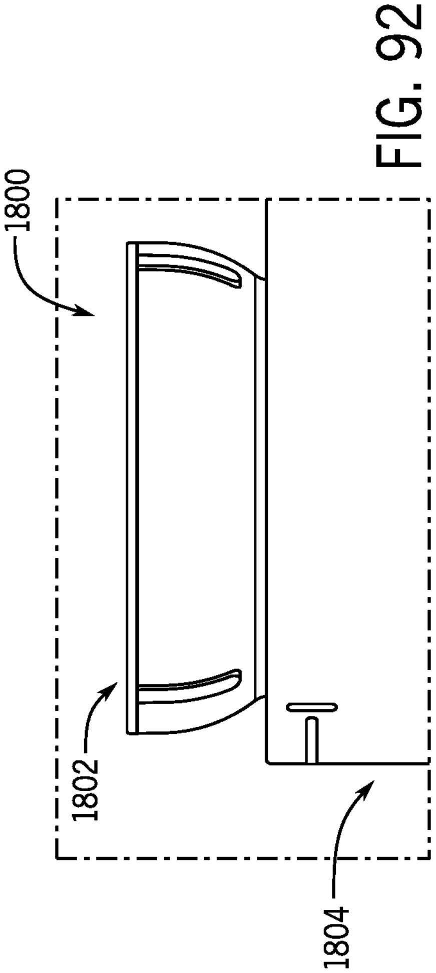
FIG. 92 is a side view of another capsule for the inline shower device of FIG. 90.
Figure 90:
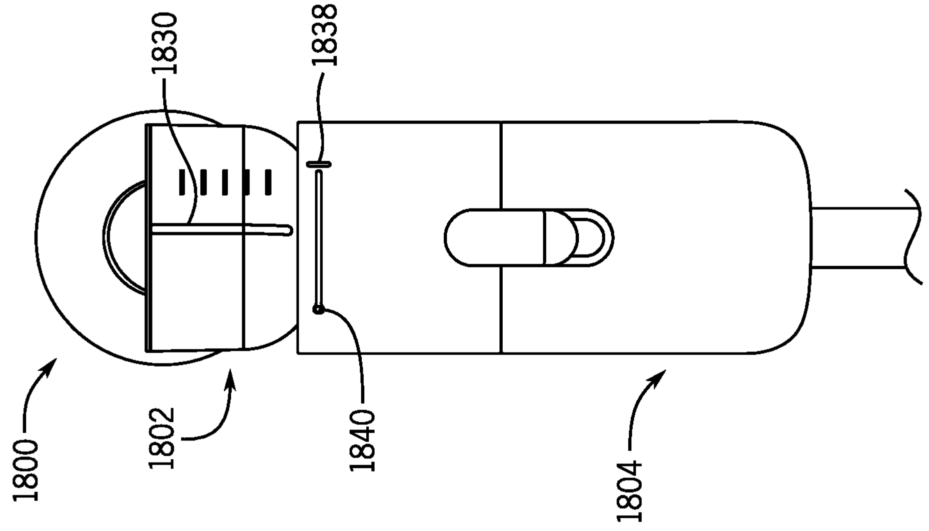
FIG. 90 is a front view of an inline shower device, according to another exemplary embodiment.
Figure 93:
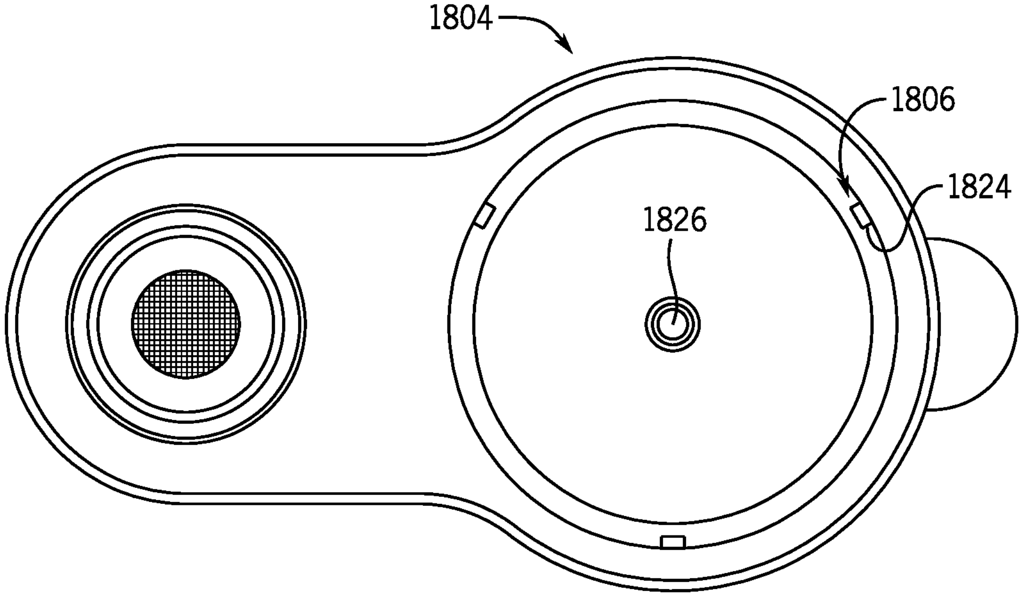
FIG. 93 is a top view of a housing for the inline shower device of FIG. 90.
Figure 94:
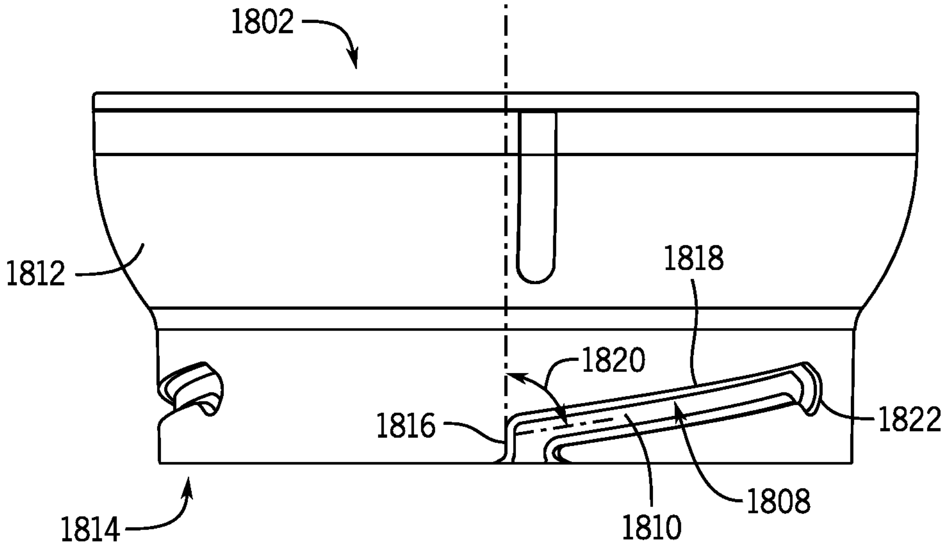
FIG. 94 is a side view of the capsule of FIG. 92.

Referring to FIGS. 90-92, another exemplary embodiment of an inline dispensing device 1800 is shown. The inline dispensing device 1800 includes a capsule 1802 that is installed onto the housing 1804 by rotating the capsule 1802 relative to the housing 1804 (e.g., in a clockwise direction, etc.). The capsule may be a multi-use capsule as shown in FIGS. 90 and 91 or a single-use capsule as shown in FIG. 92. For simplicity, the same numbering is used to identify similar components. As shown in FIG. 93, the housing 1804 includes a first engaging portion 1806. As shown in FIG. 94, the capsule 1802 includes a second engaging portion 1808 that is configured to interface or otherwise engage with (e.g., is complementary with, etc.) the first engaging portion 1806 to couple the capsule 1802 to the housing 1804. In the embodiment of FIG. 93, the second engaging portion 1808 includes a plurality of grooves 1810 spaced at approximately equal intervals along an outer circumference of a lower body portion 1812 of the capsule 1802. In other embodiments, the grooves 1810 may be disposed along an inner radial surface of the lower body portion 1812, or along an outer circumference of an upper body portion (e.g., in implementations in which the upper body portion extends toward a lower end of the capsule proximate to where the capsule engages the housing). In the embodiment of FIG. 94, the capsule 1802 includes three grooves, although the number and arrangement of grooves may be different in other embodiments.

As shown in FIG. 94, the grooves 1810 are recessed areas or slots formed into an outer wall of the lower body portion 1812. Each of the grooves 1810 are disposed at the same radial position with respect to the central axis of the capsule 1802. Each groove 1810 extends at an angle upwardly from a lower end 1814 of the capsule 1802, in both a circumferential direction an axial direction (e.g., parallel to a central axis of the capsule 1802) upwardly from a lower end 1814 of the lower body portion 1812 toward an intermediate position (e.g., a central position, etc.) between the lower end 1814 and an upper end of the capsule 1802. In the embodiment of FIG. 94, the plurality of grooves 1810 are substantially helically-shaped (e.g., in a helical formation along the outer circumferential surface of the lower body portion 1812). Each groove 1810 includes three portions, a first portion 1816 disposed at the lower end 1814 of the lower body portion 1812 and extending substantially parallel to the central axis of the capsule 1802, a second portion 1818 extending at a first oblique angle 1820 relative to the central axis of the capsule 1802 and toward an upper end of the capsule 1802 (e.g., non-parallel and non-perpendicular to the central axis of the capsule 1802, in a partially circumferential direction and a partially axial direction toward an upper end of the capsule 1802), and a third portion 1822 extending at a second oblique angle back toward a lower end of the lower body portion 1812.

As shown in FIG. 93, the first engaging portion 1806 includes a plurality of tabs 1824 disposed along an inner circumferential surface of the housing 1804, radially away from the inner circumferential surface of the housing 1804 and toward a central axis 1826 of the housing 1804. The number of tabs 1824 matches the number of grooves 1810 (see FIG. 94) and each tab 1824 is engageable with a respective one of the plurality of grooves 1810. As shown in FIG. 93, the tabs 1824 include substantially cylindrical protrusions (e.g., studs, etc.), although the shape of at least one of the tabs 1824 may be different in other embodiments.

Figure 96:
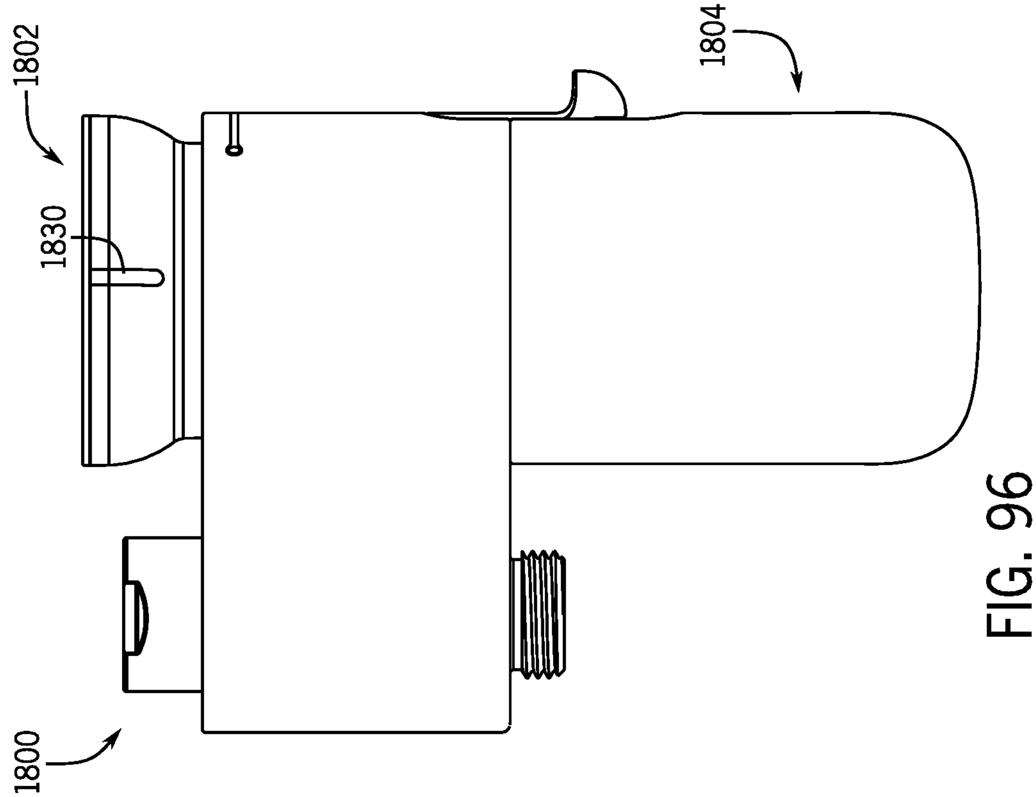
FIG. 96 is a side view of the inline shower device of FIG. 90 during a second installation operation.
Figure 95:
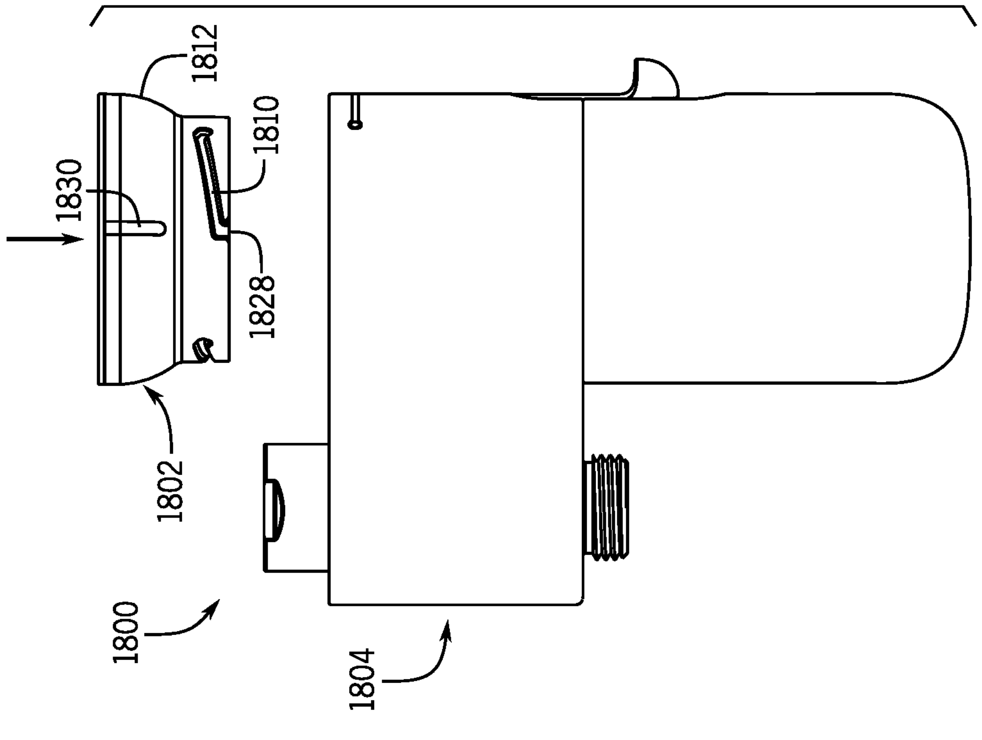
FIG. 95 is a side view of the inline shower device of FIG. 90 during a first installation operation.

Referring to FIGS. 95-105, a method of installing an interchangeable capsule 1802 onto a housing 1804 of an inline dispensing device 1800 is shown (e.g., coupling the capsule 1802 to the housing 1804, etc.), according to an exemplary embodiment. As shown in FIG. 95, the method includes rotationally aligning the grooves 1810 of the capsule 1802 with the tabs 1824 (see FIG. 93) of the housing 1804. In particular, the method may include rotating the capsule 1802 until an opening 1828 at a lower end of the grooves 1810 (e.g., an opening 1828 defined by a lower end of each groove 1810 facing axially away from the lower body portion 1812) is axially aligned with a respective one of the plurality of tabs 1824. In some embodiments, the method may include rotating the capsule 1802 until a first indicator on the capsule 1802 is circumferentially aligned with a second indicator on the housing 1804. For example, as shown in FIGS. 95 and 96 (see also FIG. 90), the capsule 1802 may include an outer rib 1830 disposed on an outer surface of the capsule 1802 and extending axially between a lower end and an upper end of the capsule 1802. The second indicator may include a rib or tick mark (e.g., printed indicator line, etc.) printed or otherwise disposed on the housing 1804.

Figure 97:
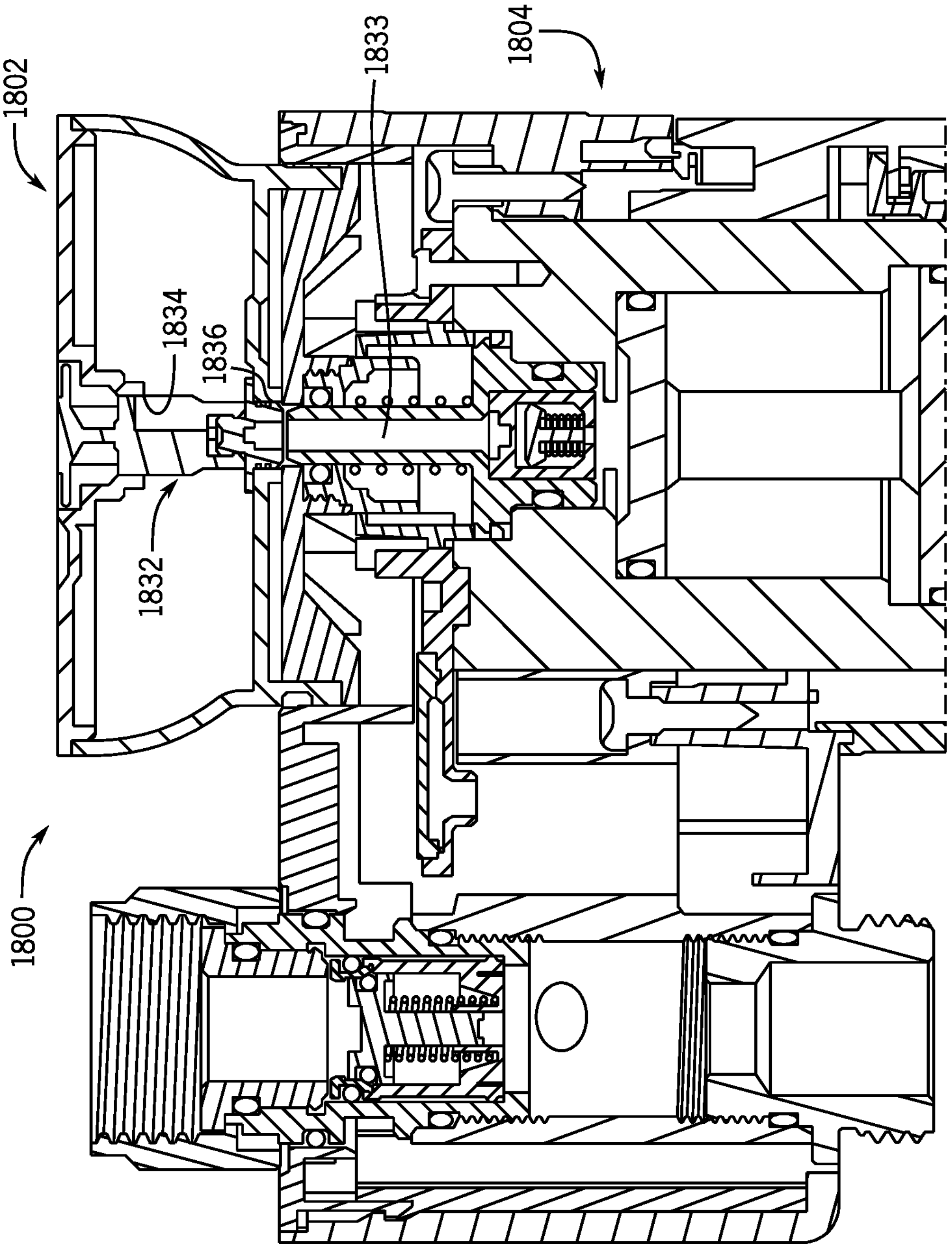
FIG. 97 is a side cross-sectional view of the inline shower device of FIG. 90.
Figure 98:
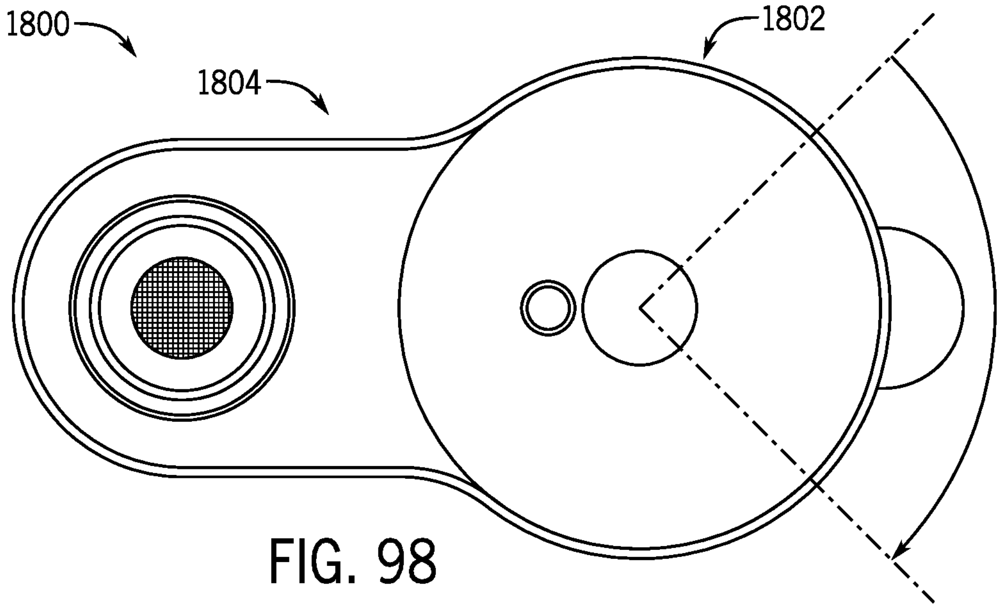
FIG. 98 is a top view of the inline shower device of FIG. 90.
Figure 99:
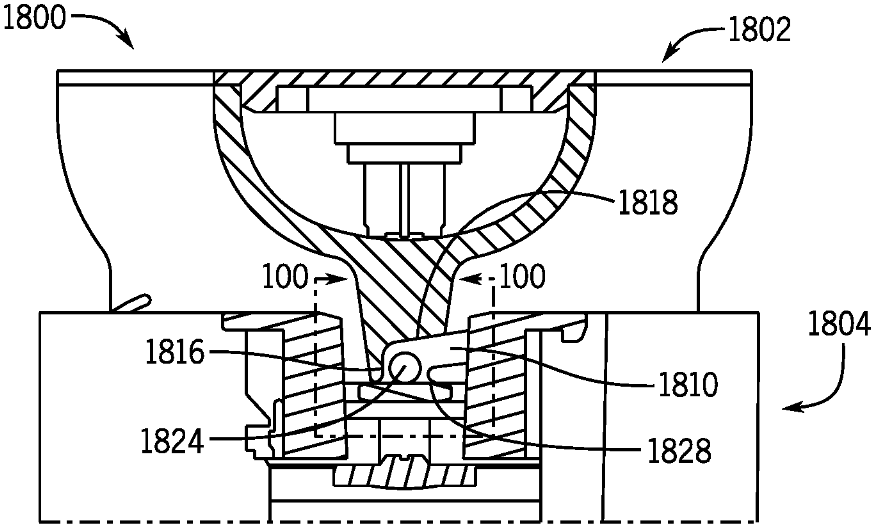
FIG. 99 is a partial side cross-sectional view of the capsule of FIG. 92 during an installation operation.
Figure 100:
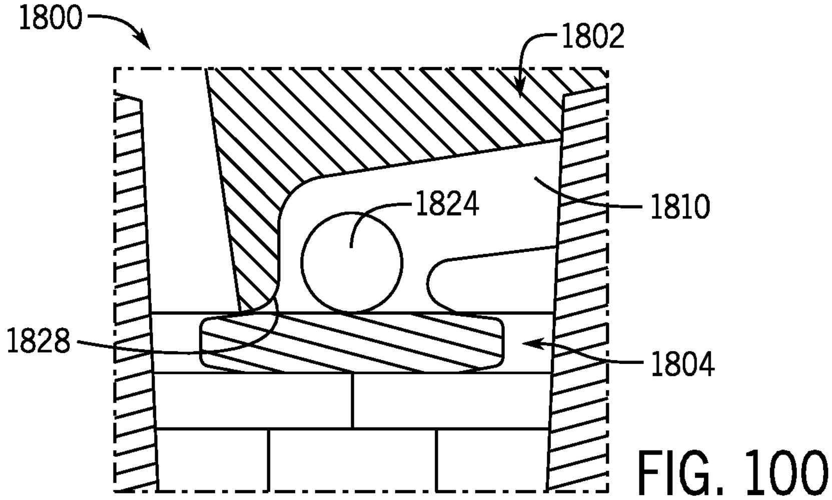
FIG. 100 is a partial side cross-sectional view of an interface between the capsule and the housing of the inline shower device of FIG. 90.

As shown in FIGS. 95-99, the method includes engaging the plurality of tabs 1824 with openings 1828 at the lower end of the plurality of grooves 1810 (see, in particular, FIGS. 99 and 100). The method may include moving the capsule 1802 axially toward the housing 1804 until the tabs 1824 are at least partially engaged with the openings 1828. As shown in FIGS. 99 and 100, a width of the openings 1828 may be slightly larger than a width of each groove 1810 above the openings 1828 so as to facilitate alignment between the tabs 1824 and the grooves 1810.

As shown in FIG. 97, the capsule 1802 may also include a plunger 1832, which may be the same as or similar to the plunger described with reference to FIGS. 62-66. In the embodiment of FIG. 97, the plunger 1832 extends through openings, shown as upper opening 1834 and lower opening 1836, in the capsule 1802 (e.g., in the upper body portion and/or cap, and the lower body portion 1812, respectively). As shown in FIG. 97, the method may also include engaging a hollow pin 1833 of the housing 1804 with a lower surface of a plunger 1832 in the capsule 1802.

As shown in FIGS. 98-100, the method includes rotating the capsule 1802 with respect to the housing 1804 to fully engage and/or couple the capsule 1802 to the housing 1804. As shown in FIG. 90, the housing 1804 includes markings and/or other indicators (e.g., ribs, etc.) to provide a visual indication to the user of when the capsule 1802 is fully engaged to and/or disengaged from the housing 1804. For example, in the embodiment of FIG. 90, the user first aligns the rib 1830 with the second indicator 1838 on the housing and then rotates the capsule in a clockwise direction until the rib 1830 is rotationally aligned with a third indicator 1840 (e.g., circular mark, etc.) on the housing. It will be appreciated that the types of indicators used may be different in other embodiments. In the embodiment of FIG. 98, the method includes rotating the capsule 1802 (e.g., approximately 60 degrees or another suitable angle) in a clockwise direction to couple the capsule 1802 to the housing 1804.

As shown in FIG. 99, during rotation, the tabs 1824 slide from the first portion 1816 of the grooves 1810 into the second portion 1818. The method may include rotating the capsule 1802 by a first angle relative to the housing 1804 (e.g., 50 degrees, 55 degrees, etc.) to slide the tabs 1824 along the second portion 1818. The angle of the second portion 1818 of the grooves 1810 causes movement of the capsule 1802 in an axial direction toward the housing 1804. In the embodiment of FIGS. 98-100, rotating the capsule 1802 by the first angle moves the capsule 1802 an axial distance of approximately 0.150 inches toward the housing 1804, although the overall amount of axial movement may be different in other embodiments.

The axial movement of the capsule 1802 relative to the housing 1804 drives the pin 1833 (see FIG. 97) against the plunger 1832 and causes movement of the plunger 1832 with respect to the capsule 1802 (e.g., with respect to the lower body portion 1812 and the upper body portion of the capsule 1802). As shown in FIGS. 101-104, the pin displaces the plunger 1832 in an axial direction such that, after rotation, an upper end of the plunger 1832 extends above the capsule 1802. In other words, rotating the capsule 1802 by the first angle displaces the plunger 1832 from a first position (e.g., closed position, etc.) in which an internal cavity of the capsule 1802 is sealed off from its surroundings to a second position (e.g., open position, etc.) in which the internal cavity of the capsule 1802 is at least partially fluidly coupled to its surroundings (e.g., to the atmosphere via a vent at an upper opening of the capsule 1802).

Figure 104:
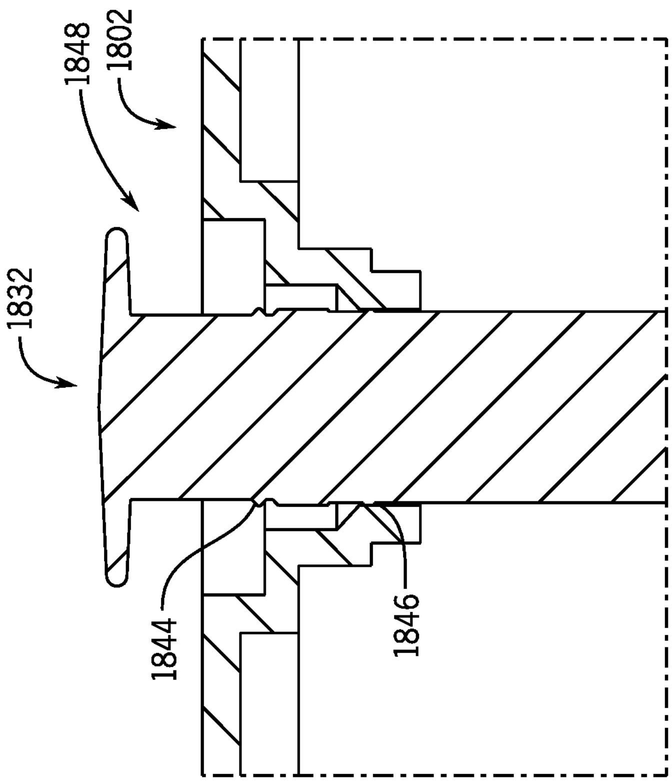
FIG. 104 is a side cross-sectional view of an upper end of a plunger of the inline shower device of FIG. 90 after installation onto a housing.

As shown in FIG. 104, the plunger 1832 includes a first protrusion 1844 (e.g., rib, lip, etc.) and a second protrusion 1846 (e.g., rib, lib, etc.) at an upper end 1848 of the plunger 1832 that both extend radially away from an outer surface of the plunger 1832. The second protrusion 1846 is spaced axially apart from the first protrusion 1844 (e.g., below the first protrusion 1844). In the first position, the first protrusion 1844 of the plunger 1832 sealingly engages the capsule 1802 at an upper opening of the upper body portion. In the second position (after the plunger 1832 is displaced upwardly by the pin, as shown in FIG. 104), the second protrusion 1846 engages the capsule 1802 at the upper opening and the first protrusion is spaced axially above the capsule 1802.

Figure 102:
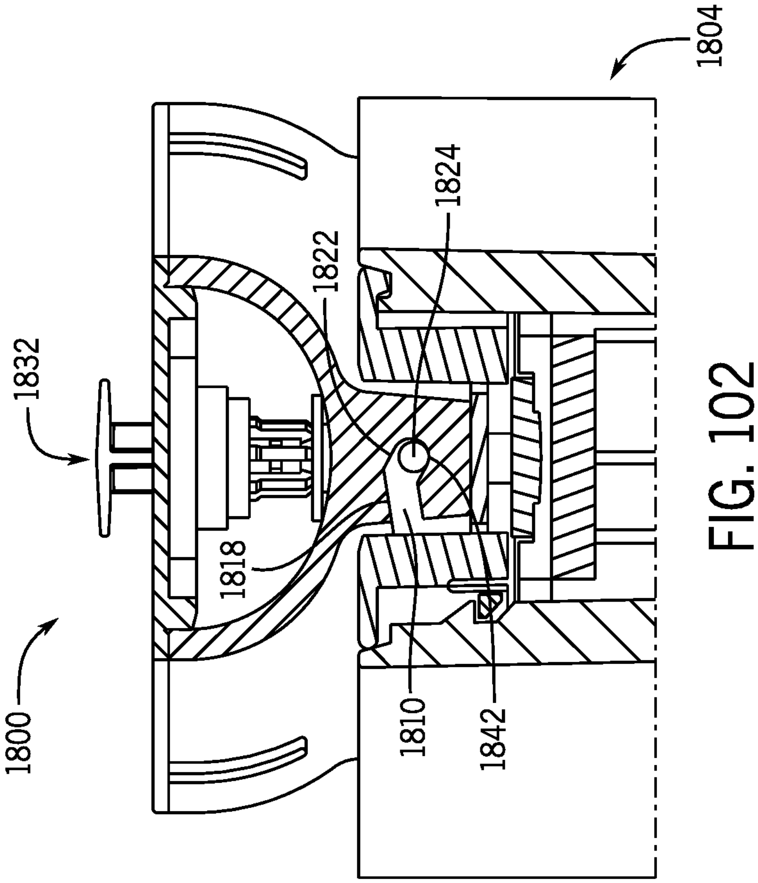
FIG. 102 is a partial side cross-sectional view of an interface between the capsule and the housing of the inline shower device of FIG. 90 with a fully installed capsule.
Figure 101:
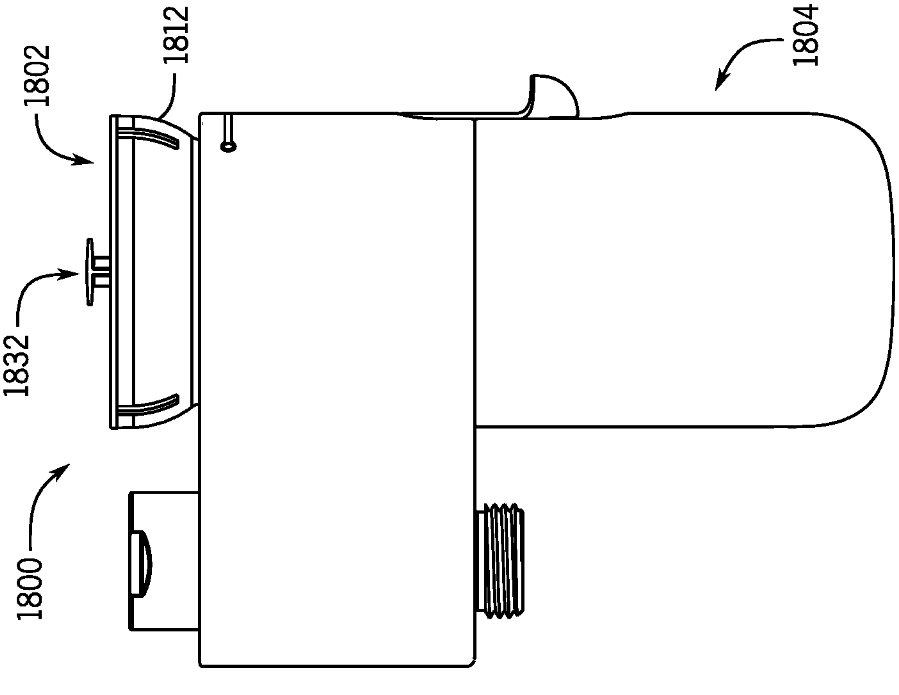
FIG. 101 is a side view of the inline shower device of FIG. 90 with a fully installed capsule.
Figure 103:
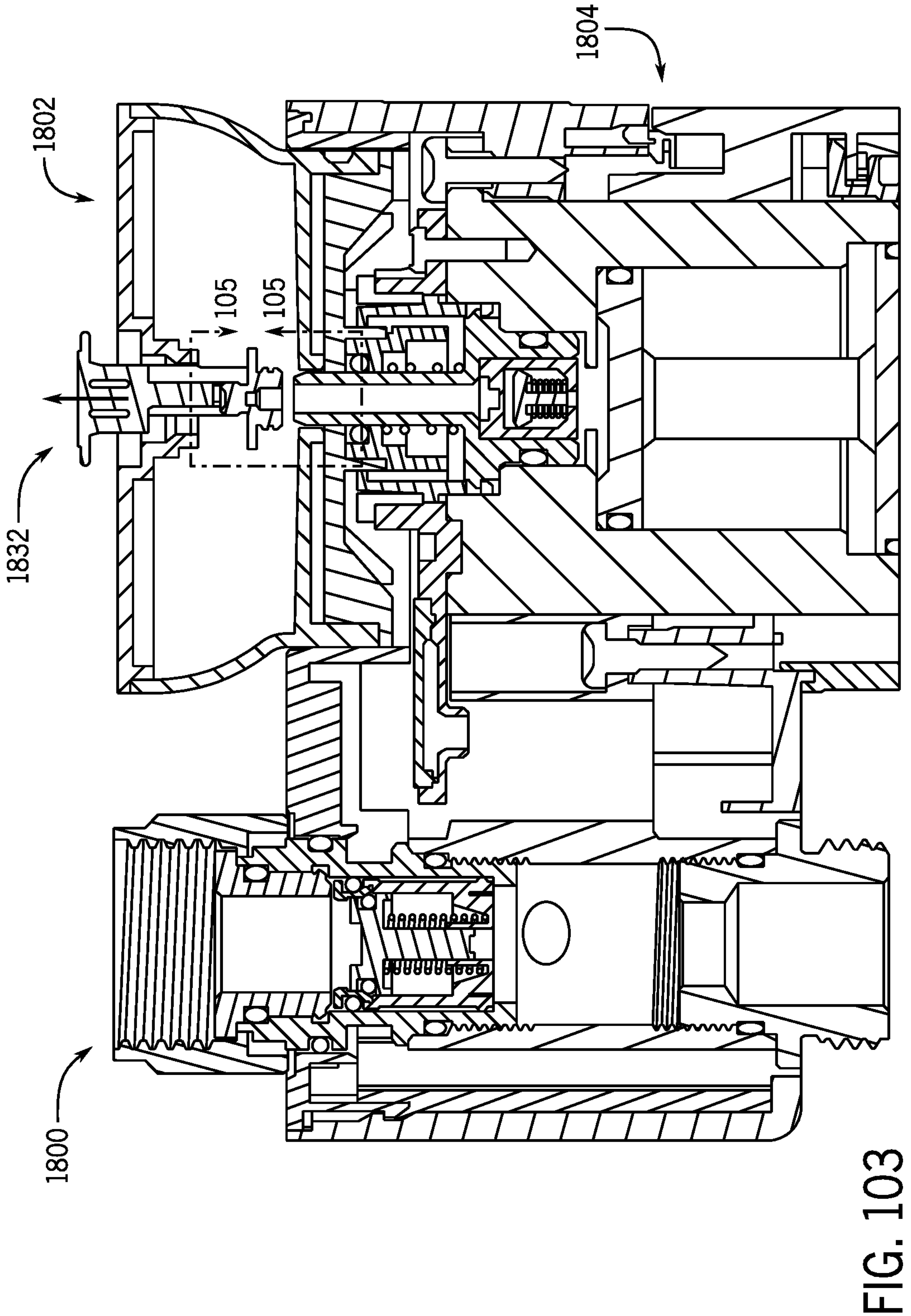
FIG. 103 is a side cross-sectional view of the inline shower device of FIG. 90 during capsule installation.

As shown in FIG. 102, the method may further include rotating the capsule 1802 by a second angle (e.g., 5 degrees, 10 degrees, etc.) to engage the tabs 1824 with the third portion 1822 of the grooves 1810. The third portion 1822 of the grooves 1810 may include an inverted ramp 1842 and/or abrupt transition between the second portion 1818 and the third portion 1822, which provides the user with tactile feedback to indicate when the capsule 1802 has been fully installed. The inverted ramp 1842 may extend at least partially in a second axial direction that is opposite to a first axial direction of the second portion 1818 (e.g., the inverted ramp 1842 may extend from the second portion 1818 back toward a lower end of the capsule 1802, back toward the housing 1804, etc.). Beneficially, the inverted ramp 1842 provides an interlock that prevents inadvertent separation of the capsule 1802 from the housing 1804 (e.g., under a purely axial force, etc.).

Figure 105:
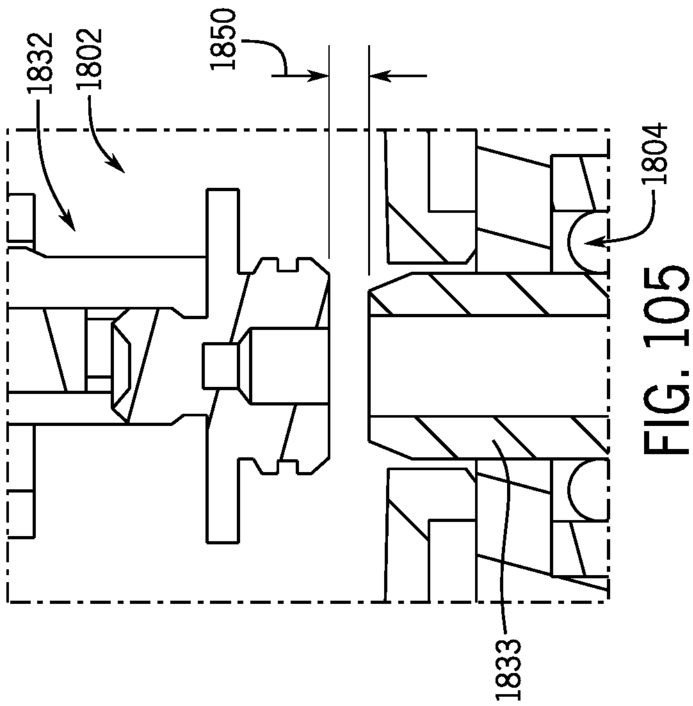
FIG. 105 is a side cross-sectional view of a lower end a plunger of the inline shower device of FIG. 90 after installation onto a housing.

As shown in FIG. 105, rotating the capsule 1802 into the inverted ramp 1842 (see also, FIG. 102) moves the capsule 1802 axially away from the housing 1804, which moves (e.g., axially separates, etc.) the hollow pin 1833 from the plunger 1832 and fluidly couples the interior cavity of the capsule 1802 to the remainder of the inline dispensing device 1800. In the embodiment of FIG. 105, a separation distance 1850, between the hollow pin 1833 and the plunger 1832, along the axial direction, when the capsule 1802 is fully secured to the housing 1804, is approximately 0.05 inches, although the separation distance 1850 may be different in other embodiments.

Figure 106:
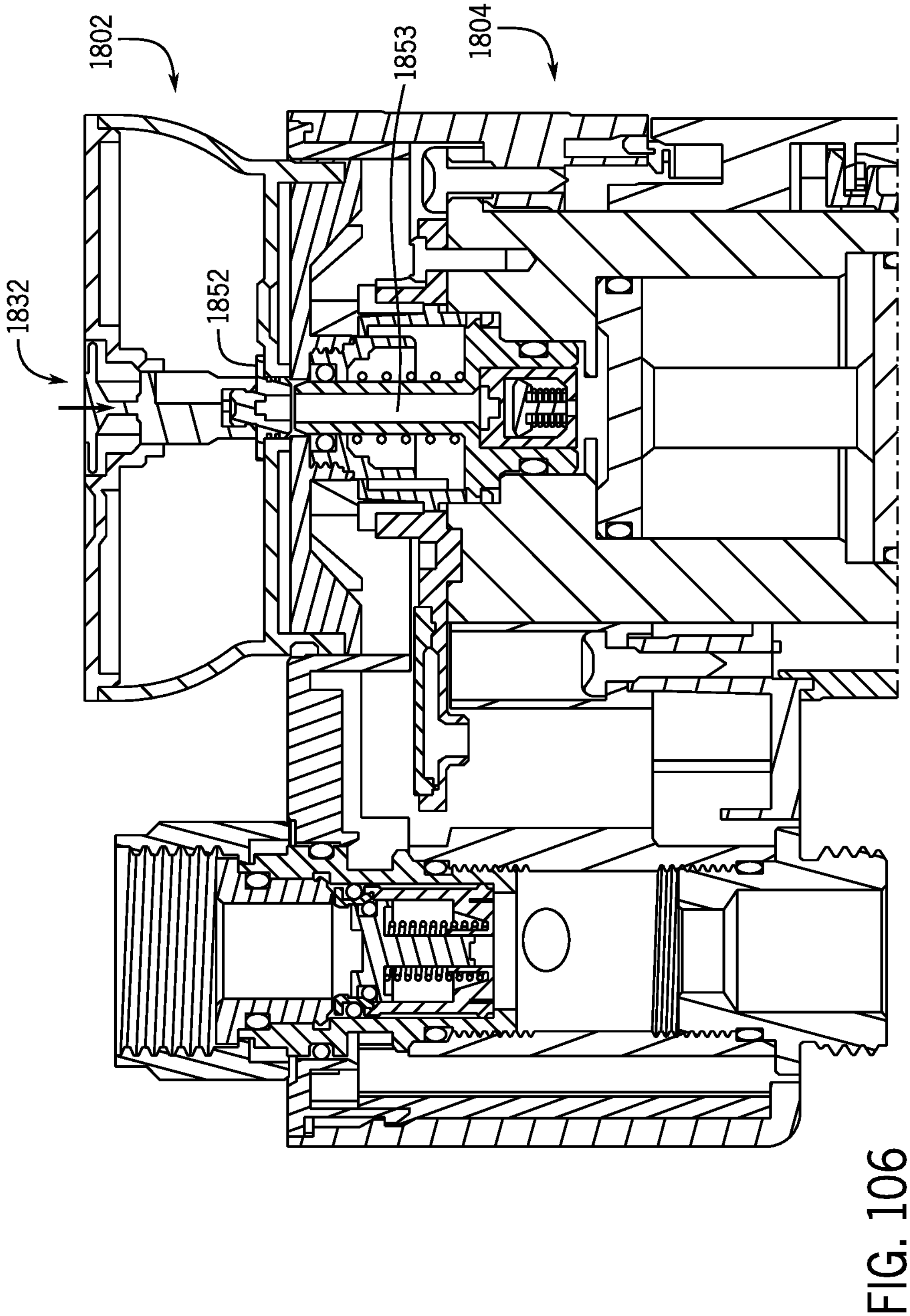
FIG. 106 is a side cross-sectional view of the inline shower device of FIG. 90 after sealing a capsule of the inline shower device with a plunger of the inline shower device.

In some embodiments, the plunger 1832 is configured to reseal the capsule 1802 after use. For example, as shown in FIG. 106, the plunger 1832 may include a flange 1852 extending radially away from an outer surface of the plunger 1832 proximate to at least one of, or both, an upper axial end of the plunger 1832 and a lower axial end of the plunger 1832. The flange 1852 is engageable with the capsule 1802 at one of the upper or lower openings and prevents movement of the plunger 1832 when the plunger 1832 is fully installed into the capsule 1802 (e.g., prevents movement of the plunger 1832 in an axial direction toward the lower end of the capsule 1802). When the user is finished using the capsule 1802 (or if they would like to preserve the capsule 1802 for future use), s/he simply depresses the plunger 1832 back toward the hollow pin 1833 (e.g., toward a lower end of the capsule 1802) until the flange 1852 engages the capsule 1802 (e.g., a lower or upper wall of the capsule 1802). Once fully installed, the interference ribs at the upper and lower ends of the plunger 1832 (see FIGS. 104 and 105) sealingly engage the capsule 1802 to prevent any fluid leakage from the capsule 1802.

Figure 107:
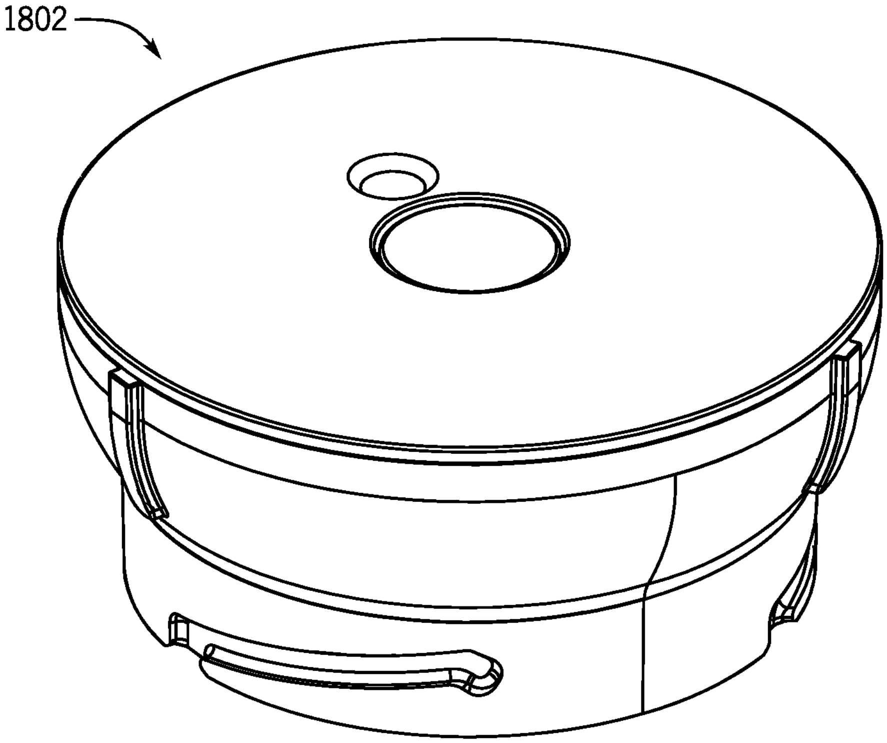
FIG. 107 is a perspective view of a capsule for an inline shower device, according to yet another embodiment.
Figure 108:
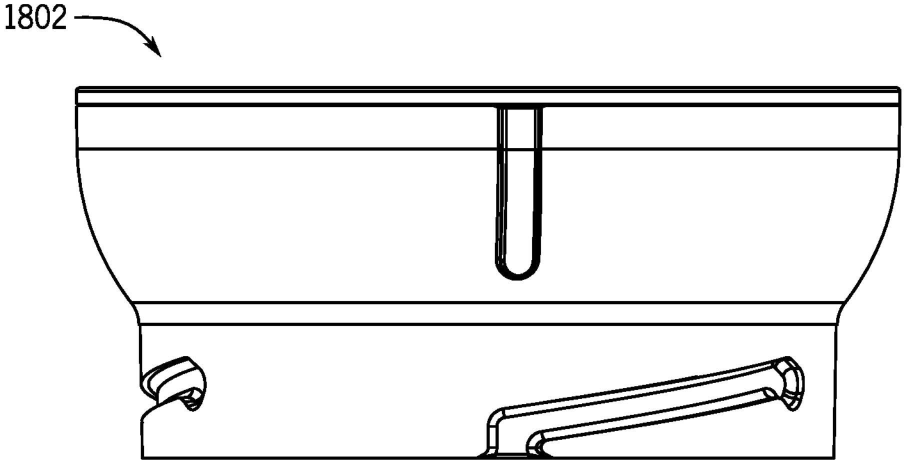
FIG. 108 is a side view of the capsule of FIG. 107.
Figure 109:
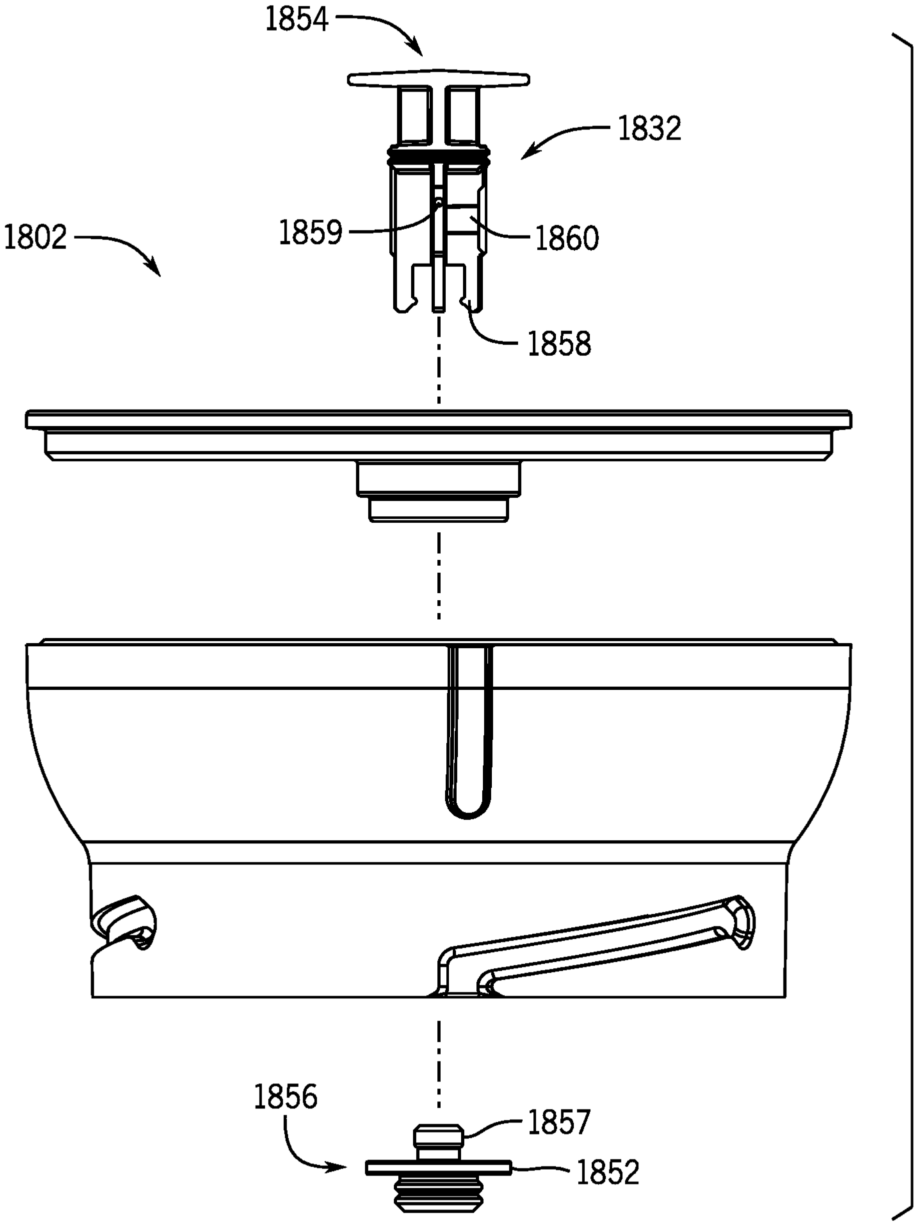
FIG. 109 is an exploded view of the capsule of FIG. 107.

FIGS. 107 and 108 show perspective and side views of the capsule 1802, respectively. FIG. 109 shows an exploded view of the capsule 1802. In the embodiment of FIG. 109, the plunger 1832 is a two-piece component that includes an upper portion 1854 and a lower portion 1856 coupled thereto. Beneficially, forming the plunger 1832 in two pieces facilitates assembly of the plunger 1832 and allows for the use of a larger flange 1852 on the lower portion 1856. The upper portion 1854 of the plunger 1832 includes a plurality of tabs 1858 (e.g., clips, fingers, latches, etc.) extending axially away from a lower end of the upper portion 1854. The tabs 1858 clip, latch, or otherwise mechanically couple the upper portion 1854 to a protrusion 1857 on the lower portion 1856. The upper portion 1854 may include a recessed area 1860 extending axially away from the flange 1852 (when the upper portion 1854 is coupled to the lower portion 1856), and at least one rib 1859 extending radially away from the recessed area 1860. The recessed area 1860 defines a portion of a channel between the plunger 1832 and the capsule 1802 that fluidly couples the interior cavity of the capsule 1802 to the surroundings when the plunger 1832 is displaced from the fully installed position. In other embodiments, the upper portion may be a hollow pin that includes a vent (e.g., port, opening, etc.) proximate an upper end of the upper portion.

Figure 112:
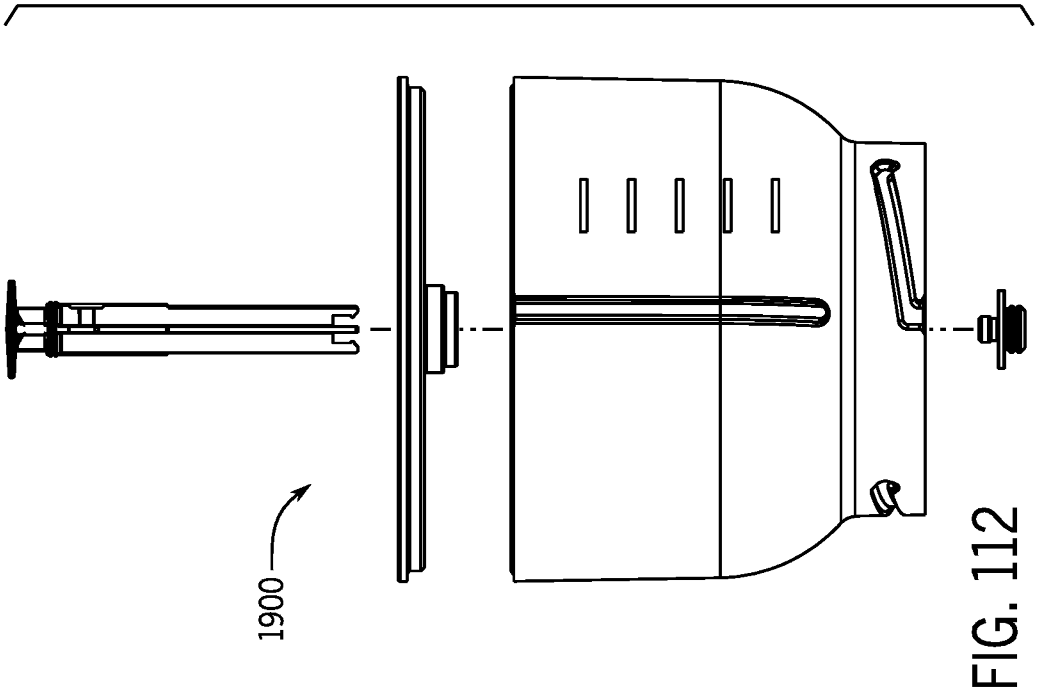
FIG. 112 is an exploded view of the capsule of FIG. 110.
Figure 110:
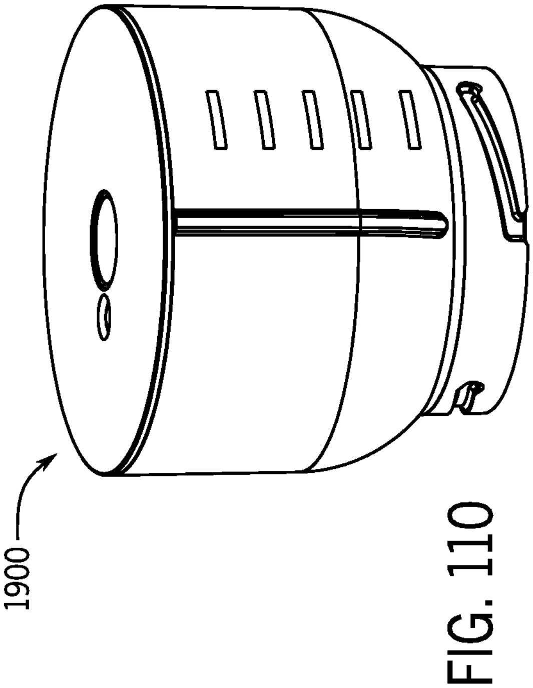
FIG. 110 is a perspective view of a capsule for an inline shower device, according to yet another embodiment.
Figure 111:
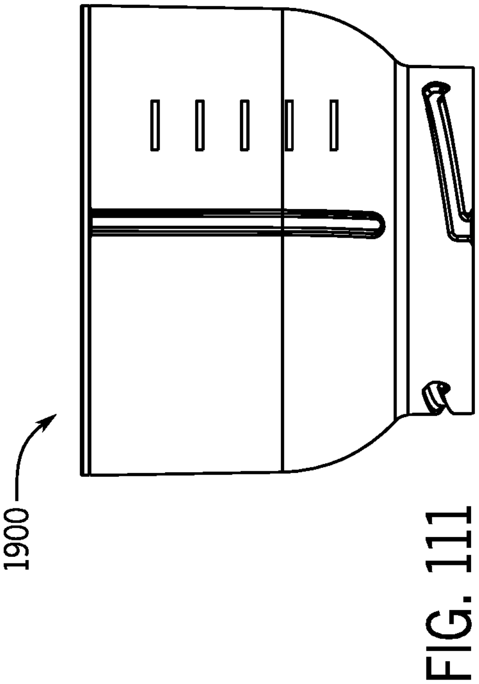
FIG. 111 is a side view of the capsule of FIG. 110.

It will be appreciated design of the capsule may vary depending on the desired volume of fluid (e.g., fragrance) in the capsule, and/or to accommodate multiple showering and/or washing events. For example, FIGS. 110-112 show another exemplary embodiment of a capsule 1900 that has an increased fluid holding capacity as compared to the capsule 1802 of FIGS. 107-109. The capsule 1900 may be transparent and/or may include markings to indicate the current volume of fluid within the capsule 1900.

Figure 113:
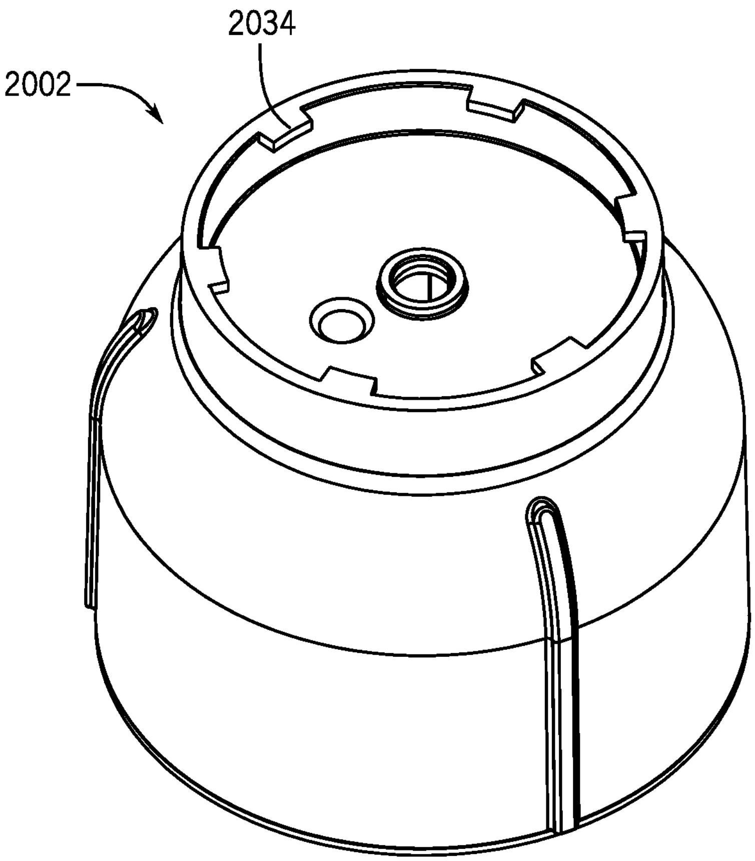
FIG. 113 is a bottom perspective view of a capsule for an inline shower device, according to yet another embodiment.
Figure 114:
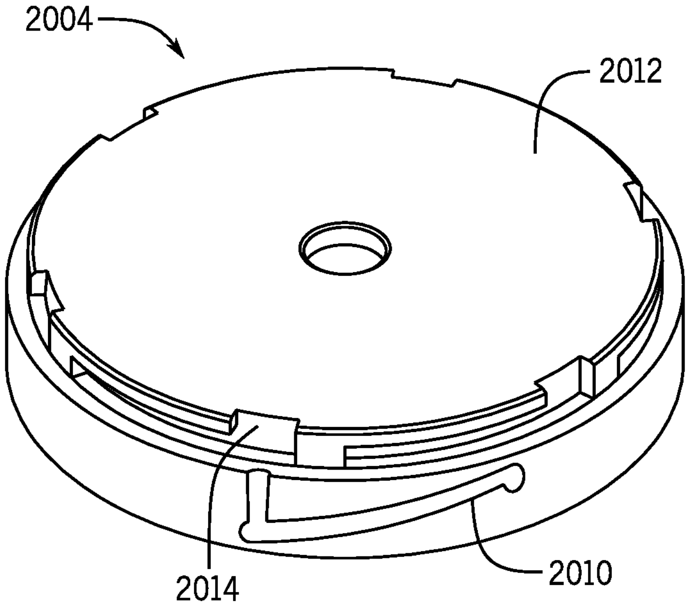
FIG. 114 is a perspective view of a housing interface for an inline shower device, according to an embodiment.

As described above, the position and geometry of the grooves and tabs that facilitate installation of the capsule may be different (e.g., reversed, etc.) in various embodiments. Referring to FIGS. 113 and 114, a capsule 2002 and housing portion 2004 of an inline shower device is shown in which a plurality of tabs 2034 are disposed on the capsule 2000 and a plurality of helical grooves 2010 are disposed on the housing portion 2004. In particular, the plurality of helical grooves 2010 are disposed on a diaphragm 2012 of the housing, along an outer circumferential surface of the diaphragm 2012. The diaphragm 2012 also includes a second set of grooves 2014 axially above the helical grooves 2010 (e.g., spaced axially apart from the helical grooves 2010 and closer to the capsule 2002 than the helical grooves 2010).

As shown in FIG. 113, the tabs 2034 are disposed on a lower extension of a lower body portion of the capsule 2002, and extend radially away from the lower extension toward a central axis of the capsule 2002. A second set of tabs are included on the housing 2004 (e.g., to interact with the helical grooves on the diaphragm 2012). To engage the capsule 2002 with the diaphragm 2012, a user slides the tabs 2034 on the capsule 2002 into an opening of the second set of grooves 2014. Next, the user rotates the capsule 2002 (e.g., approximately 45 degrees, etc.) to fully engage the tabs 2034 with the second set of grooves 2014. The user may then rotate the capsule 2002 (e.g., another 45 degrees, etc.) to fully load the capsule 2002 onto the housing 2004 (e.g., to fully engage the helical grooves 2010 with the second set of tabs on the housing 2004). In other embodiments, the tabs 2034 on the capsule 2002 may directly engage the helical grooves 2010 on the housing 2004.

The inline dispensing device, of which various exemplary embodiments are disclosed herein, provides several advantages over existing devices. The dispensing device includes an actuator that allows a user to selectively control a time at which the fluid is dispensed from a capsule into an inlet waterway upstream of a showerhead or handshower. The dispensing device includes a water-driven piston that moves under an applied fluid pressure to dispense the fluid through an orifice and into the inlet waterway. The combination of the water-driven piston and the orifice ensures a consistent delivery rate of fluid into the inlet waterway, regardless of the water supply pressure that is applied to the dispensing device. The inline dispensing device may also include a unique interface between the capsule and the housing to facilitate installation operations, and provide the user with tactile feedback to indicate when the capsule has been fully installed.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the application as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the apparatus and control system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments.

Other substitutions, modifications, changes and omissions may also be made in the design, operating conditions and arrangement of the various exemplary embodiments without departing from the scope of the present application. For example, any element disclosed in one embodiment may be incorporated or utilized with any other embodiment disclosed herein.

What is claimed is:

1. A capsule, comprising:

an upper body portion; and a lower body portion coupled to the upper body portion, the lower body portion including lower wall that defines a lower opening, the lower body portion and the upper body portion together defining an internal cavity, at least one of the upper body portion or the lower body portion having a plurality of grooves spaced at intervals along a circumferential direction with respect to a central axis of the capsule, the plurality of grooves extending at an angle in a partially axial direction and a partially circumferential direction.

2. The capsule of claim 1, wherein the plurality of grooves are helically-shaped grooves that are spaced at approximately equal intervals along a circumference of at least one of the upper body portion or the lower body portion.

3. The capsule of claim 1, wherein the plurality of grooves extends upwardly from a lower end of at least one of the lower body portion or the upper body portion.

4. The capsule of claim 3, wherein a lower end of each groove of the plurality of grooves defines an opening facing axially away from at least one of the lower body portion or the upper body portion.

5. The capsule of claim 1, wherein each of the plurality of grooves comprises a first portion at a lower end of at least one of the lower body portion or the upper body portion and extending substantially parallel to the central axis, and a second portion extending from the first portion that extends at least partially along the circumferential direction.

6. The capsule of claim 1, wherein each groove of the plurality of grooves defines a ramp at an innermost end, the ramp extending in at least partially axial direction toward a lower end of at least one of the lower body portion or the upper body portion.

7. The capsule of claim 1, wherein the upper body portion defines an upper opening in substantially coaxial alignment with the lower opening, wherein the capsule further comprises a plunger extending through the upper opening and the lower opening.

8. The capsule of claim 7, wherein the plunger comprises a flange extending radially away from an outer surface of the plunger, the flange engageable with the capsule at one of the upper or lower openings to prevent movement of the plunger in at least one direction.

9. The capsule of claim 7, wherein the plunger comprises a vent opening proximate an upper end of the plunger, the vent opening facing an inner radial surface of the upper body portion at the upper opening.

10. The capsule of claim 7, wherein the plunger further comprises:

a first protrusion at an upper end of the plunger that extends radially away from an outer surface of the plunger; and a second protrusion spaced axially apart from the first protrusion, the plunger moveable between a first axial position in which the first protrusion engages the upper body portion and a second axial position in which the second protrusion engages the upper body portion and the first protrusion is spaced apart from the upper body portion.

11. An inline shower device, comprising:

a housing comprising a first engaging portion; and a capsule comprising a second engaging portion, the second engaging portion configured to interact with the first engaging portion to detachably couple the capsule to the housing, wherein one of the first engaging portion or the second engaging portion comprises a plurality of grooves spaced at intervals along a circumferential direction with respect to a central axis of the housing or the capsule, the plurality of grooves extending at an angle in a partially axial direction and a partially circumferential direction.

12. The inline shower device of claim 11, wherein the plurality of grooves are helically-shaped grooves that are spaced at approximately equal intervals along a circumference of one of the housing or the capsule.

13. The inline shower device of claim 11, wherein each of the plurality of grooves extends upwardly from either a lower end of the capsule or downwardly from an upper end of the housing.

14. The inline shower device of claim 11, wherein an end of each groove of the plurality of grooves defines an opening facing axially away from one of the housing or the capsule.

15. The inline shower device of claim 11, wherein a first portion of each groove of the plurality of grooves extends at least partially in a first axial direction, and a second portion of each groove at an innermost end of each groove defines a ramp extending at least partially in a second axial direction that is opposite the first axial direction.

16. The inline shower device of claim 11, wherein the other of the first engaging portion or the second engaging portion comprises a plurality of tabs that are engageable with the grooves, and wherein the plurality of tabs comprises a plurality of studs extending radially toward or away from the central axis.

17. The inline shower device of claim 11, wherein the capsule comprises a body and a plunger extending through an upper and lower wall of the body.

18. A method, comprising:

engaging a plurality of tabs on one of a capsule or a housing with openings at a lower end of a plurality of grooves in the other one of the capsule or the housing; and coupling the capsule to the housing by rotating the capsule with respect to the housing, the rotation causing movement of the capsule in an axial direction toward the housing, wherein coupling the capsule to the housing comprises:

rotating the capsule by a first angle to engage a pin of the housing with a plunger of the capsule, the rotation causing movement of the plunger with respect to a body of the capsule; and rotating the capsule by a second angle to disengage the pin with the plunger.

19. The method of claim 18, wherein coupling the capsule to the housing comprises:

rotating the capsule by the first angle to engage the tabs with a first portion of the grooves, the first portion extending at an angle in a partially axial direction and a partially circumferential direction; and rotating the capsule by the second angle to engage the tabs with a second portion of the grooves, the second portion including an inverted ramp.

20. The method of claim 18, further comprising resealing the capsule by pressing the plunger in the axial direction toward the capsule.

* * * * *